United States Patent
Sharma

(10) Patent No.: US 10,963,893 B1
(45) Date of Patent: Mar. 30, 2021

(54) PERSONALIZED DECISION TREE BASED ON IN-STORE BEHAVIOR ANALYSIS

(71) Applicant: Rajeev Sharma, State College, PA (US)

(72) Inventor: Rajeev Sharma, State College, PA (US)

(73) Assignee: VideoMining Corporation, State College, PA (US)

( * ) Notice: Subject to any disclaimer, the term of this patent is extended or adjusted under 35 U.S.C. 154(b) by 788 days.

(21) Appl. No.: 15/051,629

(22) Filed: Feb. 23, 2016

(51) Int. Cl.
  *G06Q 30/00* (2012.01)
  *G06Q 30/02* (2012.01)
  *G06K 9/00* (2006.01)

(52) U.S. Cl.
  CPC ..... *G06Q 30/0201* (2013.01); *G06K 9/00342* (2013.01); *G06K 9/00718* (2013.01)

(58) Field of Classification Search
  CPC .......... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; H04Q 7/20
  See application file for complete search history.

(56) References Cited

U.S. PATENT DOCUMENTS

| | | |
|---|---|---|
| 4,331,973 A | 5/1982 | Eskin et al. |
| 4,973,952 A | 11/1990 | Malec et al. |
| 5,138,638 A | 8/1992 | Frey |

(Continued)

FOREIGN PATENT DOCUMENTS

| | | |
|---|---|---|
| CA | 2823895 | 5/2014 |
| EP | 1011060 | 6/2000 |

(Continued)

OTHER PUBLICATIONS

Ward, et al. RFID: Frequency, standards, adoption and innovation. JISC Technology and standards Watch; May 2006; https://fokt.pw/27043728.pdf (Year: 2006).*

(Continued)

*Primary Examiner* — Patricia H Munson
*Assistant Examiner* — Uche Byrd

(57) ABSTRACT

A method and system for determining the hierarchical purchase decision process of a shopper in front of a product category in a retail store. Shopping consideration and the decision path the shopper can be obtained by combining behavior data with the category layout and transaction data. The hierarchical decision process can be determined based on observed actual in-store purchase behavior using a set of video cameras and processor implemented instructions for extracting the sequence and timing of the shopper's decision process. The hierarchical decision process, obtained by the clustering of shopper behavior data over multiple shopping trips, can not only identify the sequence of the decision, but can also quantify the volume of shopping trips at each level in the decision process and the amount of time spent by the shopper for making each decision. The decisions of the shopper for each product group can be captured down to the product attribute level. Such in-depth understanding can provide a picture of the relative importance of each product attribute in the purchase decision process, and can help retailers personalize targeted messaging to the shopper.

30 Claims, 42 Drawing Sheets

(56) References Cited

U.S. PATENT DOCUMENTS

| | | |
|---|---|---|
| 5,305,390 A | 4/1994 | Frey et al. |
| 5,390,107 A | 2/1995 | Nelson et al. |
| 5,401,946 A | 3/1995 | Weinblatt |
| 5,465,115 A | 11/1995 | Conrad et al. |
| 5,490,060 A | 2/1996 | Malec et al. |
| 5,557,513 A | 9/1996 | Frey et al. |
| 5,953,055 A | 9/1999 | Huang et al. |
| 5,973,732 A | 10/1999 | Guthrie |
| 6,061,088 A | 5/2000 | Khosravi et al. |
| 6,141,433 A | 10/2000 | Moed et al. |
| 6,142,876 A | 11/2000 | Cumbers |
| 6,185,314 B1 | 2/2001 | Crabtree et al. |
| 6,195,121 B1 | 2/2001 | Huang et al. |
| 6,263,088 B1 | 7/2001 | Crabtree et al. |
| 6,295,367 B1 | 9/2001 | Crabtree et al. |
| 6,560,578 B2 | 5/2003 | Eldering |
| 6,826,554 B2 | 11/2004 | Sone |
| 6,904,408 B1 | 6/2005 | Mccarthy et al. |
| 6,941,573 B1 | 9/2005 | Cowan et al. |
| 7,171,024 B2 | 1/2007 | Crabtree |
| 7,225,414 B1 | 5/2007 | Sharma et al. |
| 7,227,976 B1 | 6/2007 | Jung et al. |
| 7,240,027 B2 | 7/2007 | McConnell et al. |
| 7,274,803 B1 | 9/2007 | Sharma et al. |
| 7,283,650 B1 | 10/2007 | Sharma et al. |
| 7,317,812 B1 | 1/2008 | Krahnstoever et al. |
| 7,319,479 B1 | 1/2008 | Crabtree et al. |
| 7,319,779 B1 | 1/2008 | Mummareddy et al. |
| 7,357,717 B1 | 4/2008 | Cumbers |
| 7,360,251 B2 | 4/2008 | Spalink et al. |
| 7,400,745 B2 | 7/2008 | Crabtree |
| 7,415,510 B1 | 8/2008 | Kramerich et al. |
| 7,505,621 B1 | 3/2009 | Agrawal et al. |
| 7,530,489 B2 | 5/2009 | Stockton |
| 7,551,755 B1 | 6/2009 | Steinberg et al. |
| 7,587,068 B1 | 9/2009 | Steinberg et al. |
| 7,590,261 B1 | 9/2009 | Mariano et al. |
| 7,606,728 B2 | 10/2009 | Sorensen |
| 7,658,327 B2 | 2/2010 | Tuchman et al. |
| 7,702,132 B2 | 4/2010 | Crabtree |
| 7,711,155 B1 | 5/2010 | Sharma et al. |
| 7,742,623 B1 | 6/2010 | Moon et al. |
| 7,805,333 B2 | 9/2010 | Kepecs |
| 7,848,548 B1 | 12/2010 | Moon et al. |
| 7,873,529 B2 | 1/2011 | Kruger et al. |
| 7,903,141 B1 | 3/2011 | Mariano et al. |
| 7,904,477 B2 | 3/2011 | Jung et al. |
| 7,911,482 B1 | 3/2011 | Mariano et al. |
| 7,912,246 B1 | 3/2011 | Moon et al. |
| 7,921,036 B1 | 4/2011 | Sharma et al. |
| 7,925,549 B2 | 4/2011 | Looney et al. |
| 7,927,213 B2 | 4/2011 | Norton et al. |
| 7,930,204 B1 | 4/2011 | Sharma et al. |
| 7,949,639 B2 | 5/2011 | Hunt et al. |
| 7,957,565 B1 | 6/2011 | Sharma et al. |
| 7,965,866 B2 | 6/2011 | Wang et al. |
| 7,974,869 B1 | 7/2011 | Sharma et al. |
| 7,974,889 B2 | 7/2011 | Raimbeault |
| 7,987,105 B2 | 7/2011 | Mcneill et al. |
| 7,987,111 B1 | 7/2011 | Sharma et al. |
| 8,009,863 B1 | 8/2011 | Sharma et al. |
| 8,010,402 B1 | 8/2011 | Sharma et al. |
| 8,027,521 B1 | 9/2011 | Moon et al. |
| 8,027,864 B2 | 9/2011 | Gilbert |
| 8,095,589 B2 | 1/2012 | Singh et al. |
| 8,098,888 B1 | 1/2012 | Mummareddy et al. |
| 8,160,984 B2 | 4/2012 | Hunt et al. |
| 8,175,908 B1 | 5/2012 | Anderson |
| 8,189,926 B2 | 5/2012 | Sharma et al. |
| 8,207,851 B2 | 6/2012 | Christopher |
| 8,210,939 B2 | 7/2012 | Norton et al. |
| 8,214,246 B2 | 7/2012 | Springfield et al. |
| 8,219,438 B1 | 7/2012 | Moon et al. |
| 8,238,607 B2 | 8/2012 | Wang et al. |
| 8,254,633 B1 | 8/2012 | Moon et al. |
| 8,295,597 B1 | 10/2012 | Sharma et al. |
| 8,325,228 B2 | 12/2012 | Mariadoss |
| 8,325,982 B1 | 12/2012 | Moon et al. |
| 8,340,685 B2 | 12/2012 | Cochran et al. |
| 8,351,647 B2 | 1/2013 | Sharma et al. |
| 8,379,937 B1 | 2/2013 | Moon et al. |
| 8,380,558 B1 | 2/2013 | Sharma et al. |
| 8,401,248 B1 | 3/2013 | Moon et al. |
| 8,412,656 B1* | 4/2013 | Baboo ............... G06Q 30/0201 706/20 |
| 8,433,612 B1 | 4/2013 | Sharma et al. |
| 8,441,351 B2 | 5/2013 | Christopher |
| 8,452,639 B2 | 5/2013 | Abe et al. |
| 8,457,466 B1 | 6/2013 | Sharma et al. |
| 8,462,996 B2 | 6/2013 | Moon et al. |
| 8,472,672 B2 | 6/2013 | Wang et al. |
| 8,489,532 B2 | 7/2013 | Hunt et al. |
| 8,504,598 B2 | 8/2013 | West |
| 8,520,906 B1 | 8/2013 | Moon et al. |
| 8,521,590 B1 | 8/2013 | Hanusch |
| 8,570,376 B1 | 10/2013 | Sharma et al. |
| 8,577,705 B1 | 11/2013 | Baboo et al. |
| 8,589,208 B2 | 11/2013 | Kruger et al. |
| 8,597,111 B2 | 12/2013 | LeMay et al. |
| 8,620,718 B2 | 12/2013 | Varghese et al. |
| 8,660,895 B1 | 2/2014 | Saurabh et al. |
| 8,665,333 B1 | 3/2014 | Sharma et al. |
| 8,694,792 B2 | 4/2014 | Whillock |
| 8,699,370 B2 | 4/2014 | Leung et al. |
| 8,706,544 B1 | 4/2014 | Sharma et al. |
| 8,714,457 B2 | 5/2014 | August et al. |
| 8,719,266 B2 | 5/2014 | West |
| 8,739,254 B2 | 5/2014 | Aaron |
| 8,781,502 B1 | 7/2014 | Middleton et al. |
| 8,781,877 B2 | 7/2014 | Kruger et al. |
| 8,799,098 B2 | 8/2014 | Favish |
| 8,812,344 B1 | 8/2014 | Saurabh et al. |
| 8,830,030 B2 | 9/2014 | Arthurs et al. |
| 8,873,813 B2 | 10/2014 | Tadayon et al. |
| 8,909,542 B2 | 12/2014 | Montero et al. |
| 8,913,791 B2 | 12/2014 | Datta et al. |
| 8,930,134 B2 | 1/2015 | Gu et al. |
| 8,941,735 B2 | 1/2015 | Mariadoss |
| 8,955,001 B2 | 2/2015 | Bhatia et al. |
| 8,978,086 B2 | 3/2015 | Bhatia et al. |
| 8,989,775 B2 | 3/2015 | Shaw |
| 9,003,488 B2 | 4/2015 | Spencer et al. |
| 9,035,771 B2 | 5/2015 | Argue et al. |
| 9,036,028 B2 | 5/2015 | Buehler |
| 9,092,797 B2 | 7/2015 | Perez et al. |
| 9,094,322 B2 | 7/2015 | Brown |
| 9,104,205 B1* | 8/2015 | Caver ............... G05D 1/0278 |
| 9,111,157 B2 | 8/2015 | Christopher |
| 9,124,778 B1 | 9/2015 | Crabtree |
| 9,140,773 B2 | 9/2015 | Oliver |
| 9,165,375 B2 | 10/2015 | Datta et al. |
| 9,177,195 B2 | 11/2015 | Marcheselli et al. |
| 9,740,977 B1* | 8/2017 | Moon ................... G06Q 30/02 |
| 2001/0027564 A1 | 10/2001 | Cowan et al. |
| 2002/0016740 A1 | 2/2002 | Ogasawara |
| 2003/0033190 A1 | 2/2003 | Shan et al. |
| 2003/0212596 A1 | 11/2003 | DiPaolo et al. |
| 2004/0002897 A1 | 1/2004 | Vishik |
| 2004/0111454 A1 | 6/2004 | Sorensen |
| 2004/0176995 A1 | 9/2004 | Fusz |
| 2004/0249848 A1 | 12/2004 | Carlbom et al. |
| 2005/0021397 A1 | 1/2005 | Cui et al. |
| 2005/0096997 A1 | 5/2005 | Jain et al. |
| 2005/0117778 A1 | 6/2005 | Crabtree |
| 2005/0187972 A1 | 8/2005 | Kruger et al. |
| 2005/0246196 A1 | 11/2005 | Frantz et al. |
| 2005/0288954 A1 | 12/2005 | Mccarthy et al. |
| 2006/0010028 A1 | 1/2006 | Sorensen |
| 2006/0069585 A1 | 3/2006 | Springfield et al. |
| 2006/0074769 A1 | 4/2006 | Looney et al. |
| 2006/0080265 A1 | 4/2006 | Hinds et al. |
| 2006/0085255 A1 | 4/2006 | Hastings et al. |
| 2006/0089837 A1 | 4/2006 | Adar et al. |
| 2006/0229996 A1 | 10/2006 | Keithley et al. |

(56) References Cited

U.S. PATENT DOCUMENTS

| | | |
|---|---|---|
| 2006/0293921 A1 | 12/2006 | Mccarthy et al. |
| 2007/0015569 A1 | 1/2007 | Norton et al. |
| 2007/0122002 A1 | 5/2007 | Crabtree |
| 2007/0138268 A1 | 6/2007 | Tuchman |
| 2007/0156515 A1 | 7/2007 | Hasselback et al. |
| 2007/0182818 A1 | 8/2007 | Buehler |
| 2007/0239871 A1 | 10/2007 | Kaskie |
| 2007/0282681 A1 | 12/2007 | Shubert et al. |
| 2008/0004892 A1 | 1/2008 | Zucker |
| 2008/0042836 A1 | 2/2008 | Christopher |
| 2008/0109397 A1 | 5/2008 | Sharma et al. |
| 2008/0159634 A1 | 7/2008 | Sharma et al. |
| 2008/0172282 A1 | 7/2008 | Mcneill et al. |
| 2008/0201198 A1 | 8/2008 | Louviere et al. |
| 2008/0249870 A1* | 10/2008 | Angell ............... G06Q 30/02 705/14.53 |
| 2008/0263000 A1 | 10/2008 | West et al. |
| 2008/0263065 A1 | 10/2008 | West |
| 2008/0270363 A1 | 10/2008 | Hunt et al. |
| 2008/0288209 A1 | 11/2008 | Hunt et al. |
| 2008/0288522 A1 | 11/2008 | Hunt et al. |
| 2008/0288538 A1 | 11/2008 | Hunt et al. |
| 2008/0288889 A1 | 11/2008 | Hunt et al. |
| 2008/0294372 A1 | 11/2008 | Hunt et al. |
| 2008/0294583 A1 | 11/2008 | Hunt et al. |
| 2008/0294996 A1 | 11/2008 | Hunt et al. |
| 2008/0318591 A1 | 12/2008 | Oliver |
| 2008/0319829 A1 | 12/2008 | Hunt et al. |
| 2009/0006309 A1 | 1/2009 | Hunt et al. |
| 2009/0006490 A1 | 1/2009 | Hunt et al. |
| 2009/0006788 A1 | 1/2009 | Hunt et al. |
| 2009/0010490 A1 | 1/2009 | Wang et al. |
| 2009/0012971 A1 | 1/2009 | Hunt et al. |
| 2009/0018996 A1 | 1/2009 | Hunt et al. |
| 2009/0037412 A1 | 2/2009 | Bard et al. |
| 2009/0046201 A1 | 2/2009 | Kastilahn et al. |
| 2009/0097706 A1 | 4/2009 | Crabtree |
| 2009/0158309 A1 | 6/2009 | Moon et al. |
| 2009/0198507 A1 | 8/2009 | Rhodus |
| 2010/0020172 A1 | 1/2010 | Mariadoss |
| 2010/0331010 A1* | 12/2010 | Ische ............... G01S 5/0257 455/456.1 |
| 2011/0022312 A1 | 1/2011 | McDonough et al. |
| 2011/0093324 A1 | 4/2011 | Fordyce, III et al. |
| 2011/0125551 A1 | 5/2011 | Peiser |
| 2011/0137924 A1 | 6/2011 | Hunt et al. |
| 2011/0151967 A1 | 6/2011 | Norton et al. |
| 2011/0169917 A1 | 7/2011 | Stephen et al. |
| 2011/0238471 A1 | 9/2011 | Trzcinski |
| 2011/0246284 A1 | 10/2011 | Chaikin et al. |
| 2011/0252015 A1 | 10/2011 | Bard et al. |
| 2011/0286633 A1 | 11/2011 | Wang et al. |
| 2012/0041767 A1 | 2/2012 | Hoffman et al. |
| 2012/0078675 A1 | 3/2012 | Mcneill et al. |
| 2012/0078700 A1 | 3/2012 | Pugliese et al. |
| 2012/0150587 A1 | 6/2012 | Kruger et al. |
| 2012/0158460 A1 | 6/2012 | Kruger et al. |
| 2012/0163206 A1 | 6/2012 | Leung et al. |
| 2012/0173472 A1 | 7/2012 | Hunt et al. |
| 2012/0239504 A1 | 9/2012 | Curlander |
| 2012/0249325 A1 | 10/2012 | Christopher |
| 2012/0254718 A1 | 10/2012 | Nayar et al. |
| 2012/0314905 A1 | 12/2012 | Wang et al. |
| 2012/0316936 A1 | 12/2012 | Jacobs |
| 2012/0323682 A1 | 12/2012 | Shanbhag et al. |
| 2012/0331561 A1 | 12/2012 | Broadstone et al. |
| 2013/0014138 A1 | 1/2013 | Bhatia et al. |
| 2013/0014145 A1 | 1/2013 | Bhatia et al. |
| 2013/0014146 A1 | 1/2013 | Bhatia et al. |
| 2013/0014153 A1 | 1/2013 | Bhatia et al. |
| 2013/0014158 A1 | 1/2013 | Bhatia et al. |
| 2013/0019258 A1 | 1/2013 | Bhatia et al. |
| 2013/0019262 A1 | 1/2013 | Bhatia et al. |
| 2013/0035985 A1 | 2/2013 | Gilbert |
| 2013/0041837 A1 | 2/2013 | Dempski et al. |
| 2013/0063556 A1 | 3/2013 | Russell et al. |
| 2013/0091001 A1 | 4/2013 | Jia et al. |
| 2013/0110676 A1 | 5/2013 | Kobres |
| 2013/0014485 A1 | 6/2013 | Reynolds |
| 2013/0151311 A1 | 6/2013 | Smallwood et al. |
| 2013/0182114 A1 | 7/2013 | Zhang et al. |
| 2013/0182904 A1 | 7/2013 | Zhang et al. |
| 2013/0184887 A1 | 7/2013 | Ainsley et al. |
| 2013/0185645 A1 | 7/2013 | Fisk et al. |
| 2013/0197987 A1 | 8/2013 | Doka et al. |
| 2013/0218677 A1 | 8/2013 | Yopp et al. |
| 2013/0222599 A1 | 8/2013 | Shaw |
| 2013/0225199 A1 | 8/2013 | Shaw |
| 2013/0226539 A1 | 8/2013 | Shaw |
| 2013/0226655 A1 | 8/2013 | Shaw |
| 2013/0138498 A1 | 9/2013 | Raghavan |
| 2013/0231180 A1 | 9/2013 | Kelly et al. |
| 2013/0236058 A1 | 9/2013 | Wang et al. |
| 2013/0271598 A1 | 10/2013 | Mariadoss |
| 2013/0293355 A1 | 11/2013 | Christopher |
| 2013/0294646 A1 | 11/2013 | Shaw |
| 2013/0311332 A1 | 11/2013 | Favish |
| 2013/0314505 A1 | 11/2013 | Stephen et al. |
| 2013/0317916 A1* | 11/2013 | Gopalakrishnan ............... G06Q 30/0261 705/14.66 |
| 2013/0317950 A1 | 11/2013 | Abraham et al. |
| 2014/0019178 A1 | 1/2014 | Kortum et al. |
| 2014/0019300 A1 | 1/2014 | Sinclair |
| 2014/0032269 A1 | 1/2014 | West |
| 2014/0079282 A1 | 3/2014 | Marcheselli et al. |
| 2014/0079297 A1 | 3/2014 | Tadayon et al. |
| 2014/0095260 A1 | 4/2014 | Weiss et al. |
| 2014/0164179 A1 | 6/2014 | Geisinger et al. |
| 2014/0172557 A1 | 6/2014 | Eden et al. |
| 2014/0172627 A1 | 6/2014 | Levy et al. |
| 2014/0173641 A1 | 6/2014 | Bhatia et al. |
| 2014/0173643 A1 | 6/2014 | Bhatia et al. |
| 2014/0195302 A1 | 7/2014 | Yopp et al. |
| 2014/0195380 A1 | 7/2014 | Jamtgaard et al. |
| 2014/0201126 A1 | 7/2014 | Zadeh et al. |
| 2014/0210621 A1 | 7/2014 | Argue et al. |
| 2014/0219118 A1 | 8/2014 | Middleton et al. |
| 2014/0222503 A1 | 8/2014 | Vijayaraghavan et al. |
| 2014/0222573 A1 | 8/2014 | Middleton et al. |
| 2014/0222685 A1 | 8/2014 | Middleton et al. |
| 2014/0229616 A1 | 8/2014 | Leung et al. |
| 2014/0233852 A1 | 8/2014 | Lee |
| 2014/0253732 A1 | 9/2014 | Brown et al. |
| 2014/0258939 A1 | 9/2014 | Schafer et al. |
| 2014/0278967 A1 | 9/2014 | Pal et al. |
| 2014/0283136 A1 | 9/2014 | Dougherty et al. |
| 2014/0285660 A1* | 9/2014 | Jamtgaard ............ H04W 4/029 348/143 |
| 2014/0031923 A1 | 10/2014 | Vemana |
| 2014/0294231 A1 | 10/2014 | Datta et al. |
| 2014/0351835 A1 | 11/2014 | Orlowski |
| 2014/0358640 A1 | 12/2014 | Besehanic et al. |
| 2014/0358661 A1 | 12/2014 | Or et al. |
| 2014/0358742 A1 | 12/2014 | Achan et al. |
| 2014/0372176 A1 | 12/2014 | Fusz |
| 2014/0379480 A1 | 12/2014 | Rao et al. |
| 2014/0379524 A1 | 12/2014 | Grimaud et al. |
| 2015/0006358 A1 | 1/2015 | Oshry et al. |
| 2015/0012337 A1 | 1/2015 | Kruger et al. |
| 2015/0019373 A1 | 1/2015 | Carbonell et al. |
| 2015/0025936 A1 | 1/2015 | Garel et al. |
| 2015/9925936 | 1/2015 | Garel et al. |
| 2015/0055830 A1 | 2/2015 | Datta et al. |
| 2015/0058049 A1 | 2/2015 | Shaw |
| 2015/0062338 A1 | 3/2015 | Mariadoss |
| 2015/0078658 A1 | 3/2015 | Lee |
| 2015/0081704 A1 | 3/2015 | Hannan et al. |
| 2015/0106190 A1 | 4/2015 | Wang et al. |
| 2015/0154312 A1 | 6/2015 | Tilwani et al. |
| 2015/0154534 A1 | 6/2015 | Tilwani et al. |
| 2015/0181387 A1 | 6/2015 | Shaw |
| 2015/0199627 A1 | 7/2015 | Gould et al. |
| 2015/0220951 A1 | 8/2015 | Kurapati et al. |

(56) References Cited

U.S. PATENT DOCUMENTS

| | | |
|---|---|---|
| 2015/0220999 A1 | 8/2015 | Thornton et al. |
| 2015/0221094 A1 | 8/2015 | Marcheselli et al. |
| 2015/0235237 A1 | 8/2015 | Shaw et al. |
| 2015/0244992 A1 | 8/2015 | Buehler |
| 2015/0269609 A1 | 9/2015 | Mehanian et al. |
| 2015/0294482 A1 | 10/2015 | Stephen et al. |
| 2015/0310447 A1 | 10/2015 | Shaw |
| 2015/0334469 A1 | 11/2015 | Bhatia et al. |
| 2015/0363798 A1 | 12/2015 | Aihara et al. |

FOREIGN PATENT DOCUMENTS

| | | |
|---|---|---|
| EP | 1943628 | 3/2011 |
| WO | 2004/027556 | 4/2004 |
| WO | 2006/029681 | 3/2006 |
| WO | 2007/030168 | 3/2007 |
| WO | 2011/005072 | 1/2011 |
| WO | 2012/061574 | 10/2012 |
| WO | 2015/010086 | 1/2015 |

OTHER PUBLICATIONS

J. Okamura, "Global Cross Channel Retailing Report," Ebeltoft USA / Okamura Consulting, 38 pages.
Verde Group, "Understanding the Multi-Channel Shopper," 6 pages.
IAB, "Targeting Local Markets: An IAB Interactive Advertising Guide," http://www.iab.net/local_committee, Sep. 2010, 18 pages.
S. Clifford and Q. Hardy, "Attention, Shoppers: Store Is Tracking Your Cell," The New York Times, http://www.nytimes.com/2013/07/15/business/attention-shopper-stores-are-tracking-your-cell.html, Jul. 14, 2013, 5 pages.
"Aerohive and Euclid Retail Analytics," Partner Solution Brief, Aerohive Networks and Euclid, 2013, 9 pages.

\* cited by examiner

Shopper Profile Data 300

Shopper ID Vector (SIV) 301
Global ID Vector
Local ID Vector (i.e., unique within a single visit to a particular location)

Shopper Segment Data (SSD) 302
Physical segment data
Behavioral segment data

Shopper Behavior Dataset (SBD) 303
Shopper metrics
A list of *TripVector* for each visit
    Physical attributes
    Contextual attributes
    PoS data
    Retail location

CATEGORY A AT LOCATION L1 REPRESENTED BY POLYGON 1
CATEGORY B AT LOCATION L2 REPRESENTED BY POLYGON 2
CATEGORY C AT LOCATION L3 REPRESENTED BY POLYGON 3
CATEGORY D AT LOCATION L4 REPRESENTED BY POLYGON 4
CATEGORY E AT LOCATION L5 REPRESENTED BY POLYGON 5

622

SHOPPING TRIP 1 PATH
  – (X11, Y11, T1), (X12, Y12M T2), ..., (X1N, Y1N, TN)
SHOPPING TRIP 2 PATH
  – (X21, Y21, T1), (X22, Y22M T2), ..., (X2N, Y2N, TN)

⋮

SHOPPING TRIP K PATH
  – (XK1, YK1, T1), (XK2, YK2M T2), ..., (XKN, YKN, TN)

623

SHOPPING TRIP 1 SEQUENCE – ACEA
SHOPPING TRIP 2 SEQUENCE – CDE

⋮

SHOPPING TRIP K SEQUENCE – AC

FIG. 33

| 4 AT A TIME | | 3 AT A TIME | | 2 AT A TIME | |
|---|---|---|---|---|---|
| GROUP | % OF CO-OCCURRENCES | GROUP | % OF CO-OCCURRENCES | GROUP | % OF CO-OCCURRENCES |
| ABCD | 0.01 | ABC | 0.06 | AB | 0.10 |
| ABCE | 0.03 | ABD | 0.03 | AC | 0.15 |
| ABDE | 0.04 | ABE | 0.02 | AD | 0.35 |
| ACDE | 0.01 | ACD | 0.04 | AE | 0.10 |
| BCDE | 0.02 | ACE | 0.01 | BC | 0.45 |
|  |  | ADE | 0.20 | BD | 0.10 |
|  |  | BCD | 0.05 | BE | 0.01 |
|  |  | BCE | 0.01 | CD | 0.05 |
|  |  | BDE | 0.02 | CE | 0.06 |
|  |  | CDE | 0.03 | DE | 0.10 |

FIG. 34

| 4 AT A TIME | | 3 AT A TIME | | 2 AT A TIME | |
|---|---|---|---|---|---|
| GROUP | % OF CO-OCCURRENCES | GROUP | % OF CO-OCCURRENCES | GROUP | % OF CO-OCCURRENCES |
| ABDE | 0.04 | ADE | 0.20 | BC | 0.45 |
| ABCE | 0.03 | ABC | 0.06 | AD | 0.35 |
| BCDE | 0.02 | BCD | 0.05 | AC | 0.15 |
| ABCD | 0.01 | ACD | 0.04 | AB | 0.10 |
| ACDE | 0.01 | ABD | 0.03 | AE | 0.10 |
| | | CDE | 0.03 | BD | 0.10 |
| | | ABE | 0.02 | DE | 0.10 |
| | | BDE | 0.02 | CE | 0.06 |
| | | ACE | 0.01 | CD | 0.05 |
| | | BCE | 0.01 | BE | 0.01 |

FIG. 35

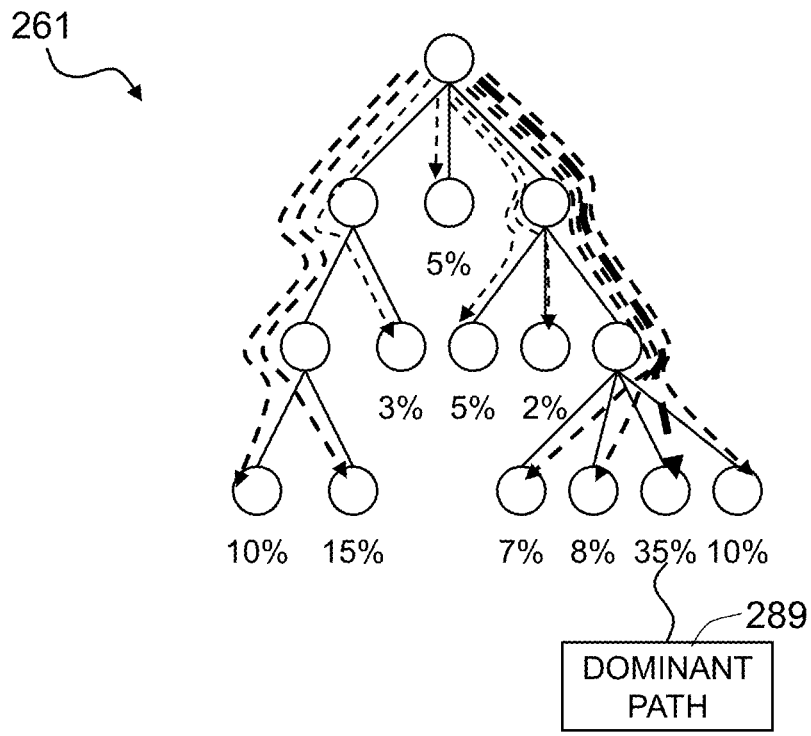
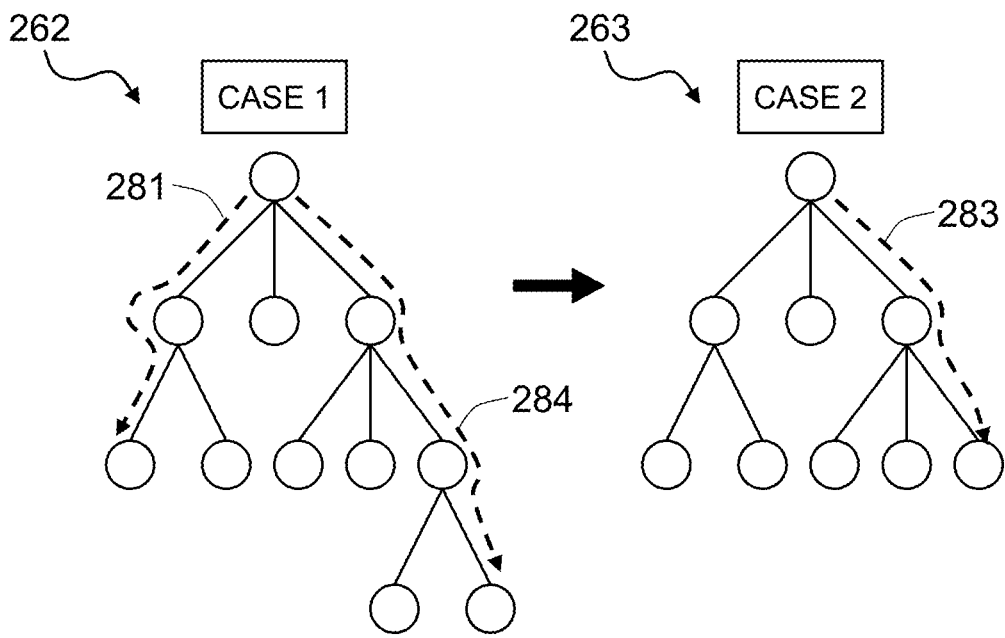
FIG. 38

PERSONALIZED DECISION TREE BASED ON IN-STORE BEHAVIOR ANALYSIS

BACKGROUND OF THE INVENTION

Field of the Invention

The present invention is a method and system for determining the hierarchical purchase decision process (consumer decision trees) of an individual shopper in front of a product category (a set of products that meet the same need of the shopper), which is organized in a coordinate system either as brand or product attribute blocks, in a particular retail store and across many retail stores in a geographic area, wherein shopping consideration and the decision path of the shopper is obtained by combining behavioral data with the category layout and transactional data.

Background of the Invention

Manufacturers have been developing consumer decision trees (CDT) for several years. Traditional approaches for developing CDTs—household panel purchase data, ethnography, and shop-alongs—have clear drawbacks, since they are either based on the consumer's interpretation of the purchase decision process or a human observer's point of view on the decision process, providing limited understanding of the actual behavior. Therefore a need exists to address these limitations by unobtrusively capturing actual purchase behavior in front of the category from massive samples of shoppers—all consumers who shop the category in a specific time period—providing objectivity and precision not achievable through other data collection methods. Further, while marketing to a particular group of shoppers based on aggregated behavior is useful, there is a need to refine the targeting of messages to a particular shopper, requiring personalized decision trees (PDT). In this way the message can be delivered to the shopper based on that particular shopper's behavior, previous purchases, channel choices, and decision process.

SUMMARY

A method and system for generating a personalized decision tree based on in-store shopper behavior analysis utilizing a plurality of sensors, and using at least a processor for the analysis comprising the steps of capturing a plurality of input images of a shopper at a retail location using a plurality of cameras, capturing a data stream from a mobile device carried by the shopper using at least a mobile signal sensor, tracking the shopper's movements through the retail location using the plurality of input images, the data stream, and a Shopper Behavior Tracker module, analyzing the behavior of the shopper using the plurality of input images, measuring decision activities of the shopper in the retail location tied to a product category based on the behavior analysis, and populating a cross-channel shopper database with a set of shopper profile data created by accumulating the decision activities of the shopper, wherein the accumulation of decision activities occurs during a plurality of shopping trips by the shopper, wherein the plurality of shopping trips by the shopper occur at a single retail location or across multiple retail locations in a geographic area, constructing the personalized decision tree using a Personalized Decision Tree Construction module, and wherein the decision activities of the shopper are measured based on the purchase behavior of the shopper comprising interaction with a plurality of products and travel paths to a plurality of product categories.

In an exemplary embodiment, presented is a method and system for determining the hierarchical purchase decision process (personalized decision trees) of a shopper in front of a product category (a set of products that meet the same need of shoppers) over time, which is organized in a coordinate system either as brand or product attribute blocks, in a retail store or across multiple retail stores (cross-channel). Shopping consideration and the decision path of the shopper is obtained by combining longitudinal behavior data with the category layout and transaction data.

The hierarchical decision process is determined based on observed actual in-store purchase behavior using a set of video cameras, wireless sensors, and processor-implemented instructions for extracting the sequence and timing of each of the shopper's decision processes (multi-sensor analysis). The cameras can include both top-down video cameras, as well as cameras positioned at the shelf, to capture the decision process, including gaze analysis and eye tracking.

In another exemplary embodiment, semi-automated data annotation approaches can also be utilized to determine the sequence, timing, and shopper's point of focus in the coordinate system. Overall, the hierarchical decision process of a shopper in front of a category can be determined, based on spatiotemporal information using the multi-sensor analytics technology. This aggregated shopper behavior data can be combined with transaction data to provide a holistic picture of the purchase decision process.

The hierarchical decision process, obtained by clustering of shopper behavior data over time, can not only identify the sequence or order of the decisions but can also quantify the volume of shopping trips at each level in the decision process, thus determining the relative importance of each product group. The frequency of cross-comparisons between product groups can not only help to determine the category structure, but can also provide a deeper understanding of product distinction and substitutability between a set of products. Moreover, the decisions of a shopper for each product group can be captured very clearly down to the product attribute level. Such in-depth understanding can provide an accurate picture of the relative importance of each product attribute, such as flavor, size, retail channel, and price, in the purchase decision process.

The exemplary embodiment can also quantify the amount of time spent by a shopper for making each decision, thereby determining the relative importance or the complexity. Combining this information with the hierarchical decision process, retailers and manufacturers can evaluate whether or not the coordinate layout of the category matches the needs and the decision process of shoppers.

The exemplary embodiment can provide further granularity by determining the hierarchical decision process of shoppers, in aggregate, by demographic groups—gender, age-range, and ethnicity—as well as by need states and occasions. Such granular understanding of the decision process for each shopper segment will help both retailers and manufacturers to customize the category layout for their key segment(s), thereby providing a more convenient and enjoyable shopping experience.

Therefore, in a preferred embodiment, it is an objective to build a personalized decision tree based on the observation of in-store behavior by measuring a set of shopper behavior metrics. The embodiment can capture a plurality of input images of a shopper by at least a camera in a store area. The plurality of input images can be processed in order to analyze the behavior of the shopper with regard to the decision activity of the shopper, over time (i.e., multiple shopping trips), tied to the category based on the behavior analysis. A plurality of datasets can be constructed by accumulating the decision activities over time, at the same retail location or multiple locations in a geographic area. The decision is measured based on the actual purchase behavior of the shopper, like interaction with the products and travel paths to categories, as opposed to using intercepts or panels to develop them.

In another preferred embodiment, it is an objective of the embodiment to use an automatic behavior measurement, including shopping paths and interaction with the products, to observe the decision processes and construct the decision trees of a shopper, without involving the shopper's participation and obtrusive interception. Therefore, the gathered data can reflect the true state of the shopper's actual decision made at the point of purchase. The embodiment can objectively capture purchase behavior from a large volume of shopping trips without intruding on the shopper's decision process, thus the gathered data is unbiased.

In the preferred embodiment, the decision behavior can be an observable behavior by automatic multi-sensor analysis. Using the exhibited behavior, such as the shopping path, browsing activity for a product, or interaction with a product, the decision tree can be calculated to identify the hierarchical decision process. Based on the observed path of the shopper (trajectory) and the associated product data in the space of travel, it can be known what the person did vs. did not do. In addition, the observable behaviors can also be associated with the sales data of the products that are located where the shopper's behaviors are measured. Examples of the observable behaviors can include time of interaction, pre-interaction (like prior location of visit), exposure to the product display and attributes, and sensory activity behavior to make decisions.

In another exemplary embodiment, a semi-automated method to compute the decision tree to identify behaviors that cannot be automatically observed by the technology or to identify granular details of shopper interaction with the product, like comparing brands, may be integrated. This semi-automated method can complement other data sources, like in-store intercepts, planograms, and point-of-sale data. However, it is important to note that this semi-automated method is not the preferred embodiment of the present invention, and it is another objective to use the semi-automated method only as a complementary method to the automated method in the preferred embodiment of the present invention.

The personalized decision tree can be used to provide targeted messaging to shoppers based on the results of each shopper's calculated decision tree. The personalization of advertising, promotions, and other messaging can greatly enhance the value of the messages delivered since they can be customized for each individual shopper's behavior, previous purchases, channel choices, and decision process. The messaging can be delivered via mobile device, digital or printed signage, at the Point of Sale, or other means of message delivery.

DRAWINGS—FIGURES

FIG. 5 shows the data components that can comprise the Shopper Profile Data.

Figure 14A:
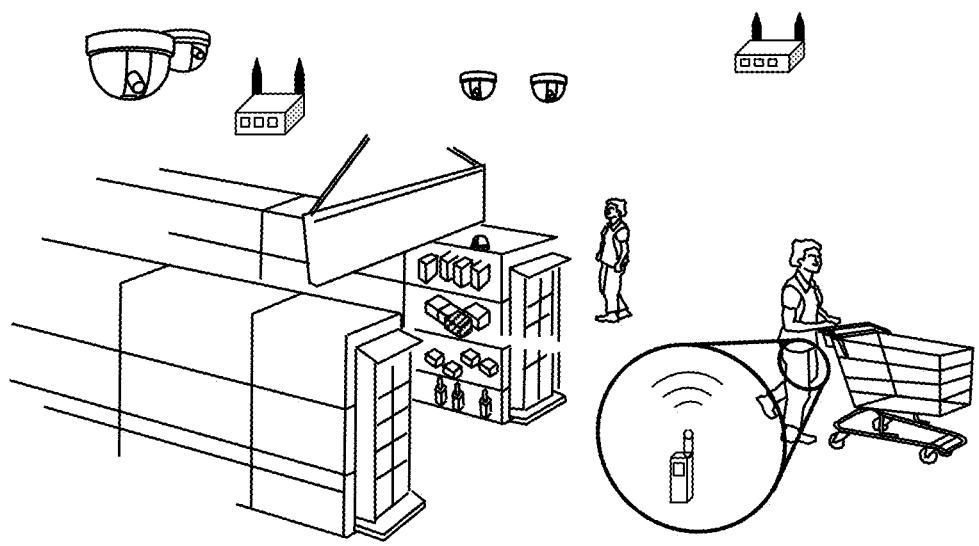
Figure 14B:
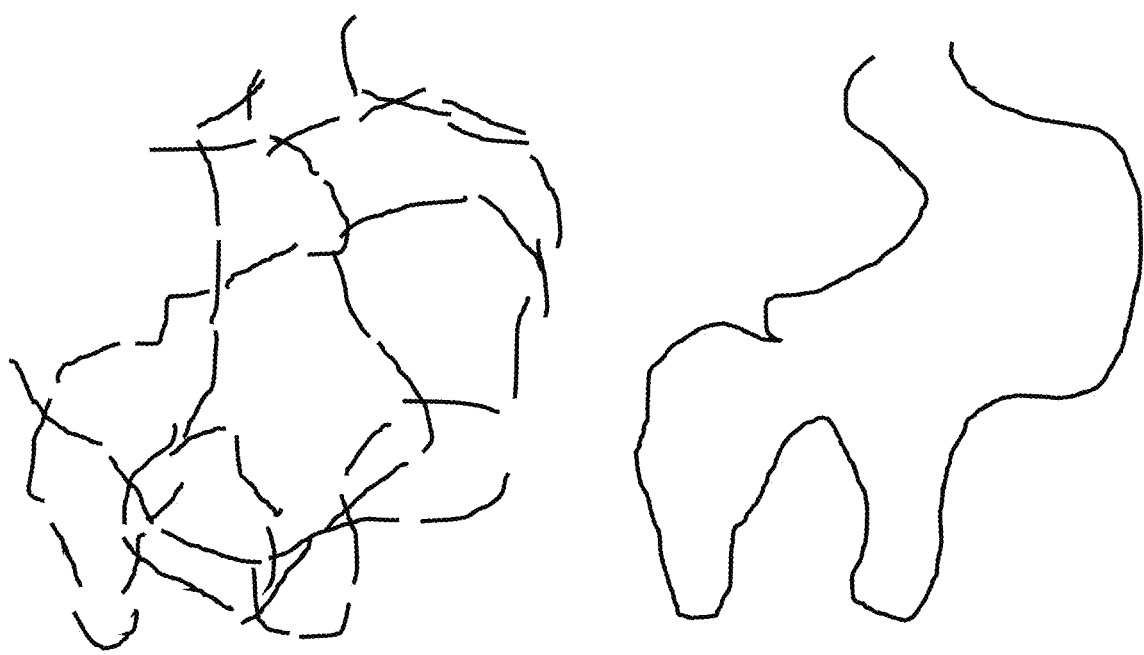
Figure 14C:
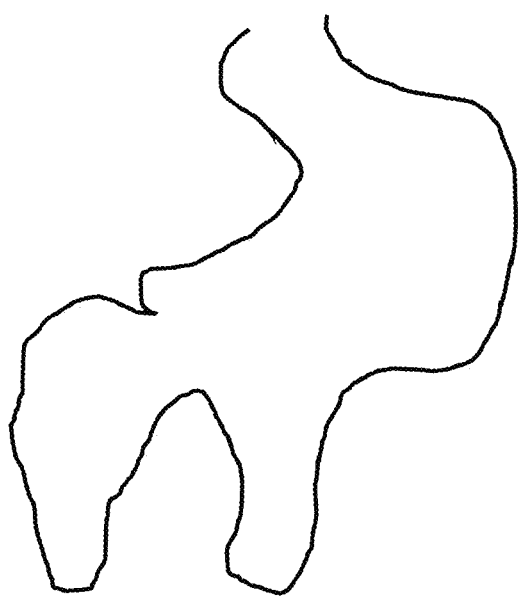

FIG. 14A-C show an example of person tracking and the resulting vision and Wi-Fi trajectories.

Figure 15:
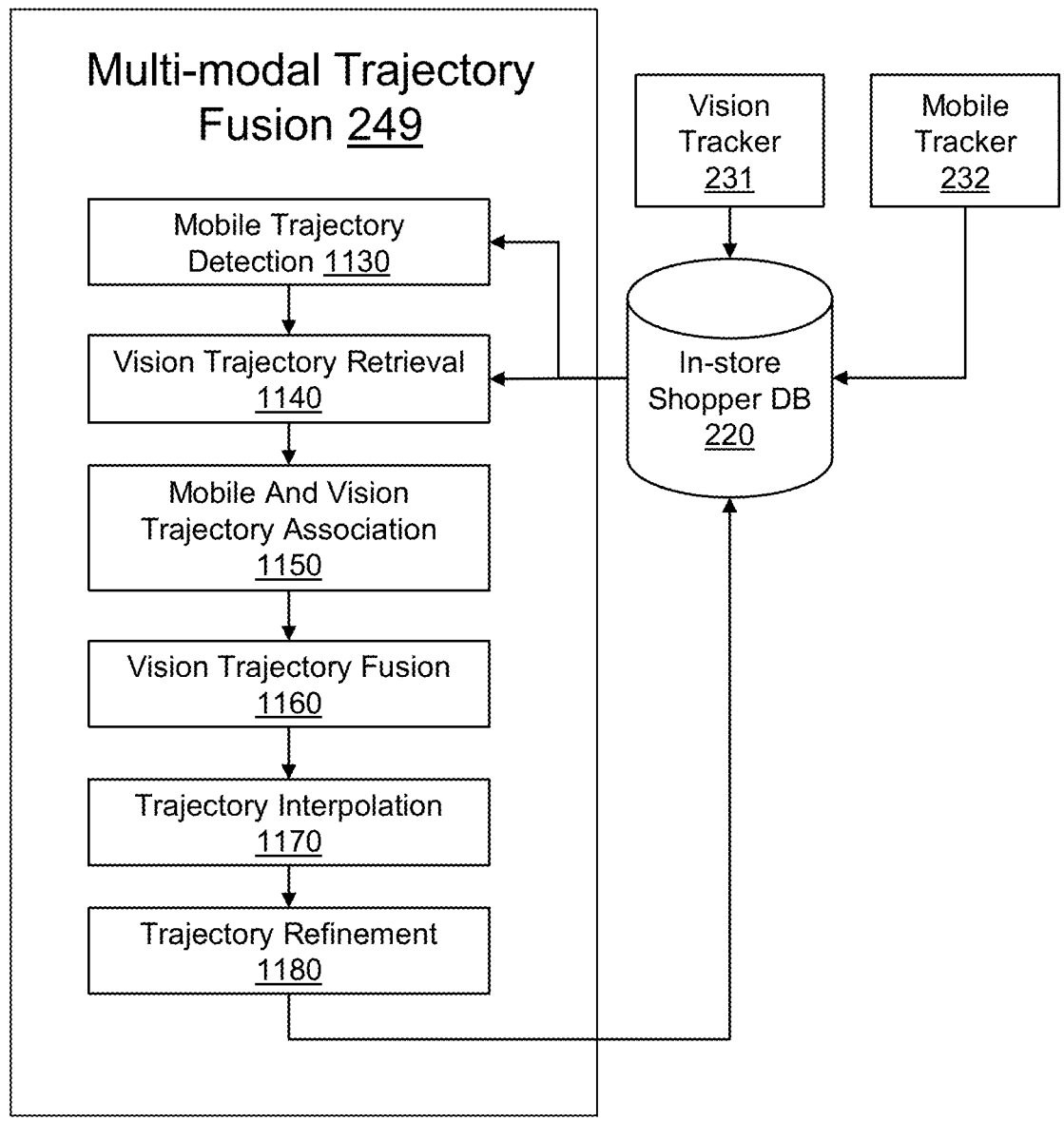

FIG. 15 shows an example block flow diagram of the Multi-Modal Trajectory Fusion module.

FIG. 16A-D show an example of the multi-modal trajectory fusion process for vision and Wi-Fi trajectories.

Figure 17:
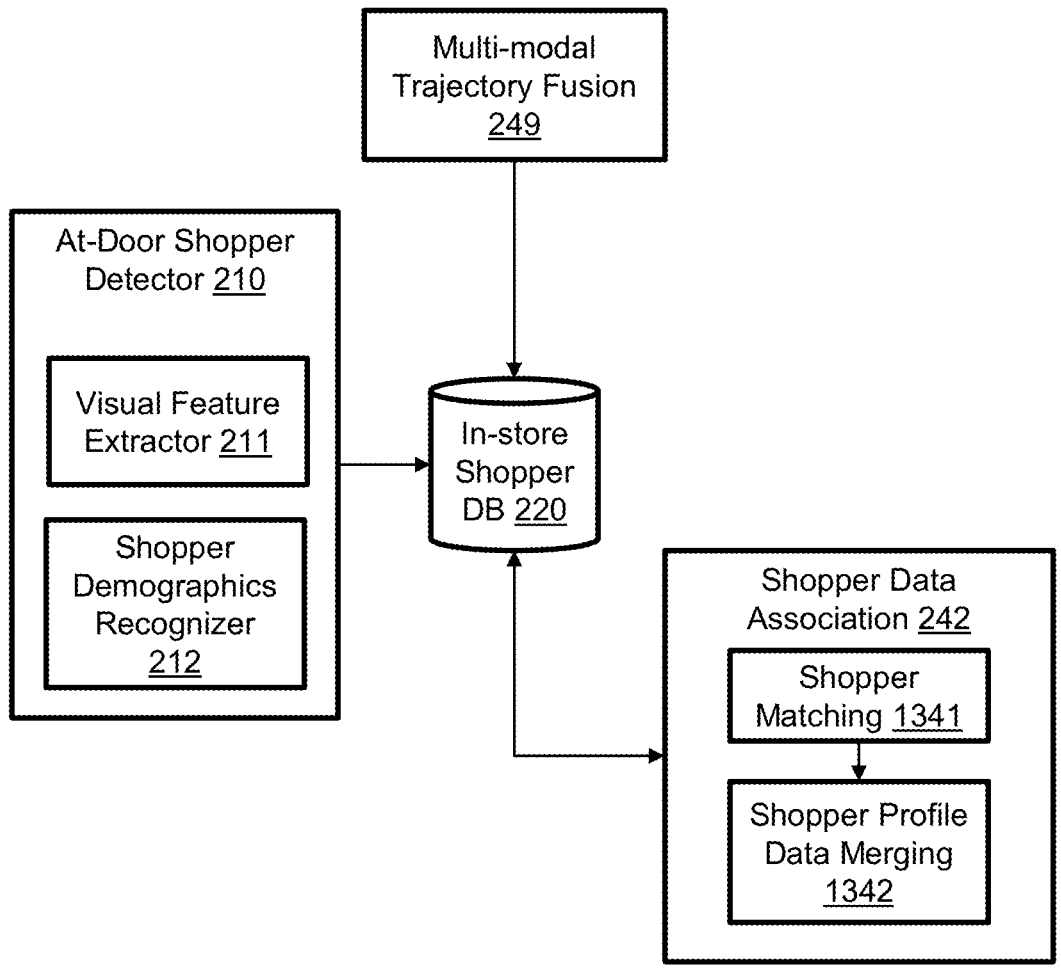

FIG. 17 shows an example block flow diagram of the Shopper Data Association module.

Figure 18:
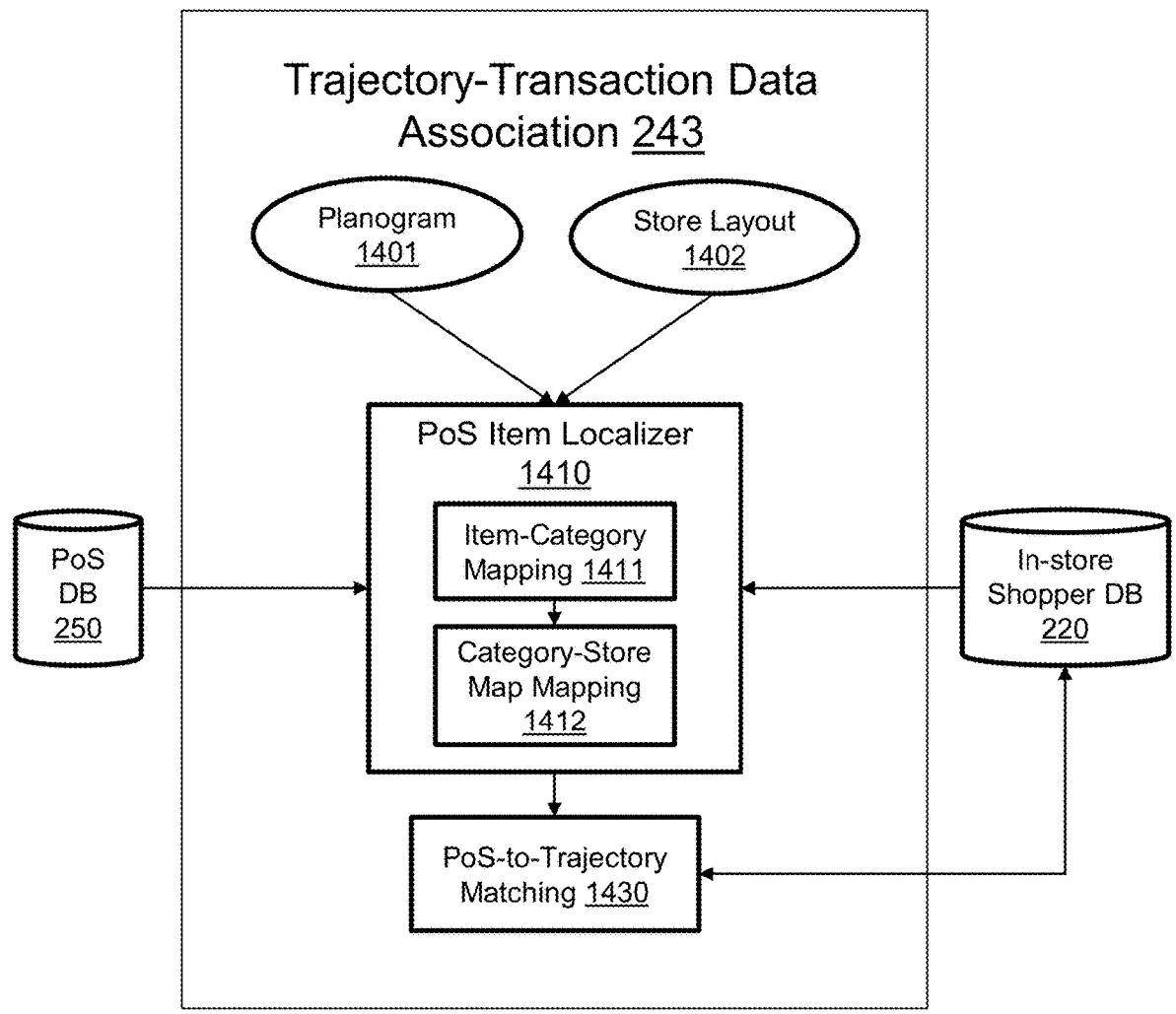

FIG. 18 shows an example block flow diagram of the Trajectory-Transaction Data Association module.

Figure 19:
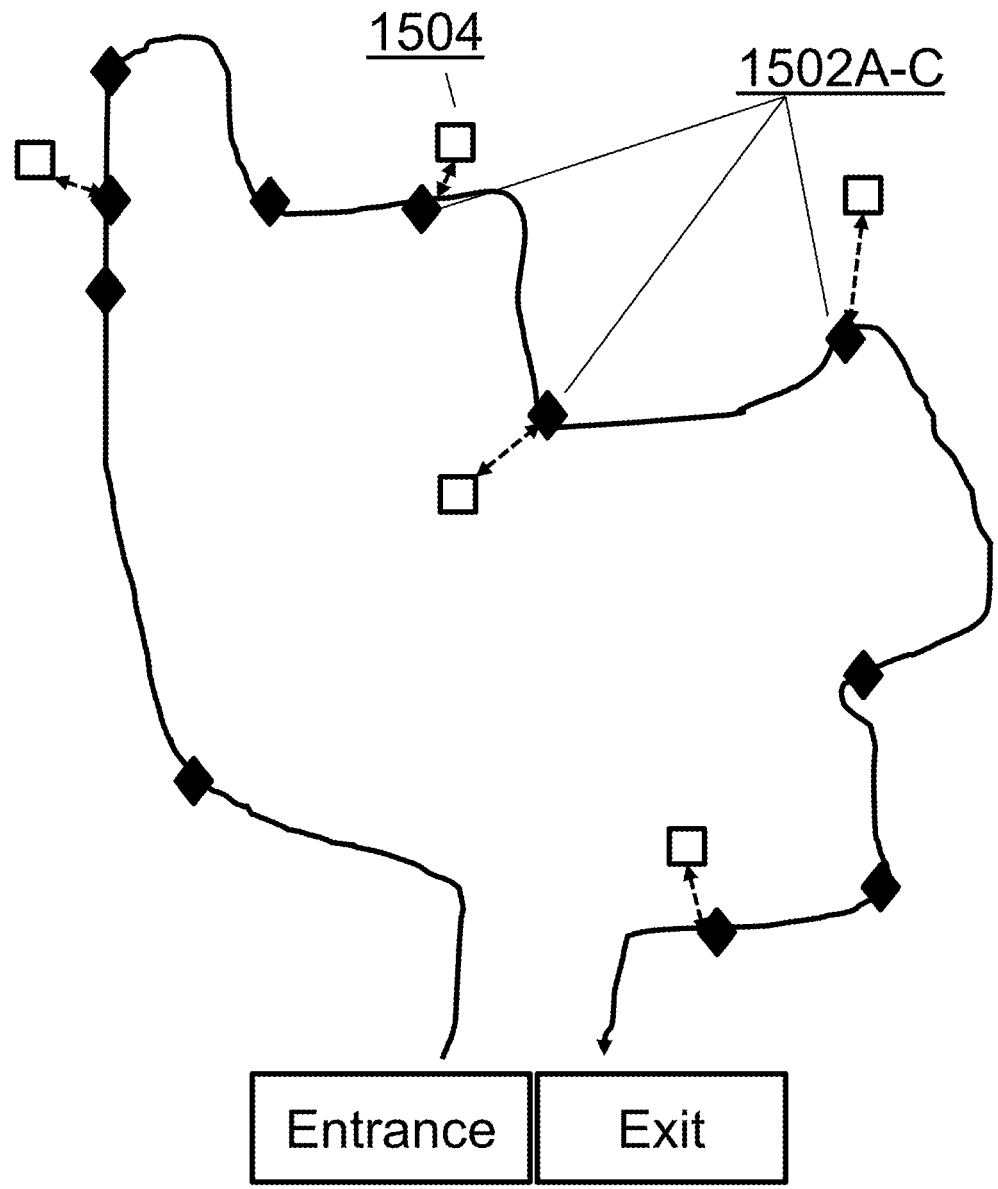

FIG. 19 shows a preferred embodiment of a method to associate transaction log data with a fused trajectory.

Figure 20:
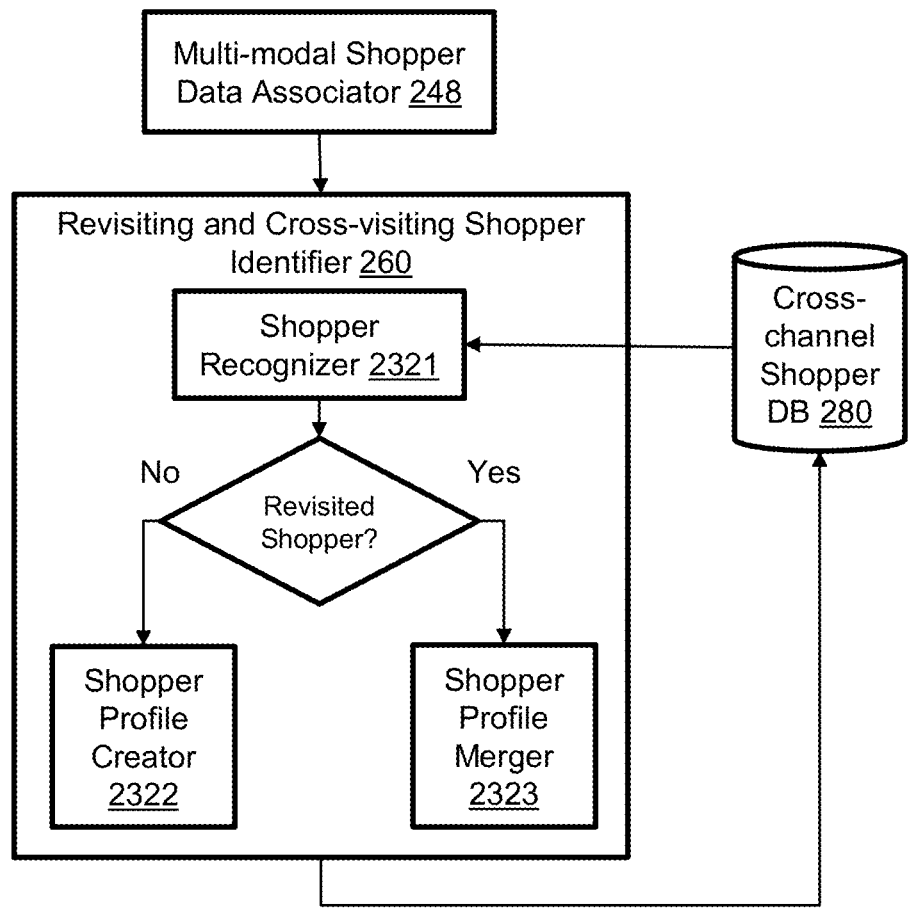

FIG. 20 shows an example block flow diagram of the Revisiting and Cross-visiting Shopper Identifier module.

Figure 21:
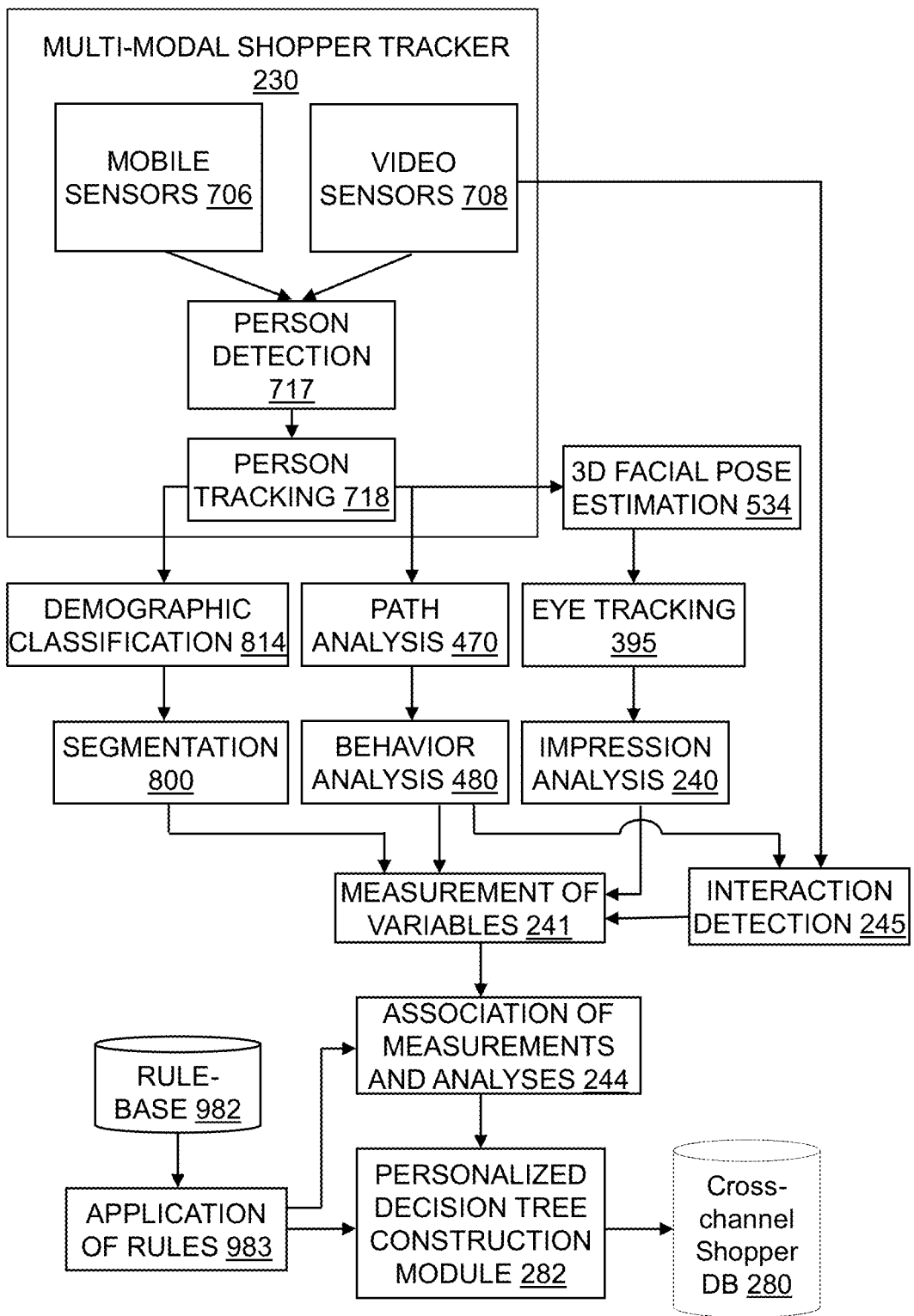

FIG. 21 shows exemplary processes for the measurement of a shopper's decisions with regard to product categories, in which computer vision-based behavior analysis and segmentation measurement are associated.

Figure 22:
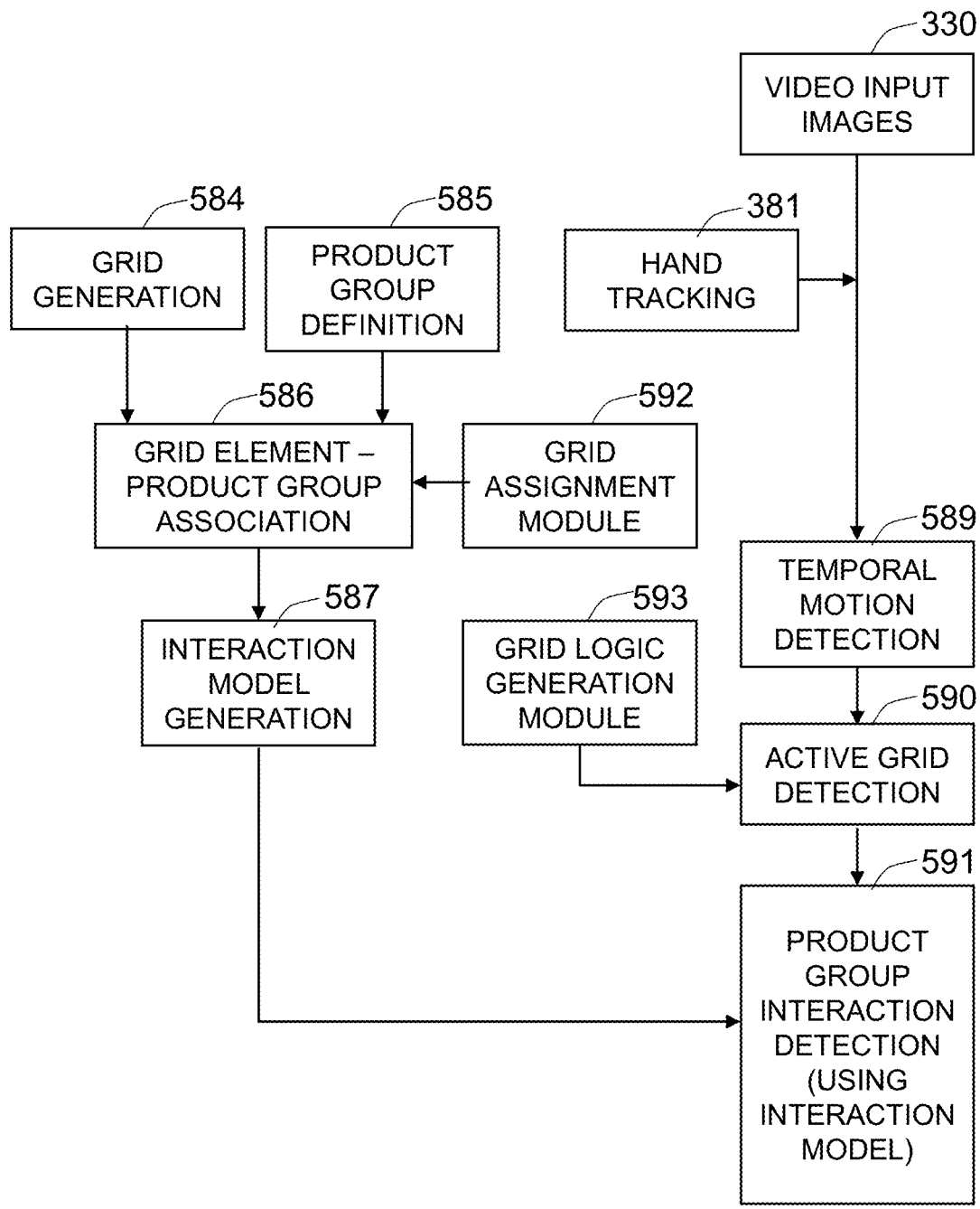

FIG. 22 shows an exemplary setup phase and interaction detection process for the subcategories in a category, where the subcategories are defined at the product group level.

Figure 23:
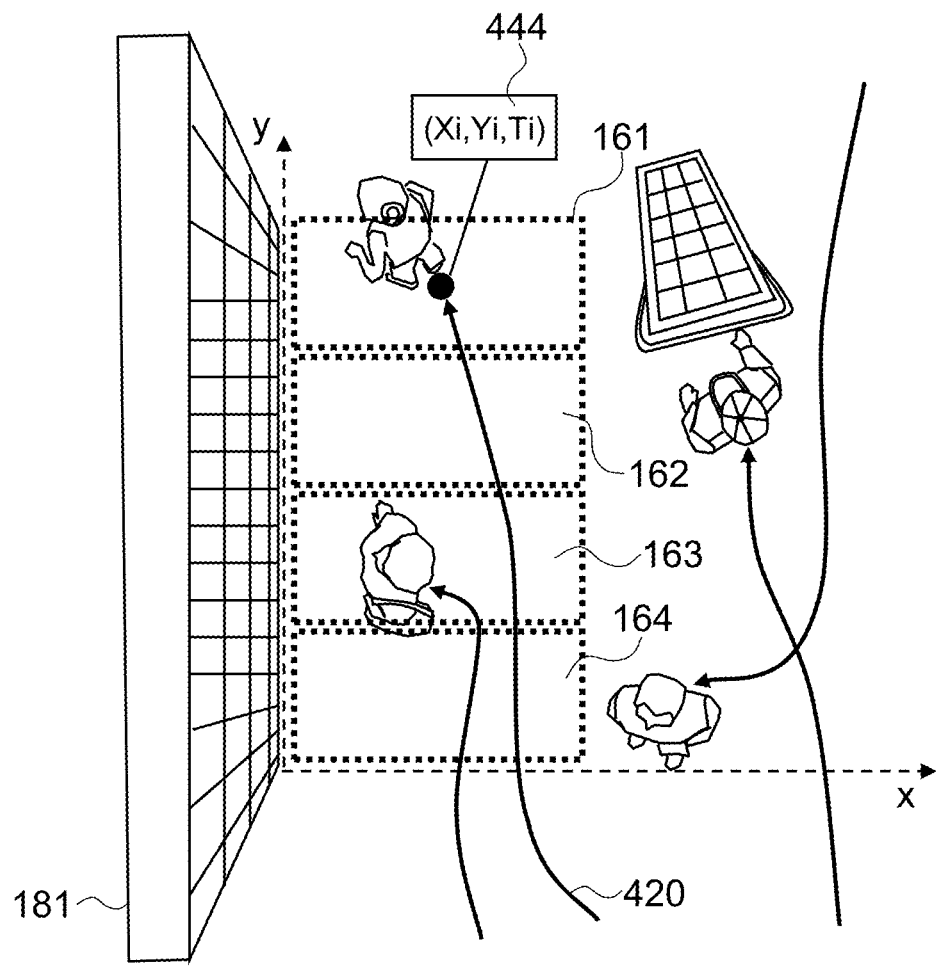

FIG. 23 shows an exemplary view from a top-down camera, where the shopper's movements through a store area are observed based on the tracking information.

Figure 24:
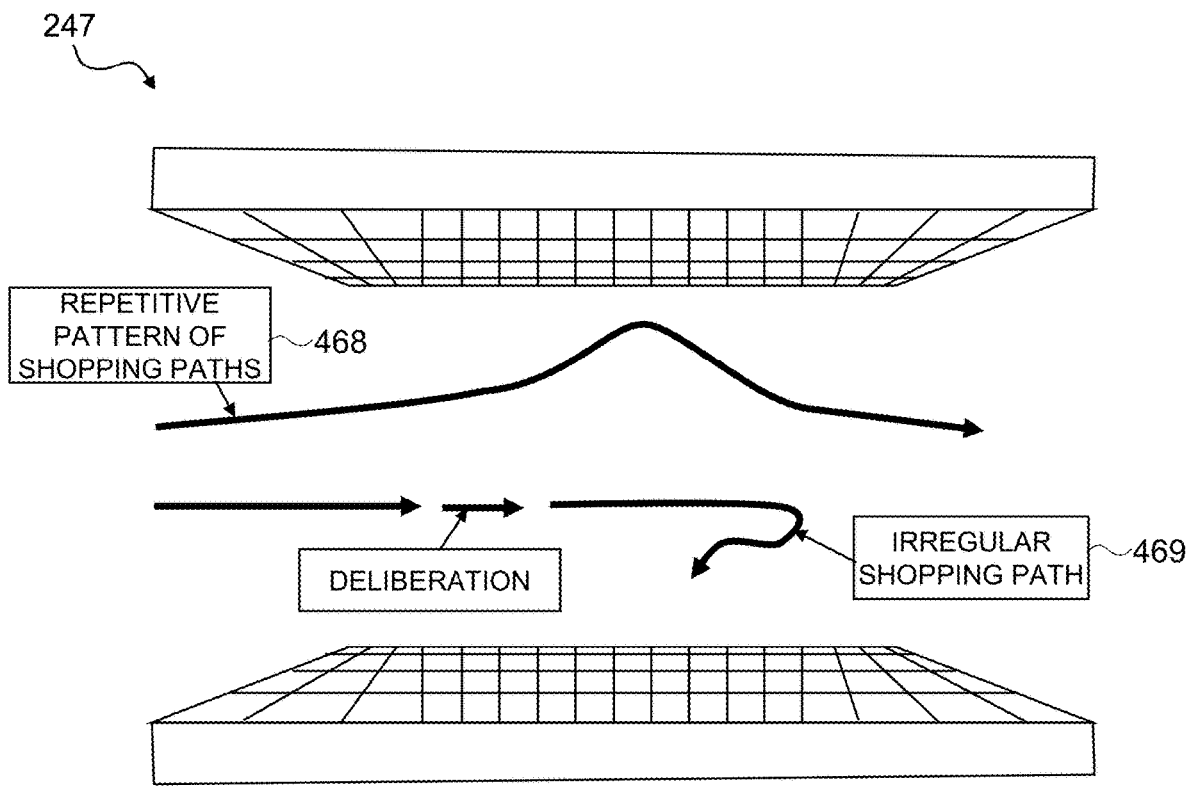

FIG. 24 shows an exemplary application of spatiotemporal criteria that can be used to differentiate between a premeditated purchase and an impulse purchase.

Figure 25:
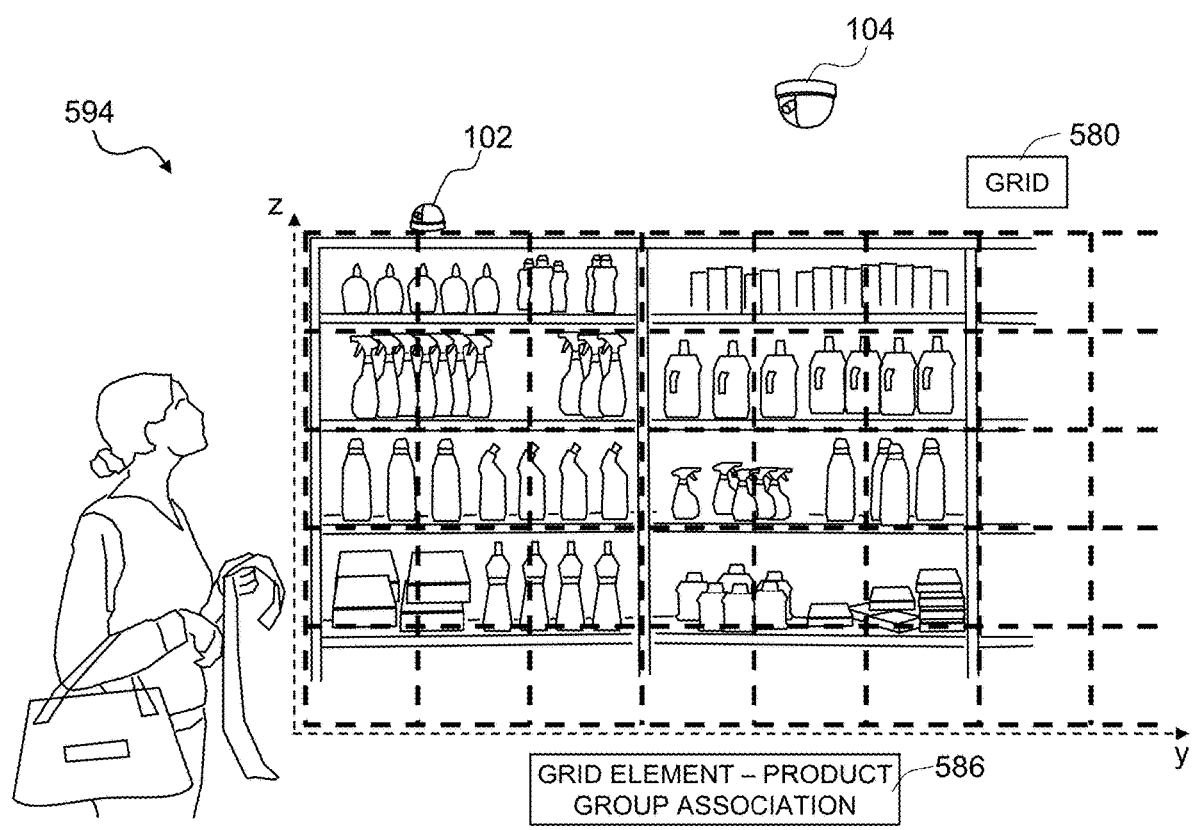

FIG. 25 shows an exemplary grid structure.

Figure 26:
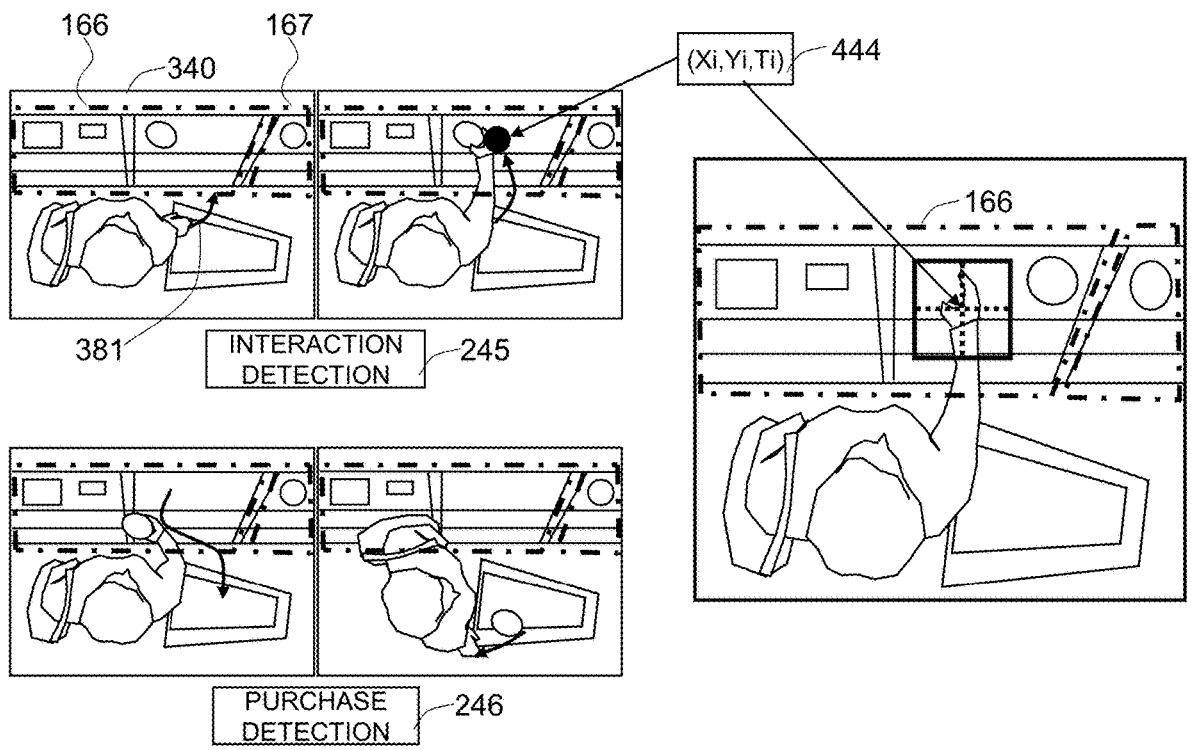

FIG. 26 shows exemplary interaction and purchase detection based on the grid structure.

Figure 27:
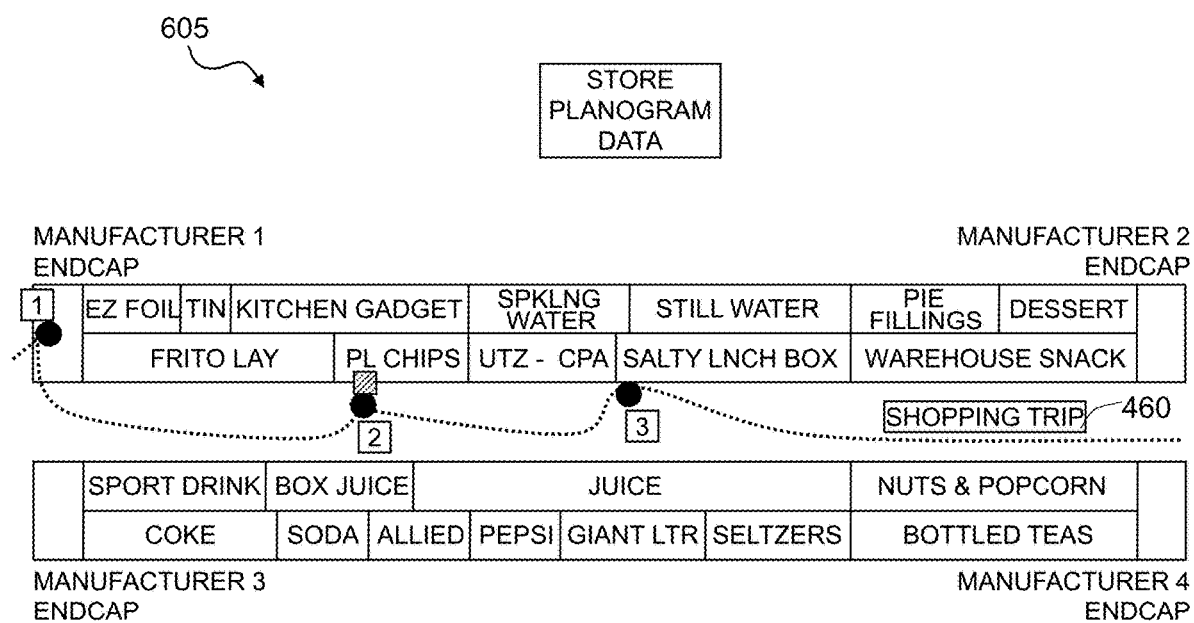

FIG. 27 shows an exemplary planogram data of an aisle and a shopping track with regard to the process of developing a decision tree.

Figure 28:
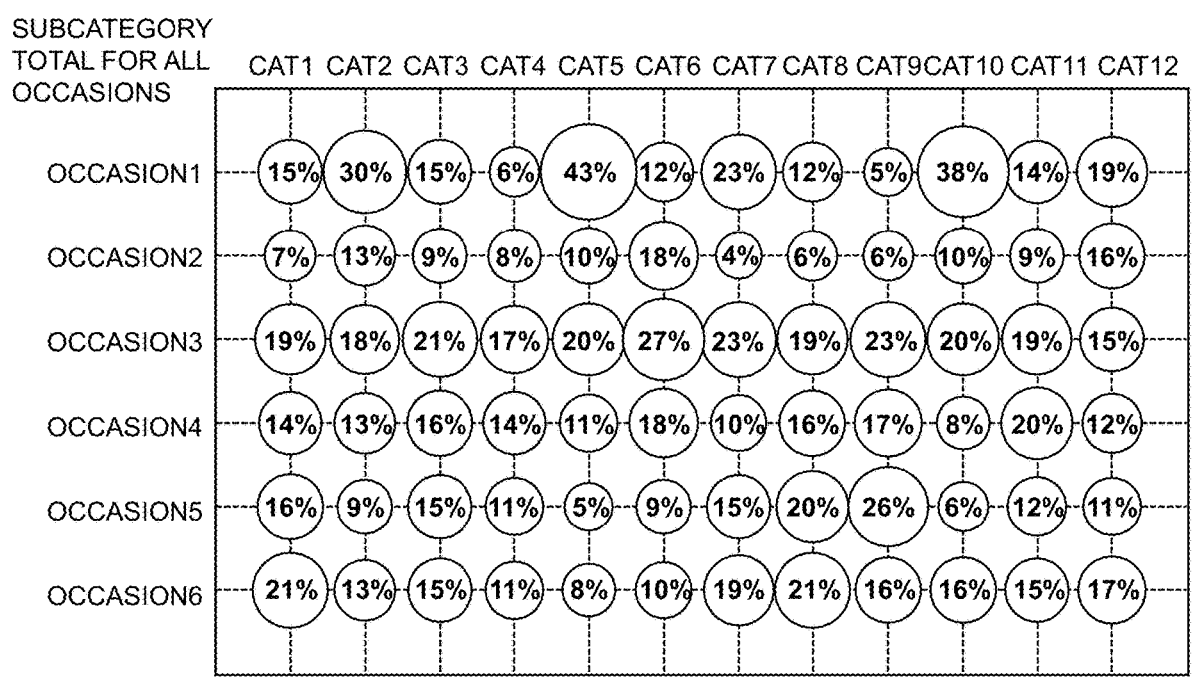

FIG. 28 shows an exemplary process of segmentation based on purchasing behavior.

Figure 29A:
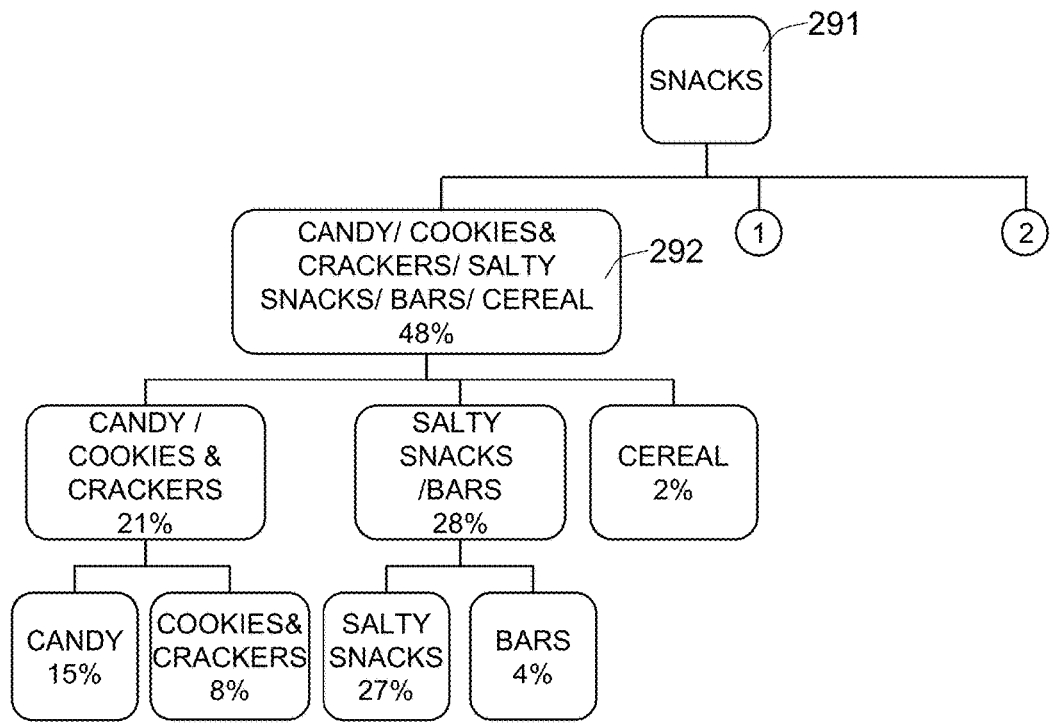
Figure 29B:
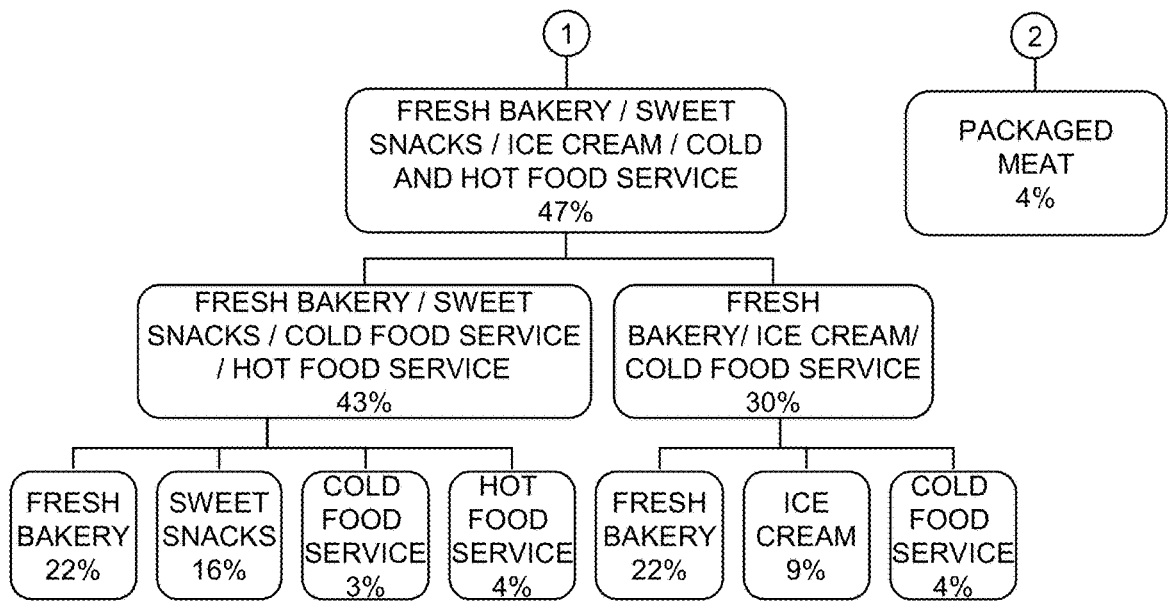

FIG. 29A-B shows a part of an exemplary decision tree and process of segmentation based on shopping and purchasing behavior.

Figure 30:
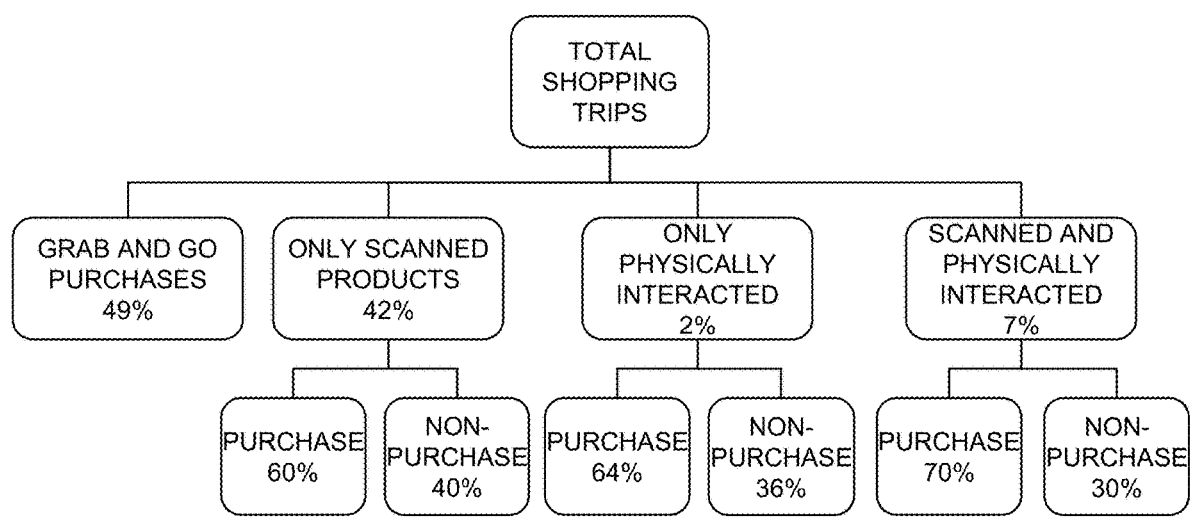

FIG. 30 shows another exemplary decision tree and process of segmentation based on shopping behavior.

Figure 31:
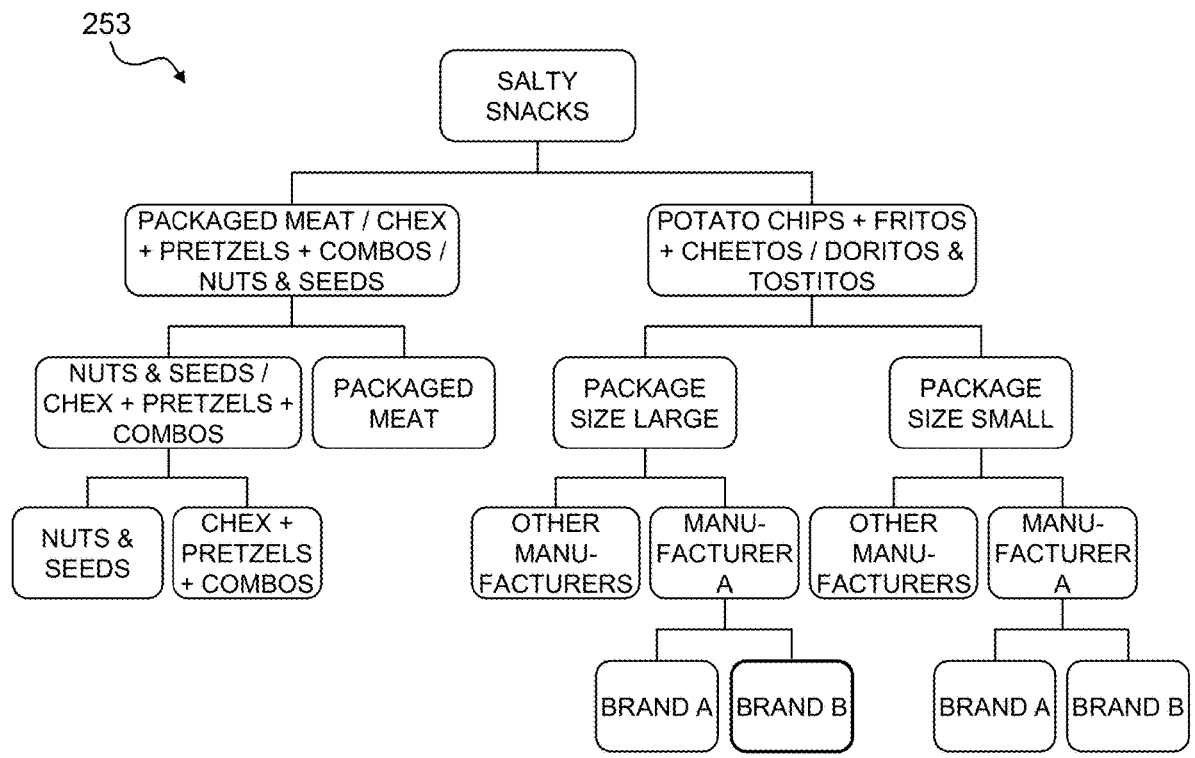

FIG. 31 shows another exemplary decision tree and process of segmentation in consideration of brands.

Figure 32:
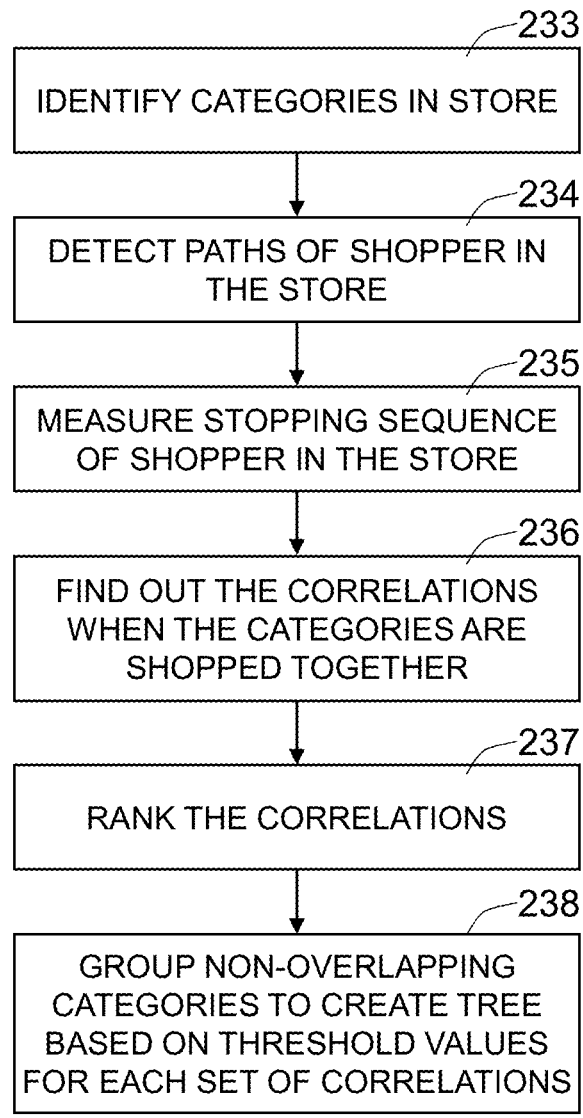

FIG. 32 shows exemplary processes in generating a decision tree based on category correlation.

FIG. 33 shows exemplary categories and the process of detecting the stopping sequences of shoppers in relation to the predefined categories.

FIG. 34 shows an exemplary table for correlated stopping sequences of a shopper based on co-occurrences.

FIG. 35 shows an exemplary table for the ranked group of categories based on the correlation.

Figure 36:
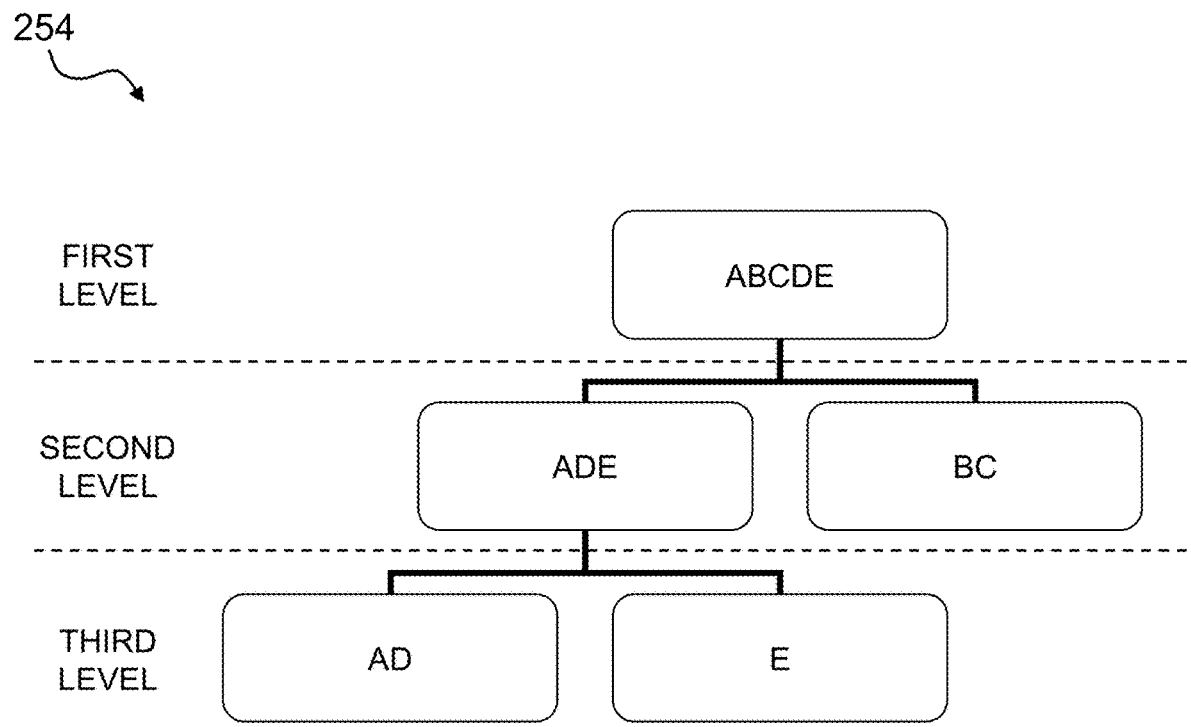

FIG. 36 shows an exemplary decision tree that was constructed after applying a threshold to the correlations of a group of categories.

Figure 37:
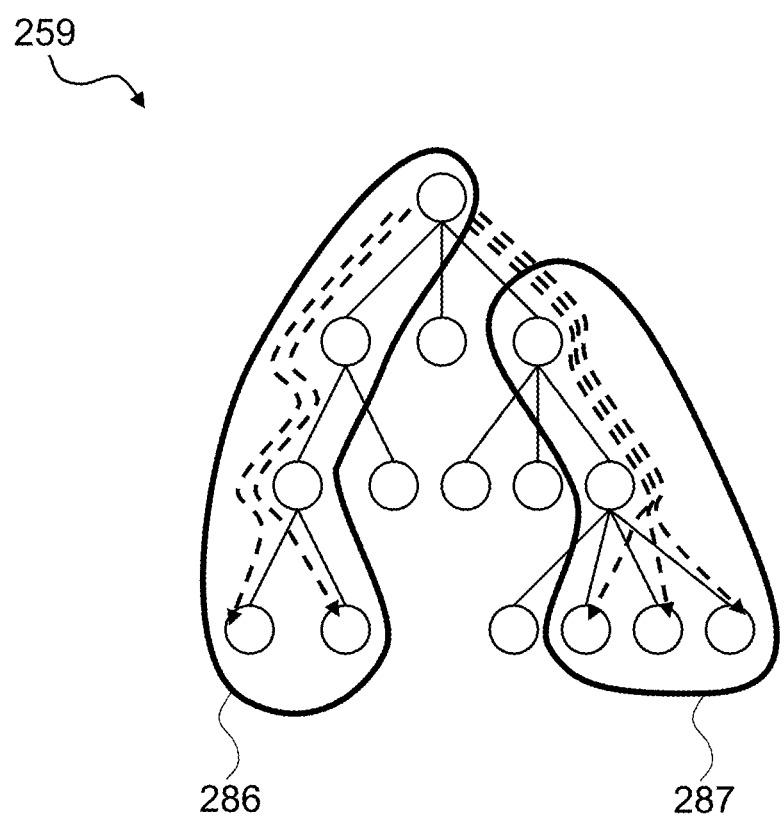

FIG. 37 shows an exemplary grouping of paths in a decision tree.

FIG. 38 shows an exemplary scheme of dominant path calculation and a level of decision steps calculation.

Figure 39:
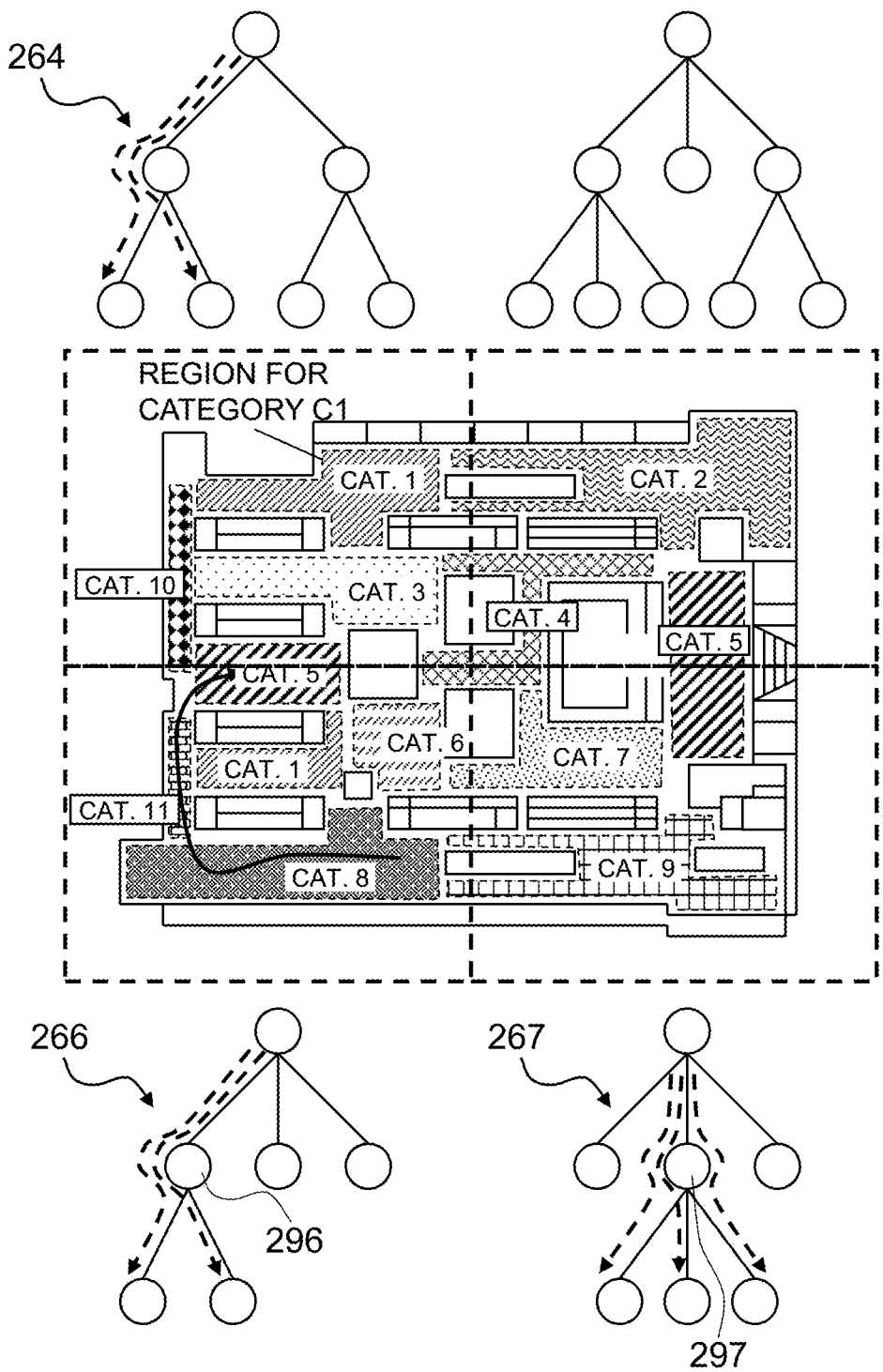

FIG. 39 shows an exemplary scheme of matching a planogram with decision trees.

Figure 40:
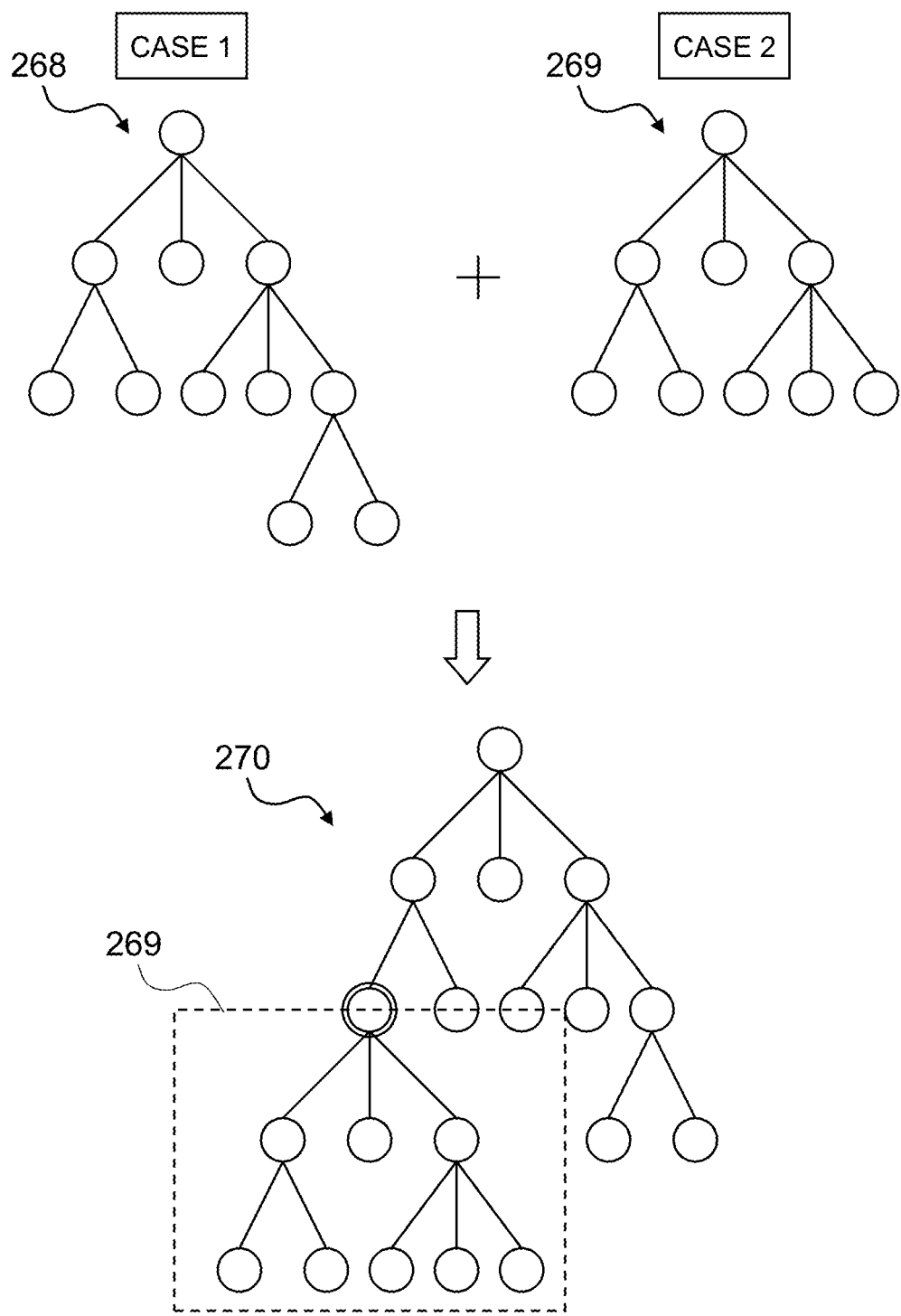

FIG. 40 shows an exemplary scheme for the decision tree merge process.

Figure 41:
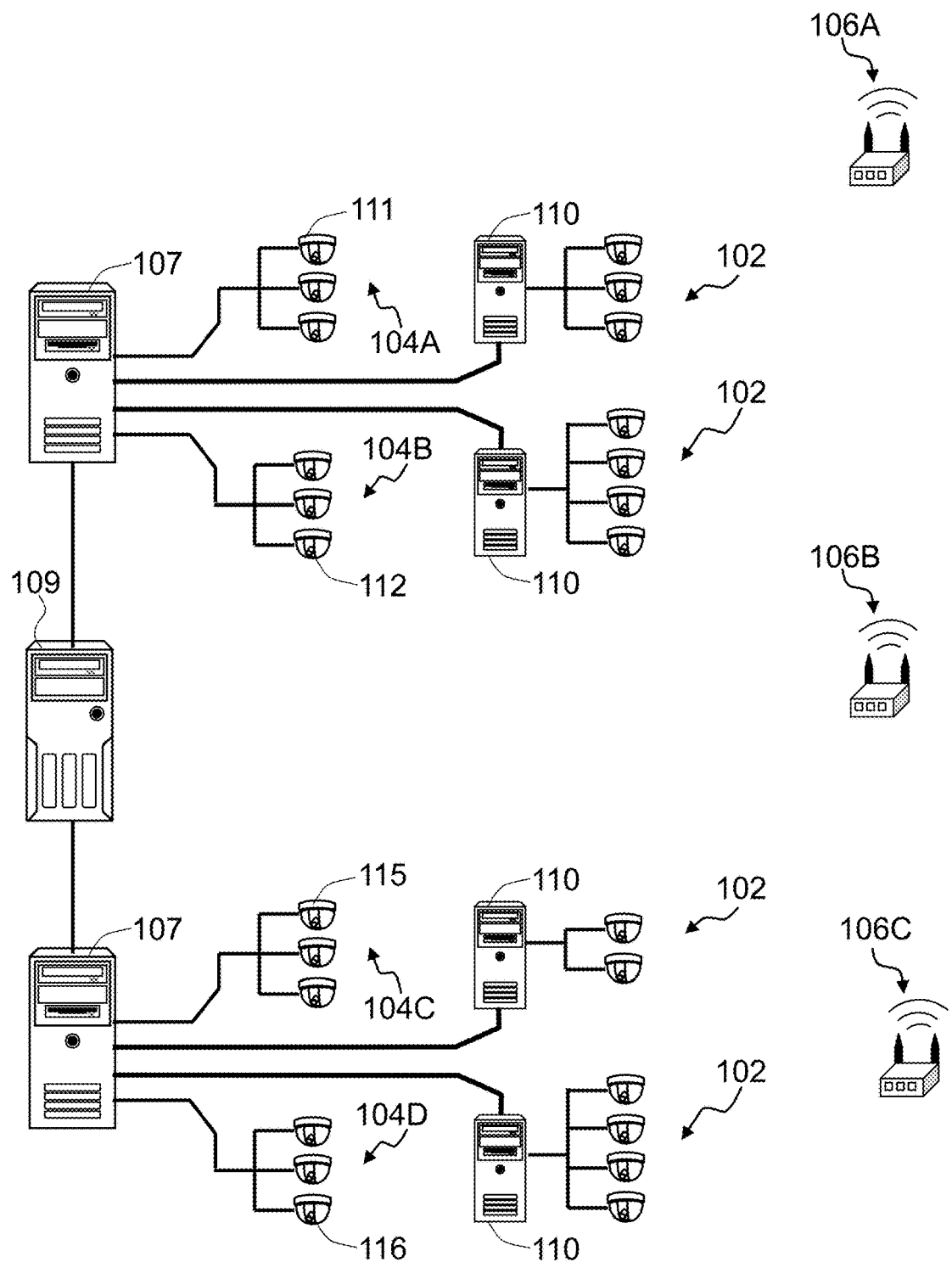

FIG. 41 shows an exemplary network of a plurality of means for control and processing, a plurality of APs, and a plurality of cameras that can used to build a consumer decision tree.

Figure 42:
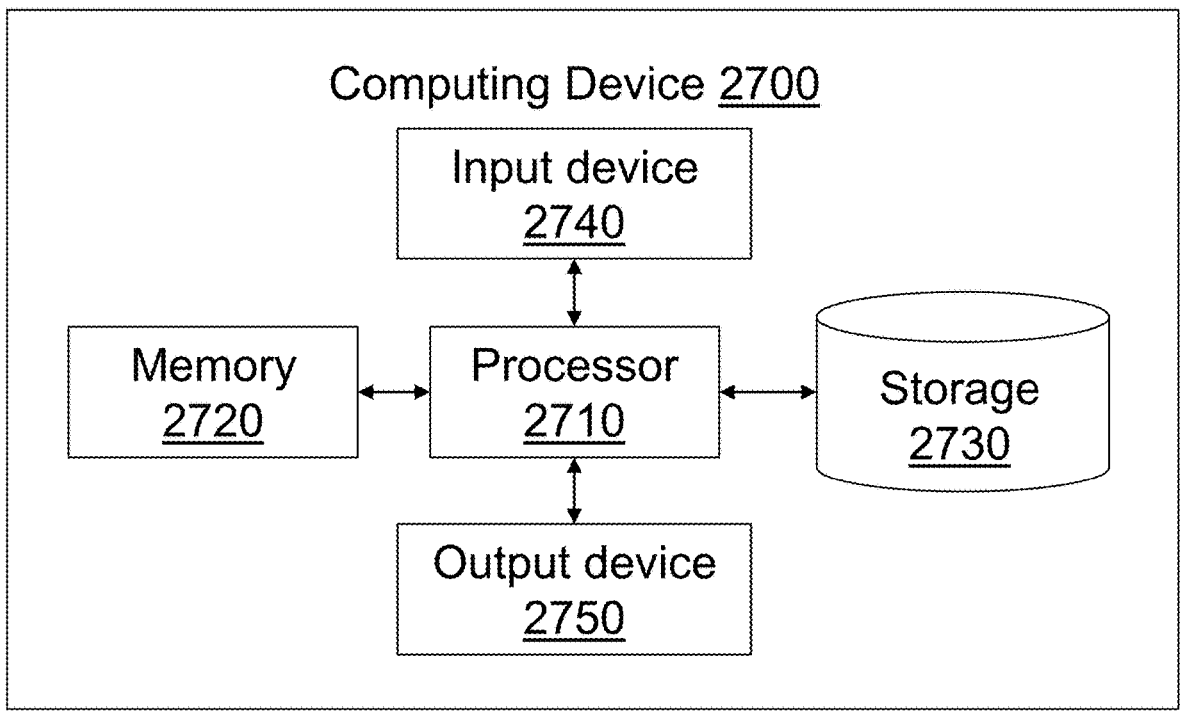

FIG. 42 shows an example computing device illustration.

DETAILED DESCRIPTION OF THE INVENTION

Figure 1:
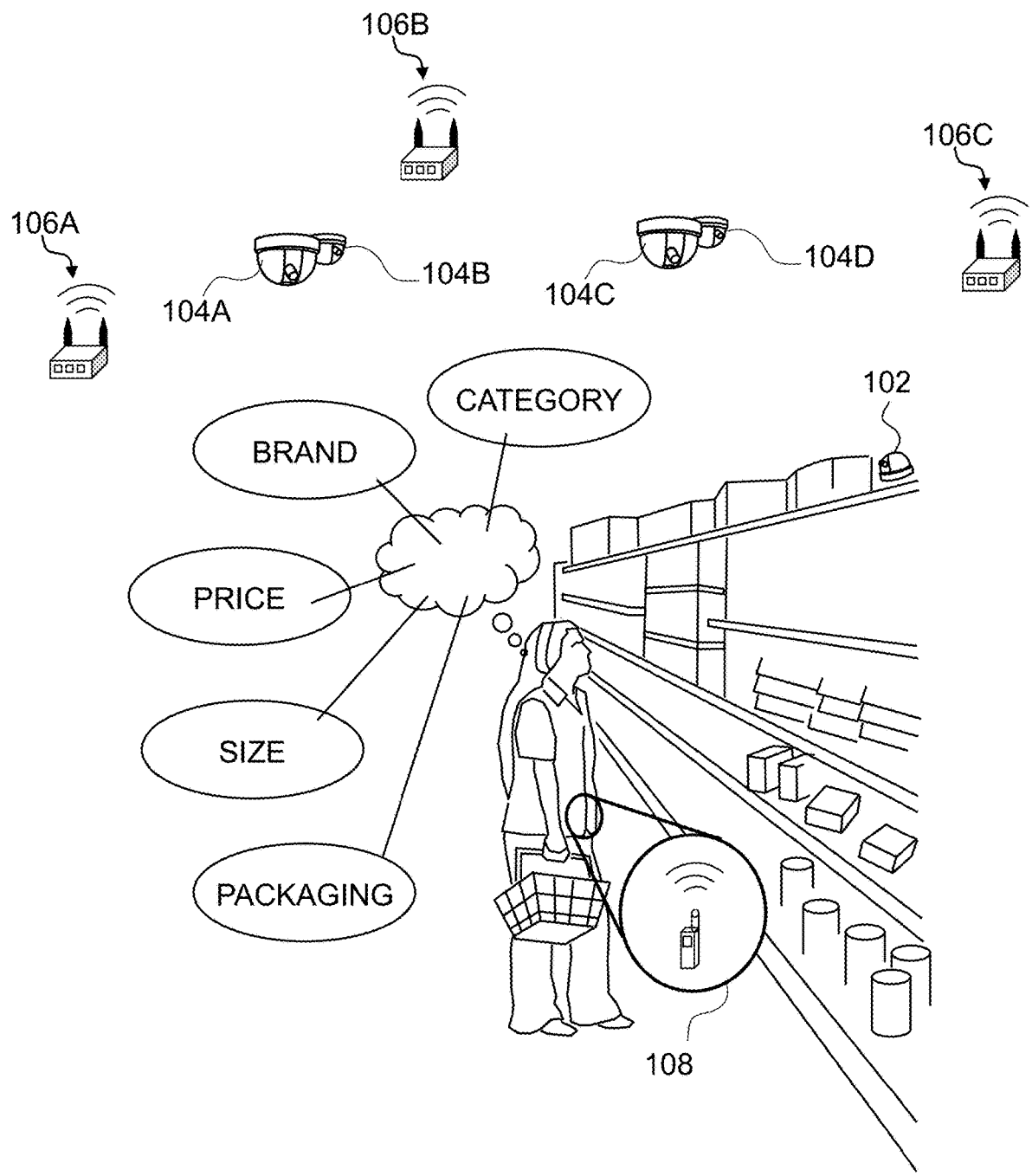
FIG. 1 shows an exemplary application of an embodiment in a store area.

FIG. 1 shows an exemplary application of an embodiment of the present invention in a store area.

It is important for the manufacturers and retailers to understand the decision processes of shoppers. For example, it is important not only to understand the pack size and type of the snack that is purchased, but also to understand what the decision process is; in other words, how it is purchased. The personalized decision tree provides a clear understanding of the decision process of an individual shopper, over time, in front of a product category, thus helping to identify opportunities for improving the shopping experience and increasing the number of purchases by that shopper for the category and store. Conventional approaches for developing decision trees—household panel purchase data, ethnography, and shop-alongs—have clear drawbacks, since they are either based on the shopper's interpretation of the purchase decision process or a human observer's point of view on the decision process, providing limited understanding of the actual behavior.

The exemplary embodiment overcomes the limitations of the conventional approaches by unobtrusively capturing the actual purchase behavior of a shopper over a large number of visits, in front of the category, providing objectivity and precision not achievable through other data collection methods.

In an exemplary embodiment, the hierarchical purchase decision process (personalized decision trees) of shoppers in front of a product category (a set of products that meet the same need of consumers) in a retail store (or set of stores in a geographic area), over time, can be determined. The product category can be organized in a coordinate system either as brand or as product attribute blocks. Shopping consideration and the decision path of the shopper can be obtained by combining behavioral data with the category layout and transactional data.

The hierarchical decision process can be determined based on observed actual in-store purchase behavior, i.e., in-store observation of shopper behavior, using a set of video cameras 102 and 104A-D, wireless sensors 106A-C, and computational processing for extracting the sequence and timing of the shopper's decision process. The embodiment can include the usage of both top-down video cameras 104A-D, as well as cameras positioned at the shelf 102, to capture the decision process, including gaze analysis and eye tracking 395. The embodiment can capture a plurality of input images of the shopper by at least a camera 102 or 104A-D in the vicinity of the product category. The cameras can comprise digital or analog cameras, covering the area of interest in the vicinity of the product category. The input images can be automatically analyzed in order to determine the behavior patterns and demographics of the shopper with regard to the decision activity. A plurality of datasets can be constructed by accumulating the decision activities of the shopper over multiple trips to the same retail location, or across shopping trips to multiple retail locations. The decision can be analyzed based on the actual purchase behavior of the shopper, like interaction with the products and travel paths to categories, as opposed to using in-store intercepts or household panels to develop them.

In a preferred embodiment, in contrast to the conventional method, an automatic behavior measurement can be used, including shopping paths and interaction with the products, to observe the decision processes and construct the decision trees of the shopper, without shopper participation and obtrusive interception. Therefore, the gathered data can reflect the actual behavior of the shopper at the point of purchase. A large amount of statistical data can be objectively captured over multiple shopping trips and at multiple retail locations, thus the gathered data is unbiased.

In a preferred embodiment, the decision behavior can be an observable behavior by automatic multi-sensor analysis. Using the exhibited behavior, such as the shopping path, browsing activity for a product, or interaction with a product, the decision tree can be calculated to identify the hierarchical decision process. Based on the observed path of the shopper and the associated product data in the space of travel, it can be known what the person did vs. did not do. In addition, the observable behaviors can also be associated with the sales data for the products at the location where the shopper's behaviors are measured. Other examples of observable behaviors can include time of interaction, pre-interaction (like prior location of visit), exposure to the product display and attributes, and sensory activity behavior to make decisions. Further, the shopper's choice of retail location (retail channel) can also be recorded as an observable behavior.

In another exemplary embodiment, a semi-automated method can be integrated to compute the decision tree to identify behaviors that cannot be automatically observed by the technology or to identify granular details of shopper interaction with the product, like comparing brands. This semi-automated method can complement other data sources like in-store intercepts, planograms, and point of sale data. The semi-automated method can also comprise a method to construct parts of a decision tree that cannot be visually or automatically observed. For example, the semi-automated data annotation approaches can be utilized to determine the sequence, timing, and shopper's point of focus in the coordinate system.

Overall, the system can determine the hierarchical decision process of the shopper in front of a category based on spatiotemporal information using the multi-sensor analytics technology. This aggregated shopper behavior data will be combined with transactional data to provide a holistic picture of the purchase decision process in the store, and across multiple retail locations.

The hierarchical decision process, which can be obtained by the clustering of shopper behavior data over time, can not only identify the sequence or order of the decision, but also can quantify the volume of shopping trips at each level in the decision process, and thus can determine the relative importance of each product group. Further, since channel information can also be tracked (i.e., tracking shopper behavior across multiple retail locations in a geographic area), the relative importance of each shopping channel can also be determined.

The frequency of cross-comparisons between product groups not only can help to determine the category structure, but also can provide a deeper understanding of product distinction and substitutability between a set of products.

Moreover, the decisions of the shopper for each product group can be captured very clearly, down to the product attribute level. Such in-depth understanding can provide an accurate picture of the relative importance of each product attribute, such as flavor, size, and price, in the purchase decision process. The attributes comprise brand, product type, size, flavor, price, and retail channel. The sequence, timing, and the area of focus can be associated on the coordinate system to arrive at the hierarchical decision process. For example, if the category in the coordinate system is organized by a product attribute, such as flavor, the attributes can be mapped with the behavior, using the spatiotemporal information and the percentage of trips where the shopper first looked at flavor and then started comparing brands with the flavor attribute within the category, thus providing a measurement.

The results of the calculated personalized decision tree can be used to provide targeted messaging to shoppers based on the results of each shopper's calculated decision tree. The personalization of advertising, promotions, and other messaging can greatly enhance the value of the messages delivered since they can be customized for each individual shopper's behavior, previous purchases, channel choices, and decision process. The messaging can be delivered via a mobile device carried by the shopper 108, digital or printed signage, at the Point of Sale, or other means of message delivery.

An exemplary embodiment can also quantify the amount of time spent by the shopper for making each decision, thereby determining the relative importance or the complexity among the shopping decisions. Combining this information with the hierarchical decision process, retailers and manufacturers can evaluate whether or not the coordinate layout of the category matches the needs and the decision process of the shopper.

Since individual behavior over time can be tracked for multiple shoppers, an exemplary embodiment can provide further granularity by determining the hierarchical decision process of the shoppers by demographic groups as well as by need states and occasions. The attributes for the demographic groups comprise gender, age range, and ethnicity. Such granular understanding of the decision process for each shopper segment can help both retailers and manufacturers to customize the category layout for their key segment(s), thereby providing a more convenient and enjoyable shopping experience.

Figure 2:
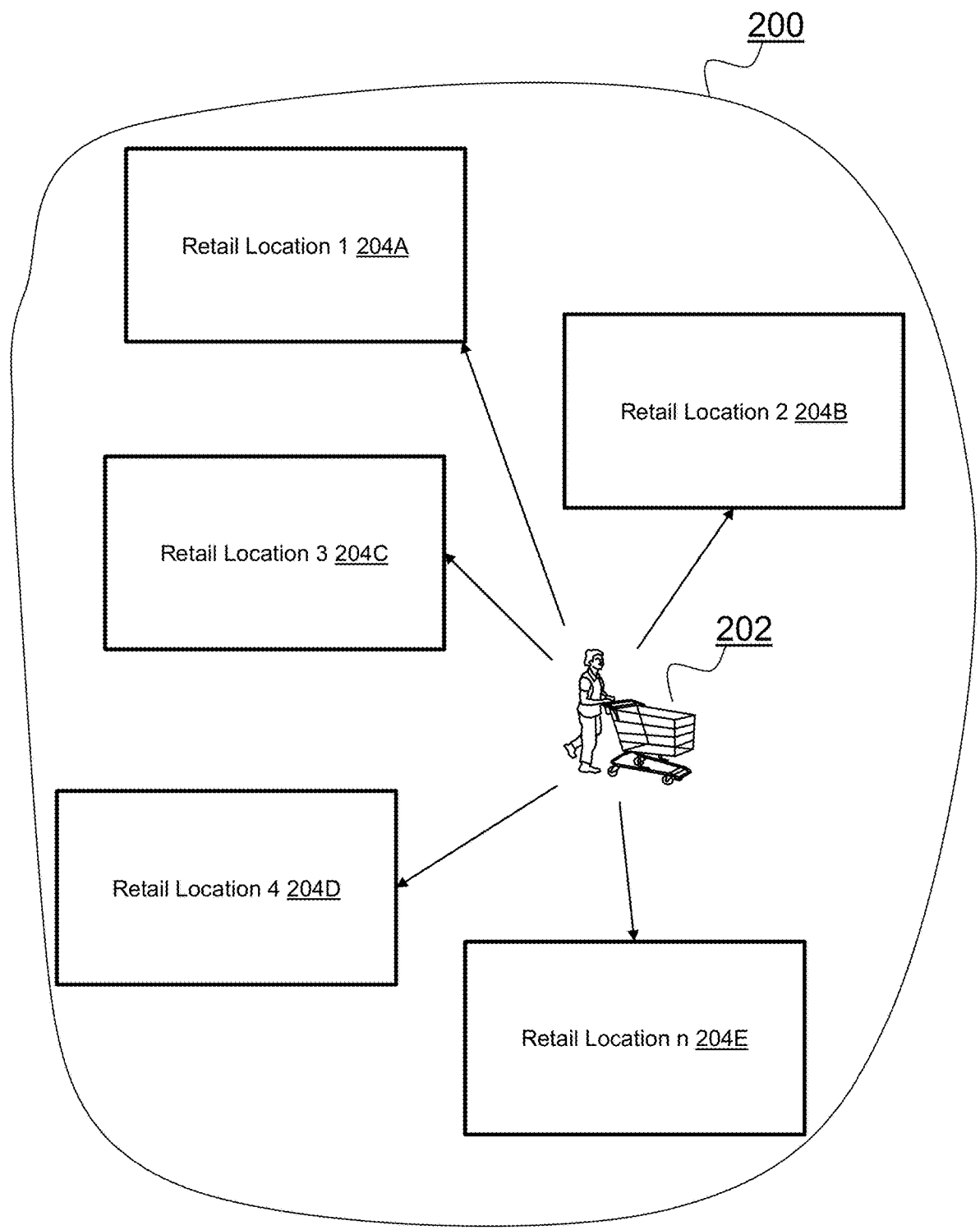
FIG. 2 shows an illustration representing a shopper visiting multiple stores in a geographic area.

FIG. 2 shows an exemplary illustration of a shopper 202 who visits multiple retail locations 204A-E in a geographic area 200. The geographic area can be a town, city, region, county, statistical area, or reflect a wider area such as a metropolis, multi-city, state, or multi-state area. The preferred embodiment can track the shopper's behavior as she visits one or many of the locations, and with the aggregated results of the shopping trips contributing to the determination of the personalized decision tree.

Figure 3:
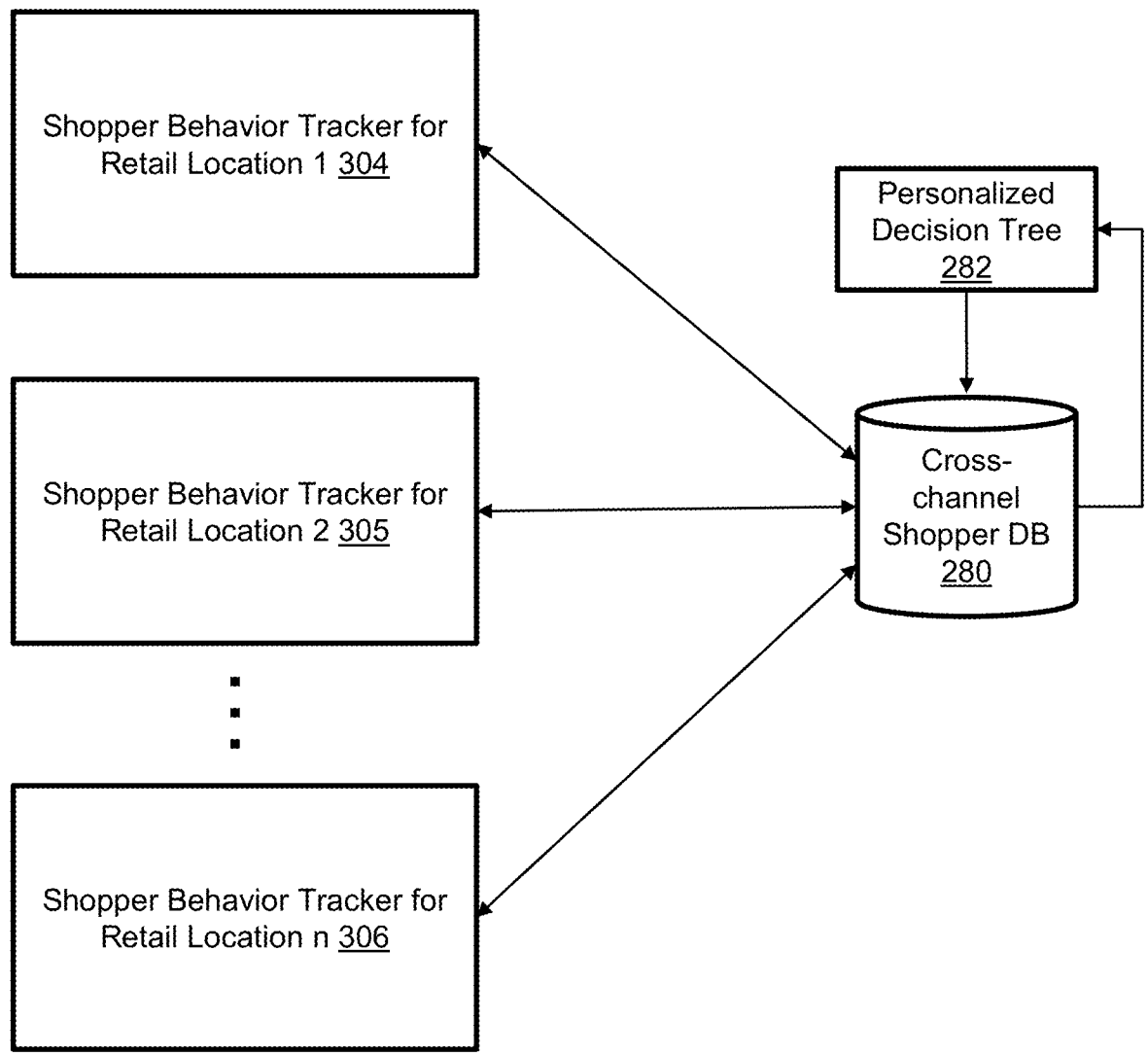
FIG. 3 shows an example block flow diagram illustrating an overview of the cross-channel shopper behavior tracker system for generation of the Personalized Decision Tree.

FIG. 3 provides an overview of an exemplary embodiment of the multi-channel shopper behavior tracker system. The Shopper Behavior Trackers for each retail location 304, 305, and 306, can track a shopper from the moment they enter the store to the time they exit. They can identify visual features and estimate demographic information for the shopper, track the shopper's trajectory throughout the store, and associate all of that data with Point of Sale information. This single-channel tracking can be done for multiple retail locations in a geographic area, or across many areas, as illustrated by the presence of n Shopper Behavior Trackers, with n being the number of retail locations where shoppers are tracked by the system. Data created by Shopper Behavior Trackers at each location can be aggregated in the Cross-channel Shopper DB 280 and used for the determination of the personalized decision tree 282.

Figure 4:
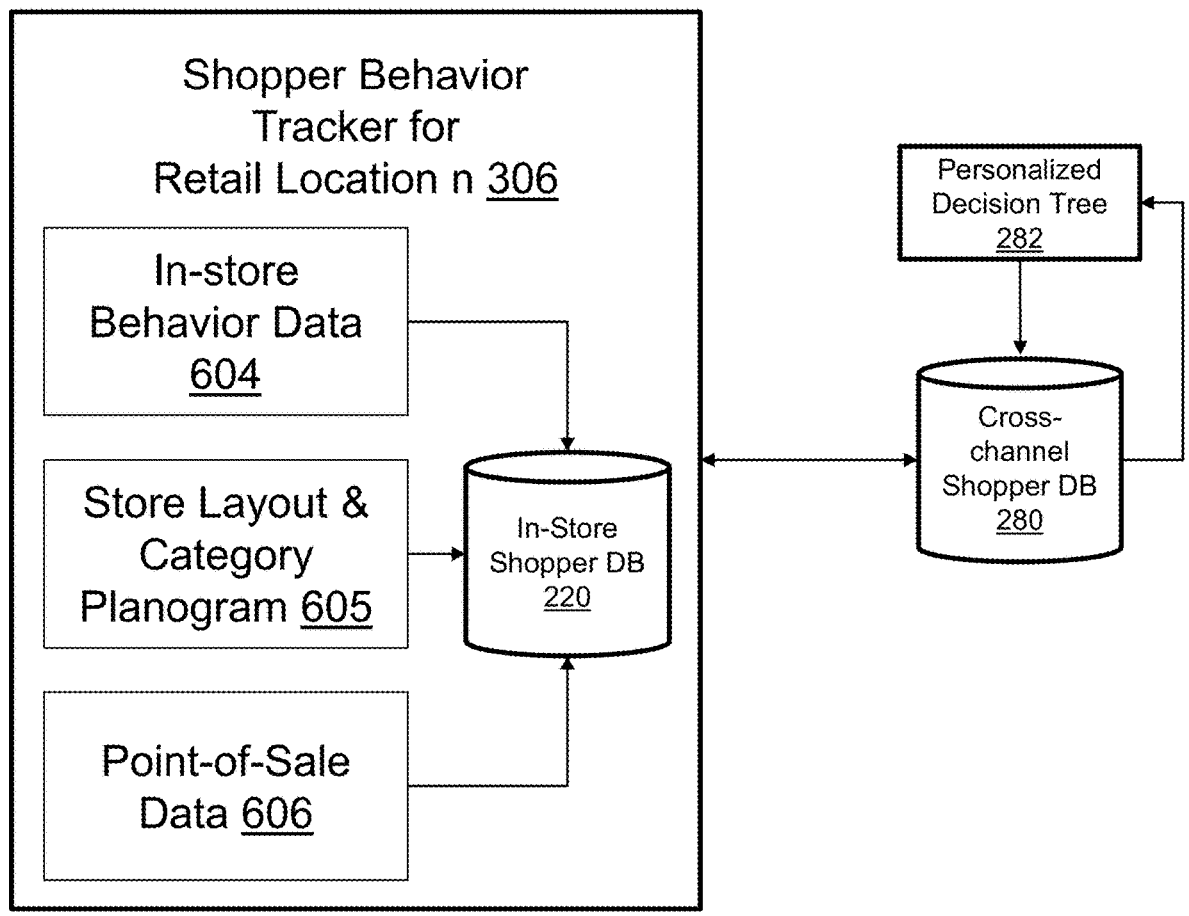
FIG. 4 show a more detailed block flow diagram for a single retail location.

FIG. 4 provides a more detailed view of the types of data that can be processed by the Shopper Behavior Tracker 306 module, as illustrated for a single retail location. The Shopper Behavior Tracker 306 module can create and collect data from three sources: In-store Behavior Data 604, Store Layout & Category Planogram data 605, and Point-of-Sales Data 606. The data for a particular shopping trip at a particular retail location can be stored in the In-Store Shopper DB 220. Data for the shopper across multiple trips and/or retail locations can be stored in the Cross-channel Shopper DB 280, and processed by the personalized decision tree 282.

FIG. 5 illustrates the Shopper Profile Data (SPD) 300 that can consist of a set of different types of information we collect and analyze from the shopper to enable the tracking of shopper behavior across multiple channels. The SPD can further comprise three classes of data: Shopper ID Vector (SIV) 301, Shopper Segment Data (SSD) 302, and Shopper Behavior Dataset (SBD) 303.

The Shopper ID Vector (SIV) 301 can refer to as a set of unique features that allow us to recognize a shopper among others. That includes a set of features that are unique over either long-term or short-term. The features of a shopper that are unique for a long-term basis (i.e., unique in multiple visits to stores over time) can include the face features and the MAC address of the radios of the mobile devices that the shopper carries. Such long-term unique features can be referred to as the Global ID Vector. The features that are unique only for a short-term basis (i.e., unique only during a single trip to a particular store) can include the body features such as body appearance. Such short-term unique features can be referred to as the Local ID Vector.

The Shopper Segment Data (SSD) 302 can be referred to as a set of features that can characterize a shopper so as to allow the shopper to be classified into a segment in the population. The SSD can be further bifurcated into the physical and behavioral segment data. The physical segment data can be extracted based on the physical characteristics of a shopper, including height, obesity, and demographics such as gender, age, and ethnicity. The behavioral segment data can describe a shopper's preference, tendency, and style in shopping, including brand loyalty, organic food preference, etc. The behavioral segment data is supposed to be derived from a set of measurements about the shopper, which is collected in the Shopper Behavior Dataset. The SSD is where the personalized decision tree for the shopper can exist.

The Shopper Behavior Dataset (SBD) 303 can be a storage of all raw measurements and low-level metrics for a shopper. The low-level metrics, which can be called Shopper Metrics, can include per-week and per-month frequency of shopping visits to a store or to all stores, per-category and per-store time spent, per-category and per-store money spent, etc. The raw measurements for a shopper can be collected as a list of TripVector, where a TripVector of a shopper can be a collection of physical and contextual attributes of a shopper's single trip to a store and the Point-of-Sale (PoS) data. The physical attributes can describe the shopper's physical states, consisting of (1) a trajectory of a shopper, described by a tuple (t, x, y) and (2) the physical states of the shopper including gesture, head orientation, mobile device usage mode, etc. The contextual attributes can describe any interactions made between a shopper and the surrounding marketing elements of a store such as displays and items, for example, visual attention, physical contact, and more high-level various shopping actions including comparing products, reading labels, waiting in a line, etc. PoS data can include items purchased during the trip to the store. The TripVector can also include identification of the particular retail location where the visit occurs.

Figure 6:
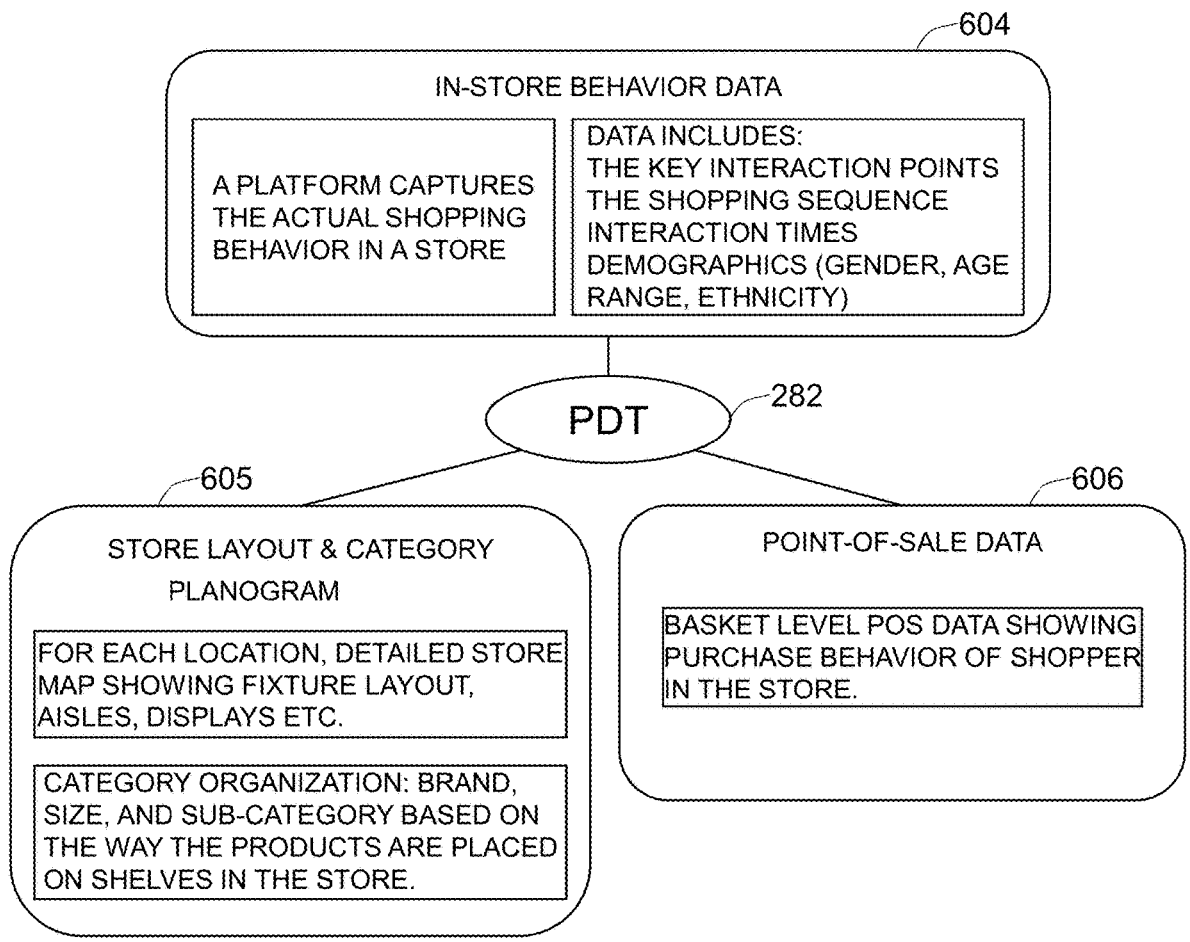
FIG. 6 shows three exemplary sources of data that can be integrated together to provide a holistic picture of the shopper's decision process.

FIG. 6 shows the conceptual integration of three exemplary data sources.

In an exemplary embodiment, data from multiple sources can be combined. For example, the data sources can comprise data from the proprietary measurement platform, such as in-store behavior data 604, detailed information of the store layout and category planogram 605, and transaction (Point-of-Sale) data 606. A goal of utilizing multiple data sources can be to provide a holistic view of the hierarchical decision process the shopper in a category. This consolidated view can provide a clear understanding of the shopping consideration and the decision path of the shopper. However, as noted earlier, the key is to primarily utilize the data from the actual observation of physical interaction.

In-store behavior data 604 from the platform can include identifying the types of interaction with the products, their shopping sequence, and the amount of time spent making a decision. In an embodiment, when aggregated across multiple shoppers, these metrics can be broken down by demographic groups—gender, age range, and ethnicity—to provide a clear understanding of the similarities and differences in the decision-making process of various shopper segments. The platform can capture the actual shopping behavior in a store by a predefined resolution, for example, 1 foot resolution, in images of 15 frames per second. The data for the store layout and category planogram 605 can include a detailed store map showing fixture layout, aisles, displays, etc. The category layout can be based on the way the products are placed on the store shelves. The Point-of-Sale (POS) Data 606 can include transaction data by baskets and by time period.

Figure 7:
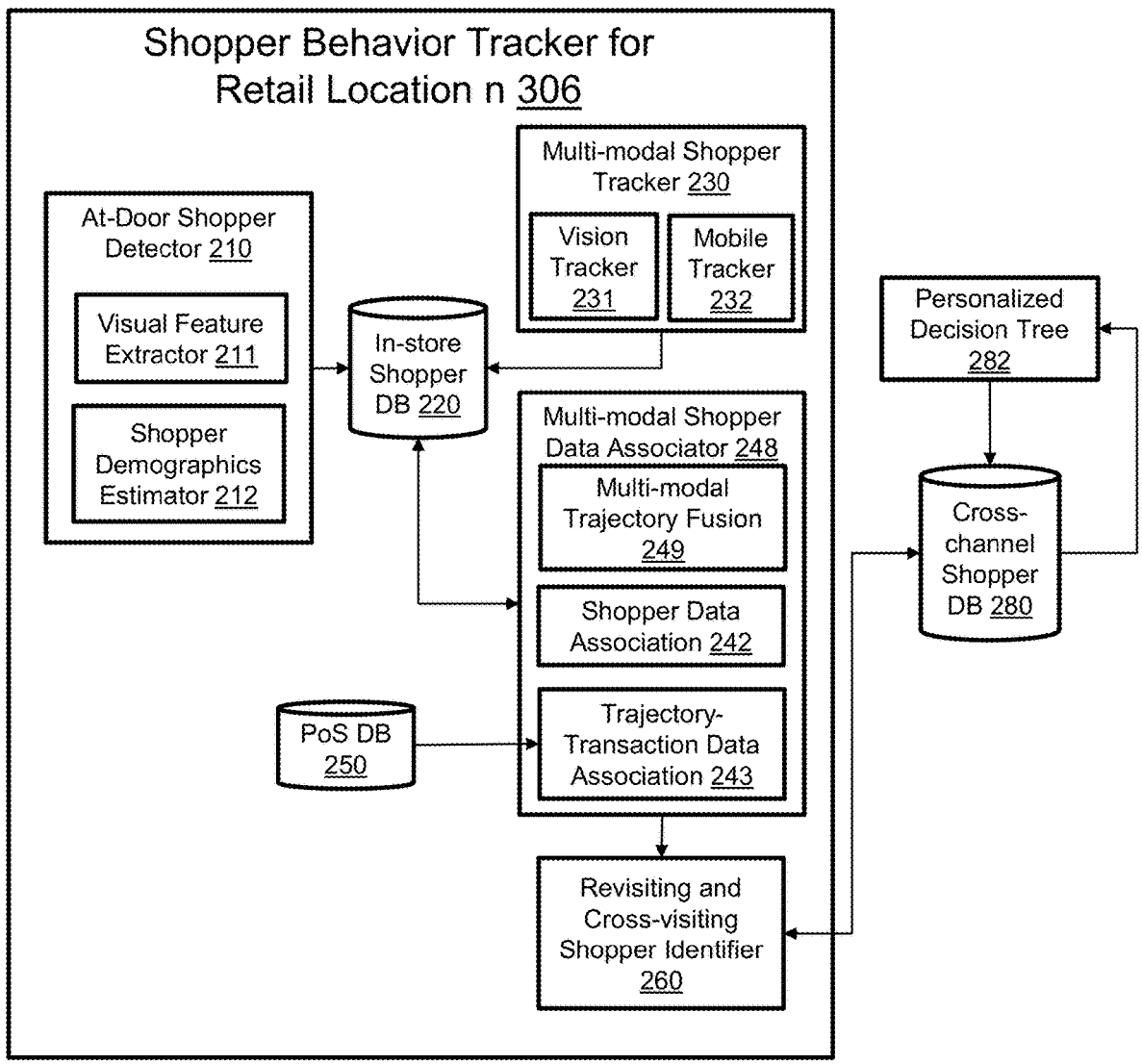
FIG. 7 shows an example block flow diagram illustrating the personalized decision tree system with a detailed illustration of the Shopper Behavior Tracker module for a single retail location.

FIG. 7 provides a more detailed view of shopper tracking using the Shopper Behavior Tracker 306 module, in the context of the system, as illustrated for a single example retail location. The At-Door Shopper Detector 210 (utilizing the Visual Feature Extractor 211 and Shopper Demographics Estimator 212 modules) can capture an image of a shopper upon entrance to the location. The module can detect the face of the shopper as well as other body features. The detected face features can then be used to estimate demographics information about the shopper such as gender, age, and ethnicity. This data can then be added to the shopper profile data and stored in the In-Store Shopper DB 220.

The Multi-modal Shopper Tracker 230 (utilizing the Vision Tracker 231 and Mobile Tracker 232) can also detect and track the shopper from the time the store is entered and as the shopper travels the store. The Vision Tracker 231 and Mobile Tracker 232 can use vision and mobile data, respectively, to produce shopper trajectories that represent the shopper's entire trip through the store. The Vision Tracker 231 can provide an accurate track as the shopper moves through a location, however, a number of issues (such as background clutter and non-overlapping camera coverage) can cause discontinuities in the trajectory. The discontinuities can be rectified algorithmically (for example, by re-identifying a shopper with shopper profile data already existing in the database) and augmented using mobile data. The Mobile Tracker 232 can isolate individual mobile device tracks using the unique MAC address of each tracked device, and use methods such as translateration to localize the device. While localization accuracy can be limited using the wireless modality, the track is persistent. Data from each modality can be stored separately as shopper profile data in the In-store Shopper DB 220.

The Multi-modal Shopper Data Associator 248 can use data from the In-store Shopper DB 220 and the Point-of-Sale (PoS) DB 250 to fuse shopper trajectories collected via multiple sensing modalities (utilizing the Multi-modal Trajectory Fusion 249 module), can associate the appropriate shopper data (utilizing the Shopper Data Association 242 module), and can perform Trajectory-Transaction Data Association 243. The Multi-modal Trajectory Fusion 249 module can fuse associated trajectories from each tracking modality to generate a more accurate and continuous track. Remaining discontinuities can then be interpolated, and the resulting track stored as shopper profile data in the In-Store Shopper DB 220.

The Shopper Data Association 242 module can then merge the fused trajectory with face and body feature data as well as demographics data obtained by the At-Door Shopper Detector 210 process. This associated data can form new shopper profile data that can be stored in the In-Store Shopper DB 220. The Trajectory-Transaction Data Association 243 module can then associate the new shopper profile data with transaction (also called Point of Sale or PoS) data from the PoS DB 250. So, while the trajectory can indicate where the shopper has traveled through a store, the association with transaction data can indicate what items were actually purchased during the trip.

Creation of a personalized decision tree can be dependent on the population of the Cross-channel Shopper DB 280 with shopper profile data that is aggregated for the shopper over time (i.e., multiple shopping trips, at the same retail location or multiple locations). The Revisiting and Cross-visiting Shopper Identifier 260 can then be used to analyze an instance of shopper profile data to identify whether the shopper has visited the same (revisit) or any other retail location (cross-visit) previously. If the shopper has visited one of the n retail locations before, then records for that shopper can be updated in the Cross-channel Shopper DB 280. A new shopper can have new shopper profile data created in the Cross-channel Shopper DB 280.

Figure 8:
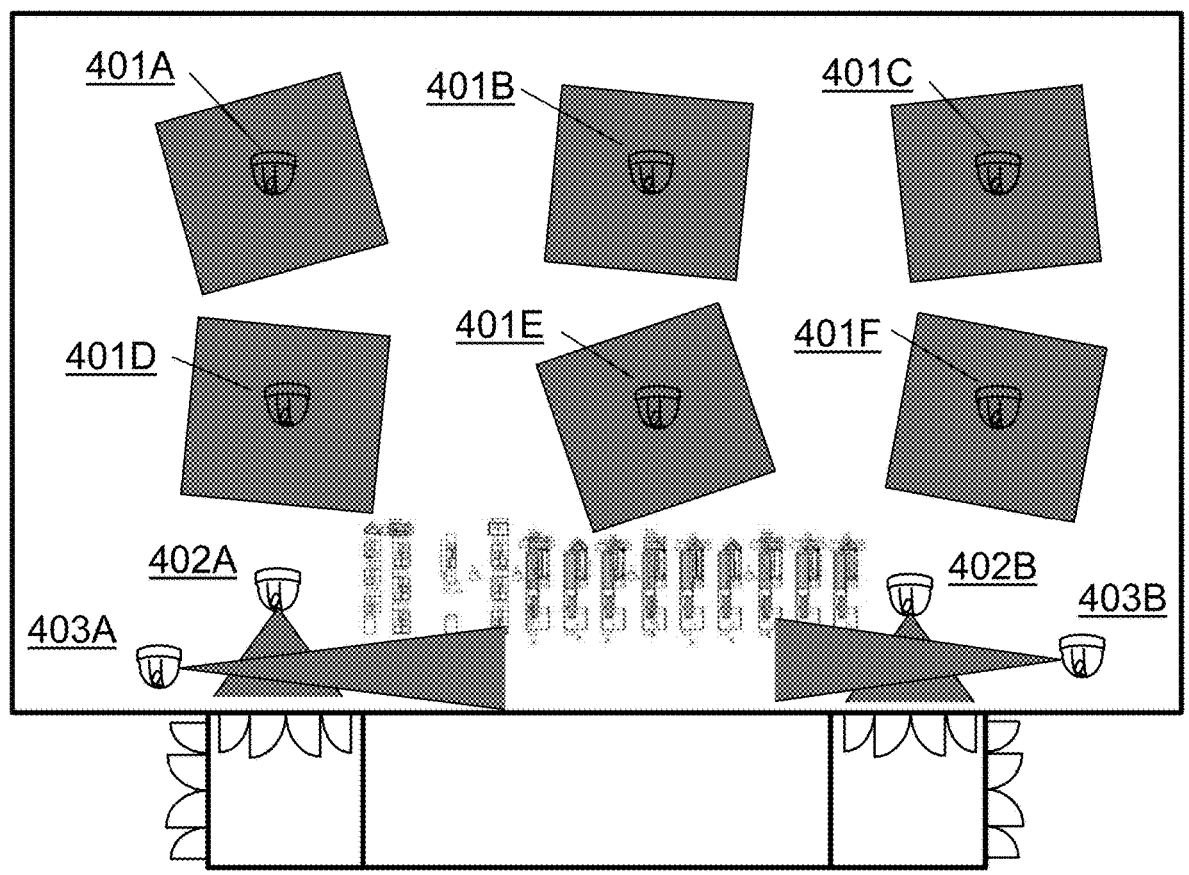
FIG. 8 shows an example of a sparse camera deployment.

FIG. 8 shows a sparse configuration camera deployment. In the sparse configuration, cameras 401A-F can capture non-overlapping portions of the retail store, and other cameras can be installed around the entrance and exit 402A-B and 403A-B. The cameras 401A-F, 402A-B, and 403A-B can be configured to capture a constant stream of images. Any of the cameras can also be positioned and/or configured for both top-down observation of shoppers or at shelf level.

Figure 9:
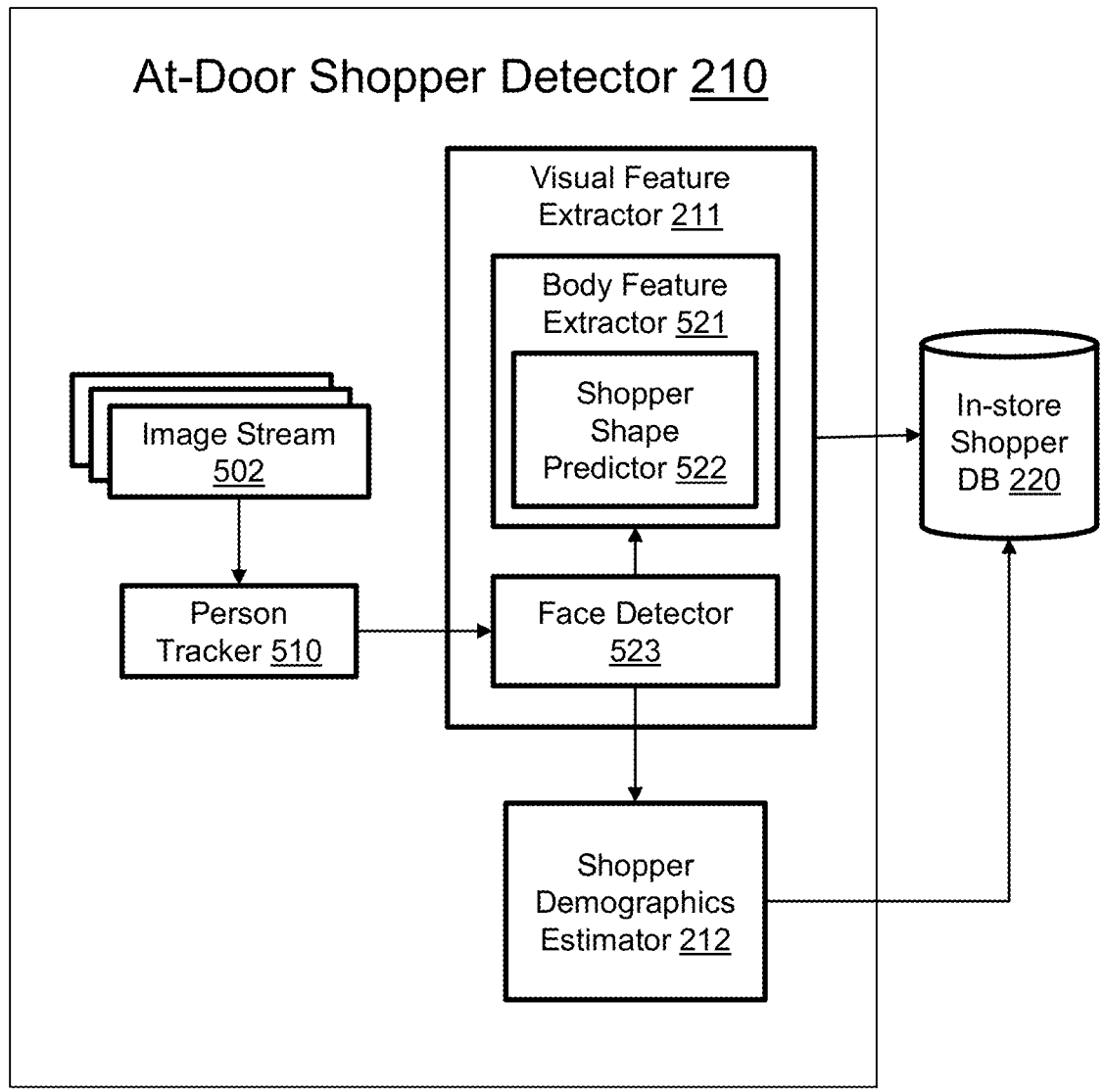
FIG. 9 shows an example block flow diagram of the At-Door Shopper Detector module.

FIG. 9 shows an example of the At-Door Shopper Detector 210. For each image frame from the Image Stream 502, the Person Tracker 510 module can search the image to find and track any person using a single or combined features like Histogram of Oriented Gradient (HOG), color histogram, moving blobs, etc. For each detected region where a person is likely to be present, the Face Detector 523 module can search to find a human face. The detection of a face can imply there is shopper present. For each detected face, if an instance of shopper profile data (SPD) has not been created for this tracked person yet, then the shopper's shopper profile data (SPD-1) can be created in the In-store Shopper DB 220. Note that the shopper profile data created can be labeled as SPD-1 since there are multiple modules that can create a shopper profile data. To distinguish such different shopper profile data, they can be labeled with different numbers. The detected face can then be added to the corresponding SPD-1 as a part of the Global ID Vector whether or not the SPD-1 is just created or already exists. Upon detection of a face, the Body Feature Extractor 521 can also estimate the area of the shopper's upper and lower body using the Shopper Shape Predictor 522 based on the detected face location as a part of the Visual Feature Extractor 211. Then the Body Feature Extractor 521 can extract the body features of the shopper from the estimated shopper body area in the input image. The extracted body features can be added to the corresponding SPD-1 as a part of the Local ID Vector.

Once the tracking for a shopper in this module is completed, then all of the detected faces in the SPD-1 can be fed into the Shopper Demographics Estimator 212. The Shopper Demographics Estimator 212 can estimate the gender, age group, and ethnicity of the shopper based on the multiple faces and return back the estimation results with corresponding confidence level. The details of the Shopper Demographics Estimator 212 module will be further elaborated in the following section. The estimated demographics results can be updated into the physical segment data in the corresponding SPD-1, stored in the In-store Shopper DB 220.

Figure 10:
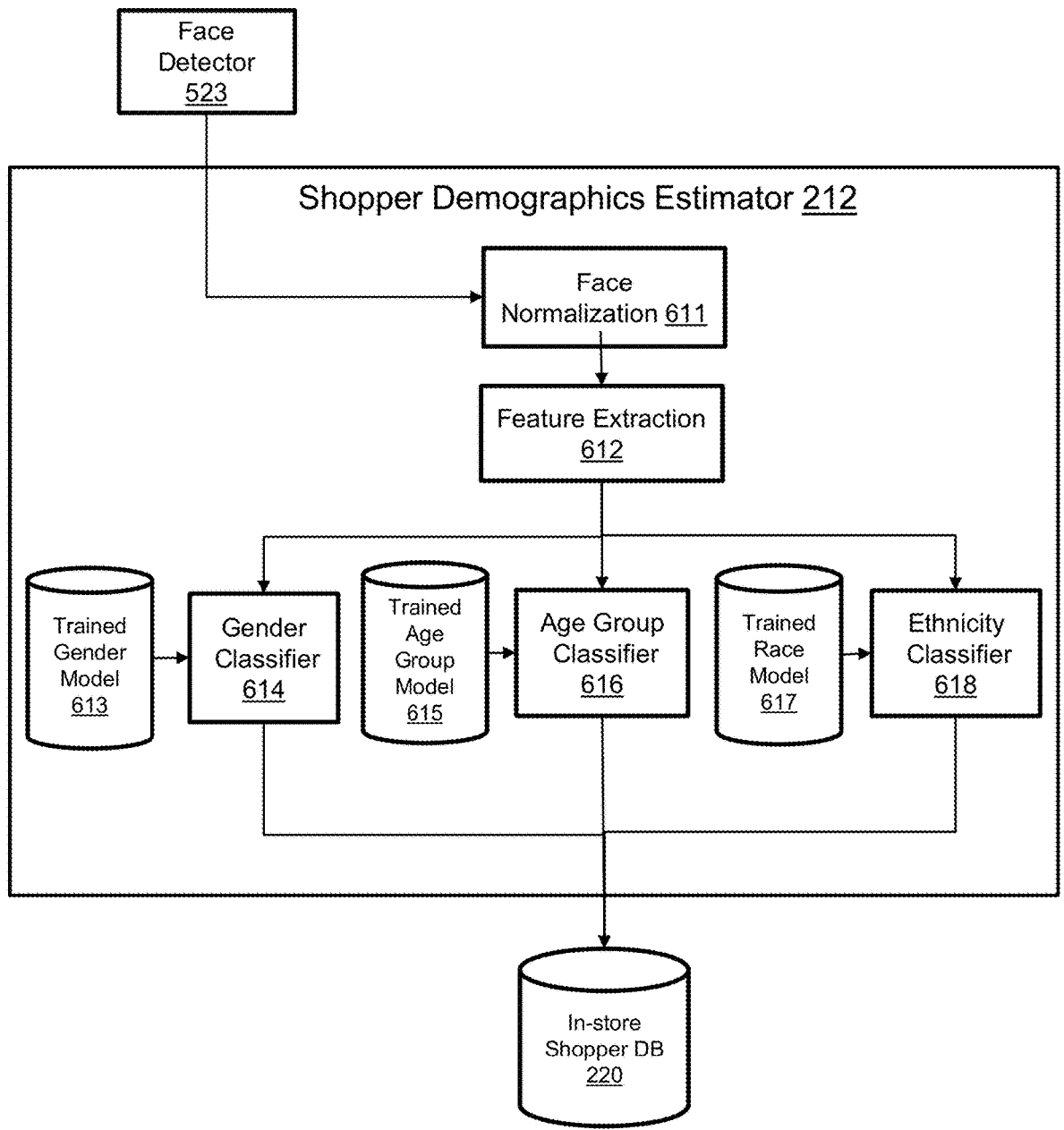
FIG. 10 shows an example block flow diagram of the Shopper Demographics Estimator module.

FIG. 10 shows an example block flow diagram for the Shopper Demographics Estimator 212. When a tracker is finished to track a shopper with a single or multiple face images (via the Face Detector 523), the Shopper Demographics Estimator 212 can result in three labels of demographics in terms of gender, age group, and ethnicity. For each label, it can have its own confidence value indicating how accurate the label output is.

For every face image, the Shopper Demographics Estimator 212 can have a major role to estimate the class label with a confidence value. This value can be used for aggregating the estimate of multiple face images with the same shopper ID by, for example, the weighted voting scheme.

The Shopper Demographics Estimator 212 can consist of three processes: Face Normalization 611, Feature Extraction 612, and classification in association with each demographics category such as gender (via the Gender Classifier 614), age group (via the Age Group Classifier 616), and ethnicity (via the Ethnicity Classifier 618). Exemplary details of each process is described as follows.

The Face Normalization 611 can be a process for normalizing the scale and rotation of a facial image to the fixed size and frontal angle. Like a preprocessor, this step can be necessary to associate an input image to the classifier model which is pre-trained with a fixed size and angle. For example, the scale and rotation parameters can be estimated by Neural Network which is trained from various poses and scales generated offline.

Next in the process, a proper feature, such as gray-scaled intensity vector, color histogram, or local binary pattern, can be extracted from the normalized face using the Feature Extraction 612 module. The extracted feature can be given for an input of each demographics classifiers.

Then, classification for each category can be done by help of the pre-trained model (utilizing the Trained Gender Model 613, Trained Age Group Model 615, and Trained Race Model 617) such as the Support Vector Machine which can provide the optimal decision boundary in the feature space. In this case, the final decision can be determined based on a confidence value that is computed on the closeness to the decision boundary in the feature space. Likewise, the confidence value can be decreased as the input is getting closer to the decision boundary.

Lastly, if multiple faces are available to a tracked shopper, the weighted voting can be straightforwardly applied to determine the final demographics labels. The output of the Shopper Demographics Estimator 212 can be saved in the In-Store Shopper DB 220 as updated shopper profile data (SPD-1). In another embodiment, a face fusion-based approach may be employed before determining the final demographics label, which fuses multiple faces into a single representative face by, for example, averaging the faces.

Figure 11:
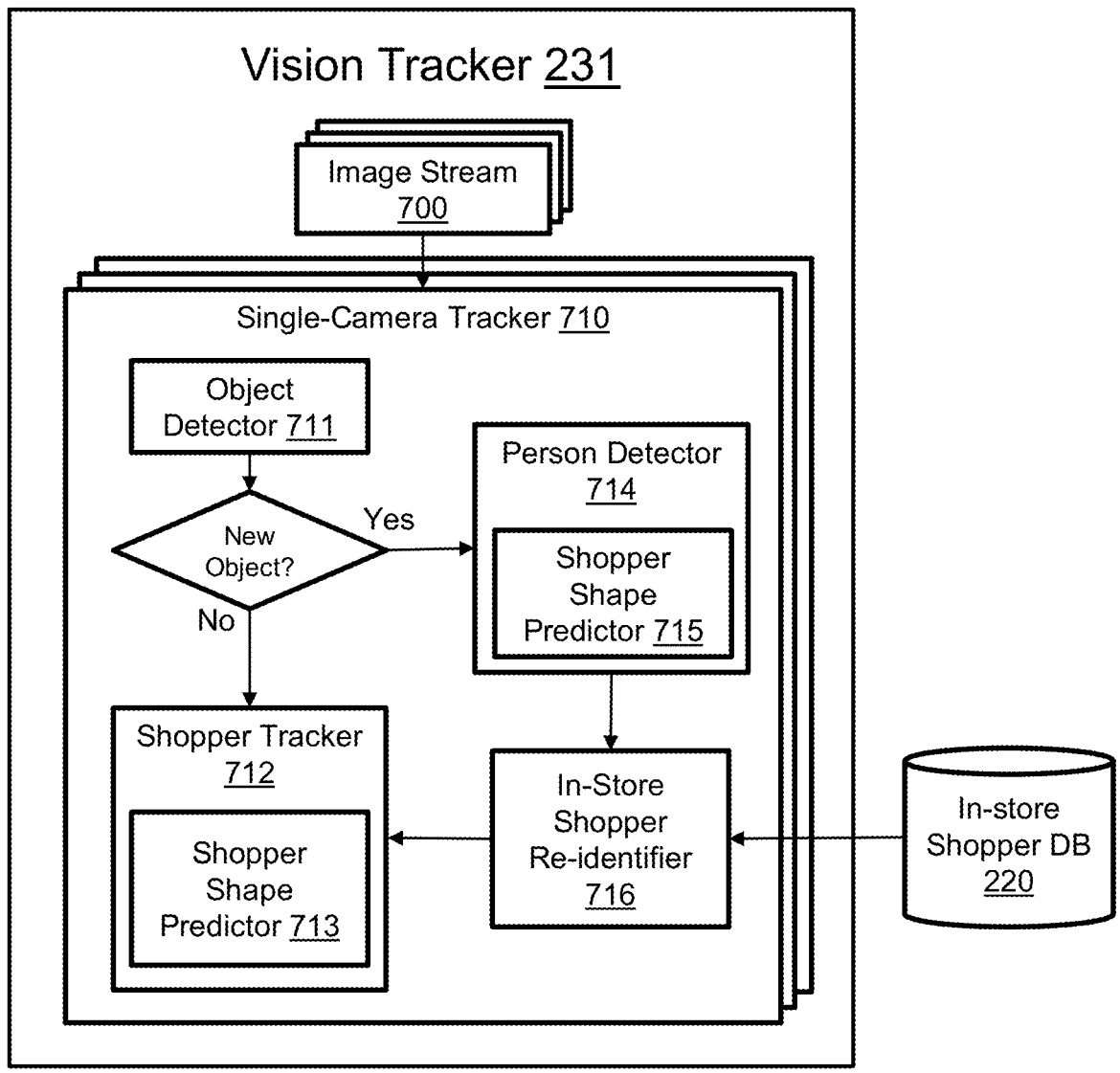
FIG. 11 shows an example block flow diagram of the Vision Tracker module.

FIG. 11 shows an exemplary embodiment for the vision-based tracking 231 method. The image stream 700 from deployed cameras 104 A-D can be given to the Object Detector 711 module. The Object Detector 711 can then detect any blobs that constitute foreground activity and can create a list of foreground blobs. An embodiment of the object detector could be using a background subtraction algorithm. After that, the Shopper Tracker 712 can update the list of the existing shopper tracks (which includes time and estimated locations of the shoppers) for the new image frame. In the Shopper Tracker 712, each tracker for an existing shopper can make a prediction on the shopper location for the new image frame. For each predicted shopper location, the Shopper Shape Predictor 713 can first predict the shape of the shopper based on the predicted shopper location and the pre-learned camera calibration parameters. The camera calibration parameters can be used to back-project the shopper shape onto the camera image plane. Then, a search window around the predicted shopper shape can be defined, and the location of the target in the search window can be determined by finding the best matching regions to the existing target feature. For example, a mean-shift tracker with HSV-based color histogram can be used to find the precise location of the updated target. The new target location can be used to update the target states of the tracker and thus to update the corresponding shopper profile data (SPD-2) in the In-store Shopper DB 220. Any blob detected in the Object Detector 711 that overlaps with the updated target tracks can be considered existing target activity and excluded from considering newly detected targets. For any remaining blob, it can run the Person Detector 714 to confirm the newly detected blob is a shopper blob. In the Person Detector 714, the Shopper Shape Predictor 715 can be used to generate a predicted shopper shape on the camera image plane at the blob location on the image using the pre-learned camera calibration parameters. A potential shopper around the detected blob can be found using the predicted shopper shape mask. The body features of the found shopper region can then be extracted based on the predicted shopper shape on the camera image plane and can be determined using a classifier if the blob is a human blob. If so, then a new shopper profile data can be created.

In a case where a same shopper is tracked by multiple cameras at the same time due to their overlapping field of view, the cameras may collaborate together to fuse the measurements about the same shopper from different cameras by exchanging the measurements, including the location and the extracted visual features. Such collaborative multi-camera tracking could generate a single and merged trajectory for a shopper over the multiple cameras with the same shopper profile data (SPD-2). This can be made possible by using the pre-learned camera calibration information that enables the back-projection of the same physical points onto different cameras. Given an assertion that different cameras are tracking the same shopper and potentially with a camera clustering algorithm, the shopper tracking information estimated from a camera (e.g., a cluster member camera) can be handed over to the tracker that runs on another camera's images (e.g., a cluster head camera). Besides such measurement fusion-based multi-camera tracking, in another embodiment, a trajectory fusion-based multi-camera tracking approach may be employed, which combines multiple trajectories about the same shopper that is created individually from different cameras.

The In-store Shopper Re-identifier 716 then can compare the newly created shopper profile data (SPD-2) with the existing shopper profile data (SPD-2) stored in the In-store Shopper DB 220 to see if there is any existing shopper profile data (SPD-2) that has the matching body features. If the newly created shopper profile data (SPD-2) matches existing shopper profile data (SPD-2), then it can retrieve the existing shopper profile data from the In-store Shopper DB 220. If the newly created shopper profile data (SPD-2) does not match to any existing shopper profile data (SPD-2), it can create a new shopper profile data (SPD-2) in the In-store Shopper DB 220 and also can instantiate a new target tracking instance in the Shopper Tracker 712.

Figure 12:
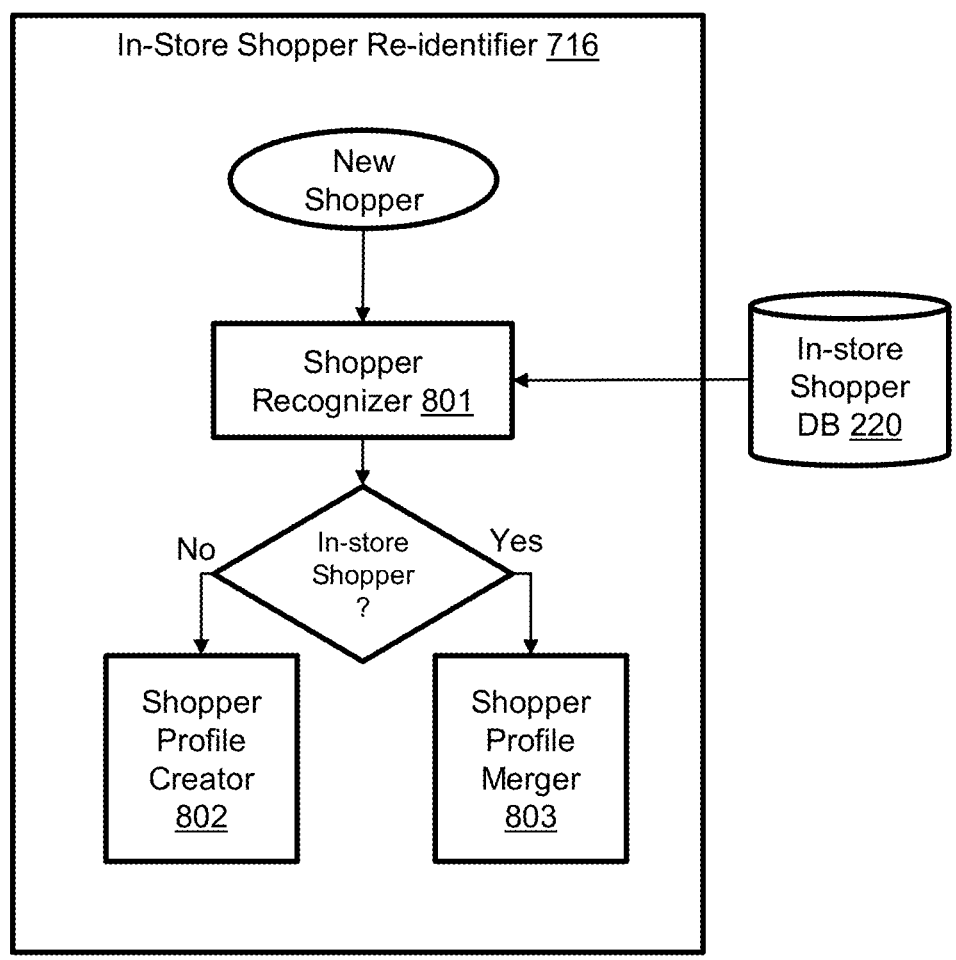
FIG. 12 shows an example block flow diagram of the In-Store Shopper Re-identifier module.
Figure 13:
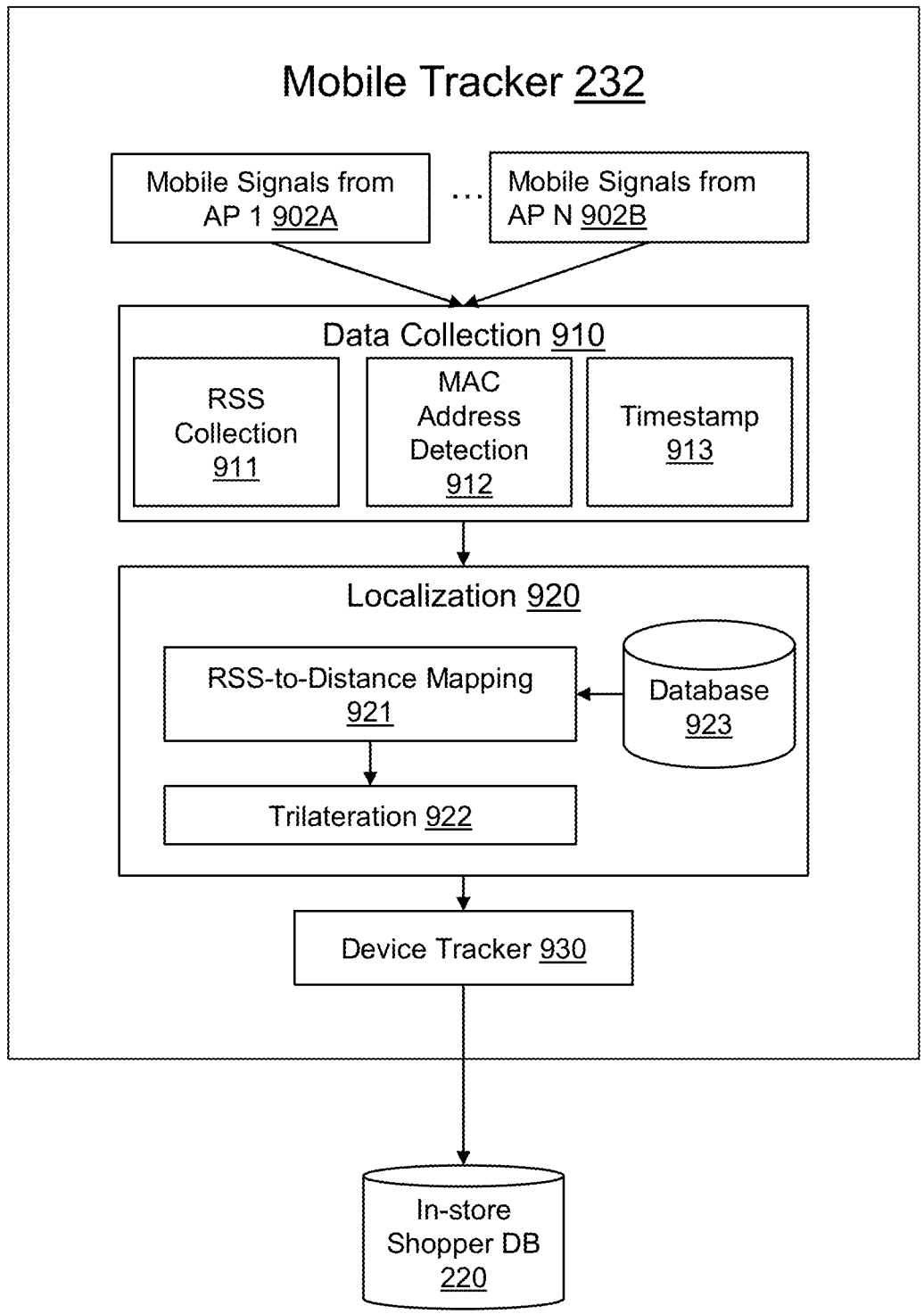
FIG. 13 shows an example block flow diagram of the Mobile Tracker module.

FIG. 12 shows a diagram of the In-store Shopper Re-identifier 716. In each camera, when a new human blob is detected, the In-store Shopper Re-identifier 716 can search for a matching shopper profile data from the In-store Shopper DB 220. Identifying the corresponding shopper profile data from the In-store Shopper DB 220 can be carried out by the Shopper Recognizer 801 using a classification algorithm. An embodiment of the Shopper Recognizer 801 can include the visual feature representation of the human blob and classification algorithm. The visual features should be invariant to the variations in the appearance and motion of the targets in different view in order to handle the case of random target movement and pose change. Such visual features can include color histogram, edges, textures, interest point descriptors, and image patches. Classification algorithms can include support vector machine (SVM), cascade classifier, deep-learning based neural networks, etc. If an existing shopper profile data is found, then it can be retrieved from the In-store Shopper DB 220, and merged with the new shopper profile data using the Shopper Profile Merger 803. If there is no matching shopper profile data, then a new temporary shopper profile data (SPD-2) can be created by the Shopper Profile Creator 802, and stored in the In-store Shopper DB 220.

FIG. 1 shows an exemplary embodiment for Wi-Fi sensor deployment. For Wi-Fi based tracking, we can also assume that a set of Wi-Fi signal sensors 106 A-C, which will also be referred to as access points or simply APs, can be deployed in an area of interest where the sensing range of the set of APs 106 A-C can cover the area with a certain sensing density p, where the sensing density p is defined as the level of overlap of the sensing range of the APs 106 A-C of the area. If an area is covered by APs 106 A-C with a density p, then it can mean that any point in the area is covered by at least p number of APs at any time. The value of p can be determined differently depending on the employed algorithms and environments. For example, for trilateration based Wi-Fi device localization schemes, p could be at least three while for triangulation based ones, p could be at least two. In a preferred embodiment where trilateration can be used as a localization method, the APs 106 A-C are usually deployed with the value of p being four, which is empirically determined to be a balanced tradeoff between cost and robustness.

The deployed APs 106 A-C can be calibrated in terms of Received Signal Strength-to-distance, RSS-to-distance, or radio fingerprint-to-location mapping. Both RSS-to-distance and radio fingerprint-to-location mapping are methods well-known in the art.

FIG. 11 shows an exemplary block flow diagram of the Mobile Tracker 232 module. In one embodiment, localization 920 can be calculated using an RSS-to-distance mapping 921. Due to the wireless signal propagation characteristics, the power of the signal decreases as the source of the signal gets farther. The relationship between the RSS and the distance from the source can be estimated by constructing a mapping function based on a set of ground truth measurements. Using the RSS-to-Distance Mapping 921 function, a trilateration-based localization 922 can be performed if there are at least three RSS measurements available for a person at a given time instant. The RSS-to-Distance Mapping 921 may be learned without any prior data if a self-calibration method is employed, which takes advantage of already-known locations of APs and their signals that are stored in a Database 923. In another embodiment, a radio fingerprint for an area of interest can be generated using a set of measurements from multiple APs for a Wi-Fi source at known positions. The radio fingerprint-to-location mapping can be used to localize a source of Wi-Fi signals.

A computing machine and APs 106 A-C can track the mobile signals 902 A-B of persons of interest in the Mobile Tracker 232 module. Given N number of APs 106 A-C deployed in an area of interest with a certain density p, each AP can be constantly searching for wireless signals 902 A-B of interest in a certain channel or multiple channels simultaneously if equipped with multiple radios. The AP with a single radio may hop over different channels to detect such wireless signals 902 A-B that could be transmitted from mobile devices present in the area. APs 106 A-C can search for wireless signals 902 A-B because mobile devices are likely to look for an AP for potential connection that may be initiated in the near future if the user of the mobile device attempts to use a wireless connection.

To get and maintain a list of nearby APs 106 A-C, most mobile devices 108 usually perform a type of AP discovery process if the wireless transmitter is turned on. The mobile devices tend to transmit a short packet periodically (i.e., Probe Request in the 802.11 standard) with a certain time interval between transmissions to discover accessible APs nearby. The time interval depends on (1) the type of the operating system (OS) of the mobile device (e.g., iOS, Android, etc.), (2) the applications that are currently running actively or in background, and (3) the current state of the mobile device, for example, whether the display of the mobile device is on or off. In general, if the display of a mobile device is on, then the OS puts the device in an active state, resulting in the interval getting shorter and transmission rate being increasing. If the display is off, then the OS would gradually putting the device into a sleep state through multiple stages.

Once a packet is transmitted from a mobile device 108 via wireless communications or mobile signals 902A-B, then a subset of APs 106 A-C can detect the packet around the mobile device if the APs happen to be listening at the same or an adjacent channel. The APs 106 A-C at an adjacent channel may be able to detect the packet since a Wi-Fi channel spectrum spans wider than the frequency width allocated for a channel. When a packet is detected at an AP 106 A-C, a data collection 910 process can occur where the PHY layer and MAC layer information of the packet can be retrieved which can include the Received Signal Strength (RSS) 911, MAC address 912, and a timestamp 913 of the packet transmission of the sender. The value of the RSS may be available in terms of the RSS Indicator (RSSI), and this value may vary significantly even during a short time period due to various signal distortions and interferences. To reduce such noise and variation the RSS values can undergo a noise reduction process during a set of consecutive receptions. In case of multiple mobile devices present, the unique MAC address 912 or ID of mobile devices 108 can be used to filter and aggregate the measurements separately for each individual mobile device.

In the localization 920 method where RSS-to-Distance Mapping 921 can be used, the values of the RSS readings can be converted to a real-world distance from each AP 106 A-C by utilizing the pre-learned RSS-to-Distance Mapping 921 function for each AP 106 A-C, which could be stored in a database 923. If there are distance measurements from at least three different APs 106 A-C available, then a single location can be estimated by employing a trilateration-based approach 922. The estimated current location can then be fed into a tracker (e.g., Kalman filter and Particle filter) with the unique ID, the MAC address 912, so that the optimal current location and thus trajectory can be estimated in a stochastic framework in the mobile Device Tracker 930 module. The trajectory can then be stored in the In-store Shopper DB 220 as shopper profile data (SPD-3) with the specific MAC address.

FIG. 14A-C show an example of the tracking results from vision-based tracking and mobile signal based tracking. FIG. 14A shows an example of person being tracked with her mobile device by vision and Wi-Fi sensors as described in FIG. 1. FIG. 14B reveals an example of tracking said person through vision sensors. The vision tracking can yield many trajectory fragments. Due to the dynamic nature of visual features of the same person in different environmental conditions, it is highly likely that the trajectories of the single person that are generated using vision-based tracking (which will be referred to as the vision-based trajectories or simply VTs) are possibly fragmented into multiple segments of partial trajectories due to potential tracking failures. In case of multiple persons in the same area, it is usually challenging to determine which VTs correspond to which persons. In spite that it can be difficult to associate the same ID for a longer period of time across different cameras especially when there are cluttered backgrounds or visually-similar irrelevant objects nearby, the vision-based tracking can provide high-resolution and accurate tracking. FIG. 14C shows an example of tracking said person using Wi-Fi sensors. The resulting trajectory is consistent and unbroken. However, Wi-Fi based trajectories (which will be referred to as the Wi-Fi based trajectories or simply WTs) resulting from the mobile trajectory generation can suffer from low sampling frequency and low spatial resolution although it is featured by a unique and consistent ID.

FIG. 15 shows an exemplary embodiment of the Multi-modal Trajectory Fusion 249 process. By combining these two approaches using the Multi-modal Trajectory Fusion 249 approach in a preferred embodiment of the present invention, multiple persons can be tracked more accurately in terms of localization error and tracking frequency and more persistently than would be possible by a single Wi-Fi or vision based tracking. Given that a set of cameras 104 A-D and APs 106 A-C are deployed capturing measurements in an area of interest, the Mobile Tracker 232 module may detect when a person carrying a mobile device 108 with its wireless transmitter turned on (which will be referred to as a mobile-carrying person) enters the area by detecting radio traffic from a new source and/or by confirming that the source of radio traffic enters a region of interest. Upon the detection of the entrance of a new mobile-carrying person, the system can track the mobile-carrying person within the region of interest (e.g., the retail space of a mall). The Mobile Tracker 232 module can also detect the exit of the mobile-carrying person by detecting an event in which the period that the radio traffic is absent is longer than a threshold of time and/or the source of the radio traffic exits the region of interest. The trajectory in between the entrance and exit of the mobile-carrying person can be inherently complete and unique due to the uniqueness of the MAC address of the mobile device.

Independent of the mobile signal-based tracking, any person who enters the area where a set of cameras are deployed may be tracked by each individual camera 104 A-D or by the multiple cameras 104 A-D collaboratively possibly while forming a cluster among them in the Vision Tracker 231 module. A person can be persistently tracked with a certain level of uncertainty if there are no significant visually similar objects in the same field of view of the cameras resulting in a longer trajectory or more persistent tracking. Whenever a tracking failure occurs due to cluttered background or visually similar irrelevant objects, the trajectory may be discontinued, and the tracking may be reinitiated. Since the re-identification of the person may or may not be successful during the entire trip of the person within the area, multiple disjointed trajectories may be created for the same person across the trajectories. The tracking results can then be stored in the In-Store Shopper DB 220. In an embodiment, the tracking results may be in the form of a tuple of (x, y, t) with associated uncertainty or in the form of a blob data with its timestamp and visual feature vector.

Figure 16A:
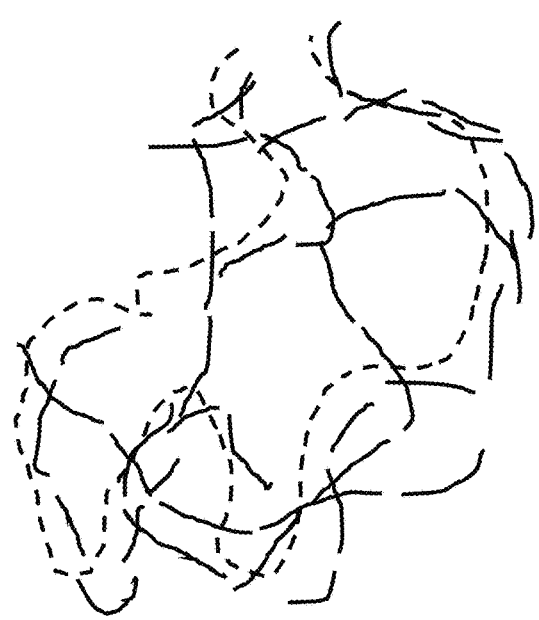
Figure 16B:
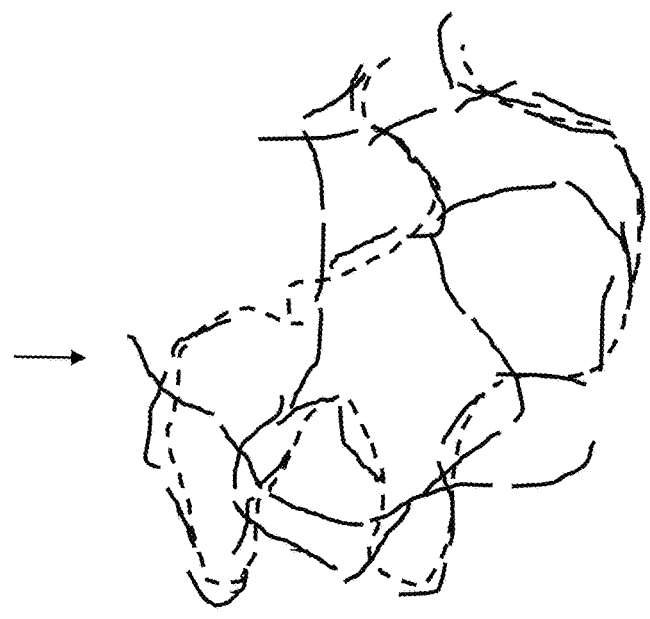
Figure 16D:
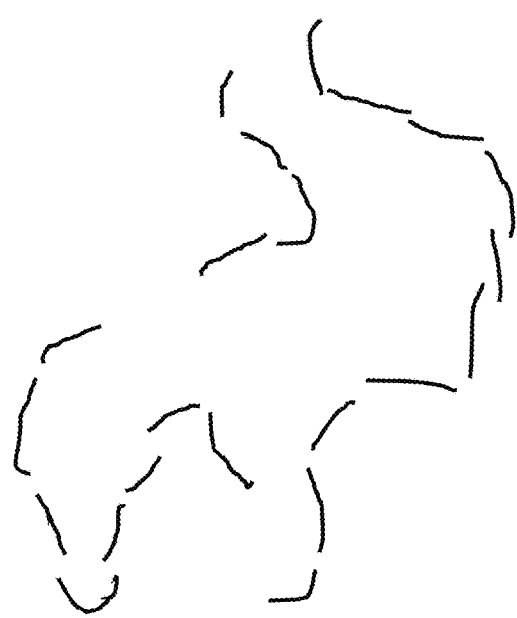
Figure 16C:
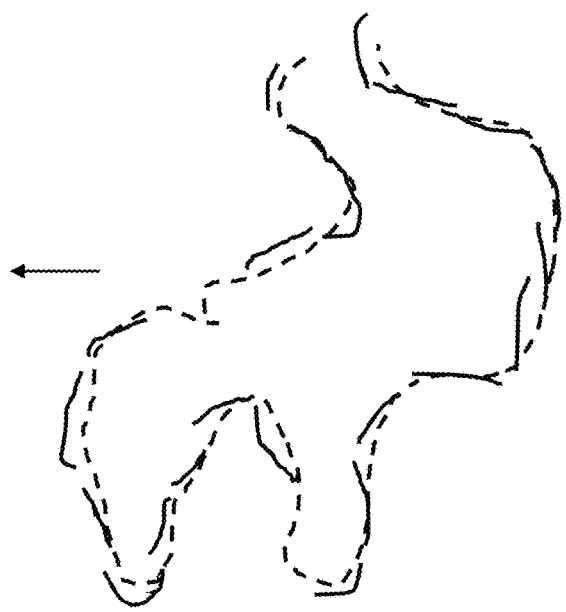

Once the complete Wi-Fi based trajectory of a mobile-carrying person (i.e., a WT as defined earlier, stored as SPD-3) is generated by the Mobile Tracker 232 module and retrieved from the In-Store Shopper DB 220 by the Mobile Trajectory Detection 1130 module, the system can identify and retrieve from a database the vision-based trajectories of persons (i.e., VTs as defined earlier, stored as SPD-2), using the Vision Trajectory Retrieval 1140 module, that are generated during when the WT is generated. These VTs can form the pool of the candidates that potentially correspond to the WT. Then, a set of VTs can be identified among the pool of the candidates by comparing the distance statistics of the VTs to the WT of the mobile-carrying person and also comparing the motion dynamics including direction and speed. This process assumes that the WT is an approximate of the actual trajectory of the mobile-carrying person and makes use of the WT as an anchor. Once the VTs (SPD-2) corresponding to the WT (SPD-3) is identified, then the unique ID of the WT can be assigned to the set of VTs, creating a new shopper profile data (SPD-4) that combines the matching VTs (SPD-2) and the WT (SPD-3). This process of identifying a set of VTs that corresponds to a WT can be called Mobile and Vision Trajectory Association 1150. FIG. 16A-D show a detailed example of the Mobile and Vision Trajectory Association 1150. In FIG. 16A, a set of potential VT candidates can be overlaid on the WT, which is represented by the dashed line. FIG. 16B shows an example of an initial matching process between the VT candidates and the WT. FIG. 16C shows an example of the matched VTs and the WT, which are then assigned to each other with a unique identification, resulting in the exemplary trajectories shown in FIG. 16D.

The VTs in SPD-4 with the assigned unique ID can then be used as the primary source to reconstruct the trajectory of the mobile-carrying person since they can be more accurate than the WT. The identified VTs (which are actually a set of fragmented VTs for a single person) can then be combined together to generate a single trajectory in case there are multiple vision measurements for the same target at the same time instance. In an embodiment, a Kalman or Particle filter may be used to combine multiple measurements. This process of integrating multiple VTs to reconstruct a single trajectory can be called Vision Trajectory Fusion 1160.

Vision measurements may not be available for longer than a threshold due to various reasons because, for example, (1) some of the correct vision measurements may be discarded in the ID association process, (2) some of the cameras may not be operated correctly, (3) the background may be changed abruptly, (4) some regions are not covered by any camera, etc. In such cases, the combined trajectory that is constructed only from the vision measurements may have missing segments in the middle. The missing segments can be reconstructed by retrieving the missing segment from the WT stored in the database since the WT has the complete trajectory information although its accuracy may be relatively low. This process can be called Trajectory Interpolation 1170. Since the point-to-point correspondence between WT and VTs can be found in the Mobile and Vision Trajectory Association 1150 process, the exact segments in the WT corresponding to the missing segments can be identified. The found segments in the WT can be excerpted and used to interpolate the missing parts of the combined trajectory resulting in a single and complete final trajectory (which will be referred to as the fused trajectory or simply FT). It can be made possible since in nature the WT is a complete trajectory of the person albeit with a low resolution.

The above Trajectory Interpolation 1170 process assumed that a Wi-Fi trajectory (i.e., WT) can be generated with a low sampling frequency, yet it may be the case that there are multiple long periods of time where no Wi-Fi measurements are received. In practical cases, the pattern of Wi-Fi signal emission from a mobile device is a burst of multiple packets often followed by a long period of sleep due to the energy conservation schemes in the operating system of the mobile device. Thus, it is often the case that there are multiple periods where no Wi-Fi signals are detected for longer than, for example, 30 seconds, resulting in missing holes in Wi-Fi trajectories.

In an embodiment, such missing holes may be estimated and interpolated by taking into account both the store layout and the other shoppers' trajectories in a database by inferring the most probable path taken using a learning machine and based on the other shoppers who followed the similar path of the shopper that are actually measured before and after the missing parts of the trajectory.

Once the Trajectory Fusion and Interpolation process is completed, the final trajectory may be further refined taking into account the store floor plan and layout that describes the occupancy map of the fixtures and other facilities/equipment where shopper trajectories must not exist. In an embodiment, a shopper trajectory may be modified in such a way that it detours such obstacles with a shortest trip distance. If there are multiple such detours are available which has similar trip distances, the past history of other shoppers may be utilized to estimate more preferred and likely path that the shopper may take. This process can be called Trajectory Refinement 1180. The results of this process can be new shopper profile data (SPD-4), which can then be used to update the In-store Shopper DB 220.

FIG. 17 shows an example of the Shopper Data Association 242 module. This process can merge the shopper profile data (SPD-1) from the At-Door Shopper Detector 210 with the shopper profile data (SPD-4) from the Multi-modal Trajectory Fusion 249 process creating a new shopper profile data (SPD-5) that can be stored in the In-Store Shopper DB 220.

Upon the creation of the shopper profile data (SPD-4) from the Multi-modal Trajectory Fusion 249, the Shopper Matching 1341 step can retrieve a set of shopper profile data (SPD-1) from the In-Store Shopper DB 220 that were created at about the same time when the shopper corresponding to the SPD-4 entered or exited the retail space. Given the set of candidate matching SPD-1 to the SPD-4, the similarity of the visual features (for example, but not limited to, face and body features) and other available shopper data (for example, but not limited to, existing estimated demographics data) between them can then be computed during the Shopper Matching 1341 step. The similarity computation can be performed using any number of algorithms that would be well-known by one skilled in the art, including color histogram-based matching, texture-based matching, etc. For each instance of the shopper profile data (SPD-4) from the Multi-modal Trajectory Fusion 249 module, the best matching (i.e., most similar) At-Door Shopper Detector 210 data instance can be identified. The Shopper Profile Data Merging 1342 step can then combine the identified shopper profile data (i.e., the matching pair of SPD-1 and SPD-4) to create a new shopper profile data (SPD-5) that can be stored in the In-Store Shopper DB 220.

FIG. 18 shows an example block flow diagram of the Trajectory-Transaction Data Association 243 module. Given a complete trajectory of a shopper in a retail store that can be obtained by the Shopper Data Association 242 (which will be referred to as SDA, stored as SPD-5) process described in the previous section, the exemplary embodiment can associate the given trajectory with Point of Sale (PoS) data (which is also called transaction data or simply T-log data) that can contain a list of items purchased by the shopper. Such association process (which can be referred to as Trajectory-Transaction Data Association 243 or simply TT Association) can enable further analysis on the shopping pattern and buying behavior analysis.

While the trajectory data of a shopper can indicate how the shopper navigates through a store and what marketing elements the shopper has been exposed to during the shopping trip, the T-log data of the shopper can tell us what items the shopper actually purchased after a series of exposures to various marketing elements. The T-log data can be crucial to understand what products wins and fails among the competition in the shelf and the final decisions that the shopper made through a course of decision process.

FIG. 18 shows the PoS Item Localizer 1410, which can accept as inputs the Store Layout 1402 and Planogram 1401 data, in addition to the transaction data from the PoS DB 250. Given a shopper profile data (SPD-5), the PoS Item Localizer 1410 retrieves a set of transaction data that are generated about at the same time that a tracked shopper exited the store. The categories of the items in the retrieved transaction data can be identified using a pre-learned Item-Category Mapping 1411 table. The location of the identified categories of the items in the store can then be mapped using the store layout and planogram information (i.e., Category-Store Map Mapping 1412), revealing the location of the items that were picked by the shopper.

Despite the importance of T-log data in shopper behavior analysis as well as the trajectory data, it can be a challenging problem to correctly associate a T-log data with the trajectory of a shopper who made the transaction due to the lack of a consistent ID between T-log data and the trajectory. Given the list of items purchased and the timestamp that the transaction is made, however, it may be possible to find the best corresponding pair between a given shopper trajectory and a set of candidate T-log data. In this section, we present the PoS-to-Trajectory Matching 1430 module that describes how to find such best pair under the assumption that the entire store is covered by both vision and Wi-Fi sensors with a certain density for the system to be able to track shoppers in both modalities. The output of this module can be shopper profile data (SPD-5) that has been updated with the corresponding T-log data.

FIG. 19 illustrates an example of the Trajectory-Transaction Data Association (or TT Association).

The problem of TT Association is defined as the following:

Given that a given complete trajectory and a set of T-log data in a similar time frame, to the present invention seeks find the best corresponding pairs between them if exist.

To find a T-log data that most likely matches with the trajectory, a metric that represent the matching likelihood between the given trajectory and the T-log data needs to be defined.

Therefore, given a single complete trajectory and a single T-log data $T_j$, to the present invention can compute the likelihood $P_j$ that all of the items in $T_j$ are picked up along this trajectory.

To compute the likelihood for all of the items to be picked up along the trajectory, the present invention can define a metric that measures the probability that a given item $I_i$ in a given T-log data $T_j$ is picked up along the trajectory, which is called $P(I_i|T_j)$. Then, we can find $T_j$ such that $$j = \underset{j}{\operatorname{argmax}} P_j,$$

where $$P_j = \prod_{i=1}^{N} P(I_i | T_j).$$

When computing $P(I_i|T_j)$, the present method can introduce a new term called shopping fixation. The shopping fixation can refer to an event where there is a change of shopper's behavior, and the shopper's behavior appears to be triggered by a retail element. Shopping fixation can be determined based on the motion dynamics of a shopper. If the shopper's motion gets slower and made a U-turn or stopped, then we can assume some item caught the shopper's attention, resulting in a shopping fixation 1502A-C at the point while converting a passer-by into a shopper. $P(I_i|T_j)$ can be computed only from the closest shopping fixation 1502A-C (not a just closest point) in the trajectory to the item of interest $I_i$ 1504.

In an embodiment, $P(I_i|T_j)$ may be defined as the following: if at least a shopping fixation (which will be referred to as S) exists within a visible and reachable range r from the item, then $P(I_i|T_j)$ will be equal to 1 and otherwise 0 to ensure that every item is picked up along the trajectory.

$$P(I_i | T_j) = \begin{cases} 1, \exists S \leq r \\ 0, \text{Otherwise} \end{cases}$$

In another embodiment, $P(I_i|T_j)$ may be defined to make $P_j$ robust to potential errors in shopping fixation detection and shopper tracking. To accommodate such errors, $P(I_i|T_j)$ may be defined as:

$$P(I_i | T_j) = \begin{cases} 1, \exists S \leq r_1 \\ 0.5, r_1 < \exists S \leq r_2 \\ \ldots \\ 0.1, \text{Otherwise} \end{cases}$$

where $r_1 < r_2 < \ldots < r_K$.

Instead of using a probabilistic measure, we can also solve this problem using a geometric distance statistics. In this case, the probabilistic measure $P(I_i|T_j)$ can be replaced by a distance metric $d_i^j$ that represents the distance from the item $I_i$ 1504 to the closest shopping fixation 1502A in the trajectory $T_j$. We can then define the overall distance metric $D_j$ like the following:

$$D_j = \sum_{i=1}^{N} (d_i^j)^2$$

Using these metrics between a trajectory and a T-log data, the present invention can iterate this process over all trajectory candidates and find the one with minimum distance or maximum probability for the given T-log data.

Given the complete trajectory and its associated T-log data of a shopper with a unique ID assigned by solving the TT Association problem, the present invention has outlined a full understanding of (1) how the shopper navigates through the store, (2) what part of the aisle or category caught the attention of the shopper, and (3) what items the shopper actually purchased.

FIG. 20 shows an example of the Revisiting and Cross-visiting Shopper Identifier 260 process. This process can accept as input the result of the Multi-modal Shopper Data Associator 248 (SPD-5) and can determine whether a shopper already exists in the Cross-channel Shopper DB 280.

The Shopper Recognizer 2321 module can use the shopper profile data (SPD-5) for the newly identified shopper to search the Cross-channel Shopper DB 280 looking to find whether this shopper profile data (SPD-5) matches existing shopper profile data (SPD-6) in the Cross-channel Shopper DB 280. In the case of a revisiting shopper, existing shopper profile data (SPD-6) could have been generated at the same retail location. In the case of a cross-visiting shopper, existing shopper profile data (SPD-6) could have been generated at any of the other locations where the system is tracking shopper behavior. The matching process in the Shopper Recognizer 2321 can be carried out based on the Shopper ID Vector (SIV) 301 of each shopper's profile data. More specifically, the Global ID Vector can be utilized since they are meant to be unique over time and space. The MAC address of radios in the mobile devices of the shoppers can clearly be the most unique identifier, so that may be used to find the match among the Cross-channel Shopper DB 280. In another embodiment, face features may be used as well to find the match using a face recognition algorithm in case the MAC address obtained may not be considered reliable enough due to the increasing number of applications and operating systems that use a randomized MAC address for the cases when data communication is not necessary.

If the current shopper profile data matches an existing shopper profile with similarity greater than a predetermined threshold, then the Shopper Profile Merger 2323 can retrieve the existing shopper profile data (SPD-6) and can merge it with the input shopper profile data, updating the existing shopper profile data (SPD-6) with the new measurements in SPD-5. If a match is not found exceeding a predetermined threshold, then a new instance of shopper profile data (SPD-6) can be created in the Cross-channel Shopper DB 280, using the Shopper Profile Creator 2322.

FIG. 21 shows exemplary processes for the measurement of the shopper's decisions with regard to product categories, in which computer vision-based behavior analysis and segmentation measurement, i.e., demographics measurement and impression analysis, can be associated in an exemplary embodiment.

The exemplary embodiment can comprise modules of:
automatic behavior measurement and analysis,
automatic demographics measurement and analysis,
impression analysis,
semi-automatic data measurement and analysis, and
a module for associating the measurements and analyses.

The exemplary embodiment can identify various variables for the interaction stages of the person with regard to a set of product categories, as observed decision processes in a store area. The variables can include behavioral measurement, segment information, such as demographics, and impression level. The variables can show which sequences of nodes or decision paths the shopper made during a measurement period.

In a preferred embodiment, the video-based analysis can be processed automatically. However, another exemplary embodiment can process the video-based analysis semi-automatically, where a semi-automatic annotation tool is used in combination with automatic behavior analysis, demographic analysis, and impression analysis. The present invention can utilize an efficient video annotation tool, such as that disclosed in U.S. Pat. No. 8,665,333 to Sharma, et al., as the semi-automatic annotation tool.

Furthermore, the exemplary embodiment can organize the sequence of decision paths in relation to each demographic segment. The demographic segments can include age range, gender, and ethnicity, and the demographic segmentation can be used to identify any typical shopping pattern of specific shopper segments, if they exist. The exemplary embodiment can also organize the measurement of decision patterns based on other segmentation approaches, such as trip type analysis of the shopper. The trip type includes shopping patterns of the shopper. Further, the exemplary embodiment can evaluate the engagement process of the shopper with each category, in granular detail. The granular detail can comprise the behavior of reading labels, comparing products, sniffing products, and other physical interactions with the products. However, although any type of interaction behavior may be considered for the decision process, the primary behavior can be the purchase behavior of the shopper. Therefore, the shopper's purchase behaviors in association with the product attributes are primarily measured and used to construct the decision tree.

While details of a preferred embodiment for multi-modal shopper behavior analysis was described above, a more generalized embodiment is illustrated in the Multi-modal Shopper Tracker 230 as shown in FIG. 21. The exemplary embodiment can detect 717 and track 718 a shopper, using input from the mobile sensors 706 and video sensors 708. The trajectories of the shopper tracks can be joined from a video of one of the cameras 104A-D to another video of one of the cameras 104A-D while the shopper appears and disappears between the fields-of-view among the cameras, along with tracks formed using mobile APs 106A-C. Based on the tracking information, the exemplary embodiment can perform the path analysis 470 of the particular shopper. The path analysis 470 can be used as one of the ways to process the behavior analysis 480 of the shopper and obtain useful information about the shopper's behavior, such as engagement behavior with a product. The interaction of the shopper 245 can also be detected based on the behavior analysis as discussed later with regard to FIG. 26. FIG. 22 also shows details of an exemplary interaction detection 245 process.

The exemplary embodiment can also process segmentation 800 of the shopper, based on the images of the shopper in the video. Demographic classification 814 is an exemplary segmentation 800 of the shopper.

The segmentation 800 and behavior analysis 480 data can be used to calculate the values for the predefined variables 241, such as the first-stop counter and the demographic class counter. The measurements can be sent to the module for the association of measurements and analyses 244. The personalized decision tree construction module 282 constructs a personalized decision tree (PDT) based on the measurements and analyses. The tree construction and tree management processes, such as insertion and deletion of nodes, follow well-known data structure management processes.

In another exemplary embodiment, impression analysis 240 can be carried on images of the shopper for measurement as a part of the behavior pattern of the shopper while making shopping decisions. The impression measurement module can count and measure the impression length. The impression measurement module can also process a deeper impression analysis in correlation with other parameters, such as the duration of viewing time for a particular product category per demographic segmentation. With regard to the impression count and measurement, the present invention can utilize any well-known impression measurement method. U.S. patent application Ser. No. 11/818,554 of Sharma, et al., (hereinafter Sharma Ser. No. 11/818,554) disclosed details of a system for measuring the impression level through the viewership of people. An exemplary embodiment of the present invention can utilize Sharma Ser. No. 11/818,554 for the impression measurement in the impression analysis 240, especially utilizing the 3D facial pose estimation 534.

In an exemplary embodiment, the impression analysis 240 module can also utilize other variables to measure the deeper level of impression. The other variables can comprise the relationship of the category with the surrounding categories, demographic segmentation, and temporal attributes. For example, a more than average number of impression counts for a category in relation to a specific demographic group may indicate that the category had an unusual influence in the decision-making process by the specific demographic group in a particularly meaningful pattern. Likewise, the impression count data can be analyzed to measure the impact on the decision-making process by each predefined demographic group in relation to the particular category.

The measured data and constructed decision tree can be stored in the Cross-channel Shopper DB 280. The analysis of the measured data can be further facilitated by applying a set of predefined rules 983 in a rule base 982.

In the exemplary embodiment, the analysis of the measured data can be further facilitated by applying a set of predefined rules 983 for the decision tree construction in a rule base 982 through a rule application logic module. The rule application logic module can enable a dynamic rule application, rather than relying on an ad hoc solution or static hard-code in translating the measured data.

An exemplary rule application logic module can be implemented utilizing the information unit verification technologies in U.S. Pat. No. 7,904,477 to Jung, et al.

The rule application logic module can enable the adjustment in the analysis of shopping decision measurement, the construction of the decision tree, and processes related to the decision tree, to be done in a structured and dynamic way. The exemplary analysis formula and statistical model can be dynamically adjusted based on the rule application logic module.

The rule application logic module can further construct the criteria based on a combination of a set of predefined rules, in which the analysis of the data can be performed in further detail. The rule application logic module can further define domain-specific criteria for the decision tree construction. The rule application logic module can facilitate the process of producing a unified and standardized decision tree construction, by normalizing the variance within the predefined thresholds. For example, if a measurement is skewed due to less desirable environmental factors, the differences can be adjusted by applying normalization offset values to the differences within predefined thresholds using the rule application logic module. Then, the analysis can take this into consideration at the final analysis of the decision tree construction.

The application of the rule application logic module can differentiate the levels of measurement and analysis of the decision tree construction, where a first set of criteria is applied throughout the preliminary data, and a second set of criteria is applied to the next level of data for a complicated analysis, in order to serve the specific needs of the complicated analysis. An exemplary first set of criteria can typically comprise common criteria throughout all of the data, and the second set of criteria is typically different from the first set of criteria.

FIG. 22 shows an exemplary setup phase and interaction detection process for the subcategories in a category, where the subcategories are defined at the product group level.

In an exemplary embodiment, an exemplary category can be divided into subcategories in association with the product groups on shelves in a category, based on the product group definition. In this example, the shopping behavior analysis relies on the shopper's interactions with the product groups on shelves and the association of the product group with the grid element, such as the "grid element—product group association" 586. The products in product groups can be grouped based on the same kind of predefined attributes.

In the exemplary embodiment, one or more cameras can be used to detect the shopper's presence in the vicinity of a plurality of subcategories, defined at the product group level, i.e., based on the attributes. Then, a second group of one or more cameras can be used to detect the shopper's interaction with the product groups in association with the subcategories on shelves.

An exemplary setup phase and interaction detection 245 process for the subcategories, i.e., product groups, is discussed as follows. Product group interaction detection can be achieved by building a model through an interaction model generation 587 process, during the setup phase, and using output from computer vision algorithms in conjunction with that model to detect the interaction of the shopper with any defined product group, such as the product group definition 585.

During the setup phase, a polygon can be drawn around the shelf or shelves of interest. The grid generation 584 module can then divide the region into logical grid elements in a grid 580 (shown in FIG. 25) by taking the perspective distortion due to the camera view into account. In an exemplary embodiment, the grid elements can have IDs, i.e., grid element IDs, which start at a certain number, such as zero or one, on the top left corner, and progressively scan the grid elements to the bottom right. During the setup phase, regions on the shelf that make up a product group can be marked by drawing polygons around the corresponding regions.

Once this is done, the grid assignment module 592 can match all of the grid elements that match each product group by checking for intersection of the grid element with the regions. Then, the grid logic generation module 593 can use the perspective projection of the camera and generate a look up table for deciding which region to pick when more than one grid element is active. Active grid elements can be those that have temporal motion in them. When more than one grid element is active, the grid element IDs can be arranged in increasing order, and the lowest ID can be used to look up the region to select.

Once the setup is finished, the video from the camera 330 can be processed by a module that detects temporal motion, such as the temporal motion detection 589, at every pixel in the image. The grid elements that have a minimum threshold of pixel with motion can be marked as active grid elements at the active grid detection 590 process. The look up logic module can be used to determine which region is being interacted with to find the right product group at the product group interaction detection 591 process.

The temporal motion can be calculated based on a frame differencing method. In another exemplary embodiment, any reliable hand tracking 381 method can also replace the temporal motion detection for detecting the interaction of the shopper with the grid elements for a category, i.e., a product group.

Based on the described processes for the product group interaction detection process for a product group above, the exemplary embodiment can detect a plurality of interactions of the shopper with subcategories in the category, especially at the product group level, and the accumulated detection data can provide important information for the category analyses that are described above.

In another exemplary embodiment, an exemplary category can be further divided into multiple subcategories based on the sub-regions that are associated with certain types of the products in the sub-regions in the category. In this example, the shopping behavior analysis can be based on the path analysis of the shopper.

FIG. 23 shows an exemplary view from a top-down position, where the shoppers' movements through a store area can be observed based on the multi-sensor tracking information.

The first stop count and measurement for the duration of dwell time can be used for analyzing the shoppers' shopping movements. A floor coordinate system can be used. For example, a (x, y) coordinate system can be applied to a target store area, such as an area adjacent to a shelf 181. The area can be further divided into a set of sub-areas that are associated with the categories.

In the exemplary embodiment shown in FIG. 23, the input images can be analyzed from the top-down means for capturing images, and increases the traffic count for the category in which the associated area is visited by the shoppers in the first-stop detection process. For example, in the exemplary embodiment, a "physical space bounding box for category 1" 161, a "physical space bounding box for category 2" 162, a "physical space bounding box for category 3" 163, and a "physical space bounding box for category 4" 164 can be predefined, and the exemplary embodiment processes tracking 420 of each person in the vicinity of a category. If the coordinate, i.e., (Xi,Yi,Ti) 444, of a person stays in one of the bounding boxes for longer than a threshold time as a first-stop, then the traffic count can be increased for the first-stop detection of the category that is associated with the particular bounding box.

Furthermore, another set of thresholds can be utilized for a different type of shopping behavior. For example, a pair of temporal thresholds, i.e., a lower limit and an upper limit, can be set up for a certain type of interaction behavior with a product. If the coordinate, i.e., (Xi,Yi,Ti) 444, of the person stays in one of the bounding boxes for longer than a lower limit threshold time and less than or equal to an upper limit threshold time, then the count can be increased for the interaction with a product of the category that is associated with the particular bounding box.

One or more top-down view cameras can be installed in such a way that their fields-of-view can cover the predefined physical space bounding boxes. For the simplicity of explanation, one physical space bounding box can be assigned to each vertical column, called "category block," of the shelf space, and it can be assumed that one category is associated with each of the physical space bounding boxes per the vertical column in the exemplary embodiment in FIG. 23. However, there can be multiple categories in one vertical column of the shelf space, and the situation of multiple categories can be resolved in one column of the shelf space in coordination with using the frontal-view images from the second means for capturing images. The frontal-view images can provide information about which category the shopper intended to make the first-stop, e.g., viewership information about the specific category that the shopper looked at for certain duration of time, thus increasing the correct first-stop counter. An example of using the frontal-view images from the second camera, along with hand tracking to detect the interaction of the shopper, will be shown later. Further, in an alternative embodiment, a semi-automatic method can also be used to resolve the situation of multiple categories in one column of the shelf space.

FIG. 24 shows an exemplary embodiment application of spatiotemporal criteria that can be used to differentiate between a premeditated purchase and an impulse purchase 247.

The exemplary embodiment can measure a premeditated decision compared to an impulse or extemporaneous decision, based on the observation of the outlier behavior pattern in the decision tree. For example, shoppers who frequently purchase from a product category in a particular store become more knowledgeable about the location of products in the category, i.e., develop familiarity with the category layout. Also, if they are loyal to a particular brand/product type within the category, their decision process in the store is very quick. Therefore, their shopping activity and path could show a repetitive pattern of the decision-making process for the particular product category compared to other product categories. FIG. 30 (discussed later) shows an example of a decision tree that identifies premeditated and impulse purchase decisions, based on the in-store behavior of the shopper. The accumulation of the decision processes, and accordingly the corresponding decision paths in the decision tree, for the particular product category can be classified as a norm, i.e., a premeditated decision pattern. For example, the repetitive pattern of shopping (trip) paths 468 can be regarded as the norm for the decision paths. Any irregular and occasional decision pattern and the corresponding irregular shopping path 469, which is outside of the norm, may be regarded as an impulse or extemporaneous decision.

FIG. 25 shows an exemplary grid structure and processing 594.

Shopping decisions can be determined based on the observation of:
1) the first-stop the shopper made and the associated product sale data, or
2) the shopper's interaction with the products and the associated product sale data.

With regard to the shopper's interaction with the products, the products can be organized in a coordinate system, e.g., (y, z) coordinates, according to predefined attributes for the products. Examples of attributes comprise brand, product type, size, flavor, and price. The products with the same attribute can be grouped as a product group, forming a product attribute block. A grid structure 580 can be constructed on top of the coordinate system, and an attribute of a product group can be mapped to at least a grid element by associating the grid element with the product group and its attribute 586. When the grid elements are mapped to product attribute blocks, the size of each grid element can be adjusted according to the size of the shelf space and the product size. The mapping of the grid elements to product attribute blocks does not have to be one-to-one mapping. Multiple grid elements can be associated with a product group when the occupied space by the product group requires more than one grid element. When the shopper makes decisions and interaction movements, a measurement of which attributes in the attribute block are chosen can be made.

The exemplary embodiment can also measure the sequence of the chosen attributes as a sequence of decisions that are made by the shopper. The sequences of decisions made by the shopper can be accumulated over a period of time (multiple shopping trips) to construct the decision tree for the shopper during the time period. The sequence of decisions can be a decision path from a node to the next node, and a sequence of decisions at this level can show the end-to-end decisions made by the shopper. One of the core benefits of the exemplary embodiment is the ability to infer the sequence of decisions from the sequence of attributes for the products with which the shopper interacts in an arrangement of attributes, based on the video analytics.

FIG. 26 shows an exemplary interaction and purchase detection based on the grid structure viewed from a top-down camera.

The exemplary embodiment can analyze the input images from the top-down cameras, and can increase the interaction count if the shopper interacts with a product in the category at the interaction detection 245 process. The exemplary embodiment can also increase the purchase count for the category, if the shopper makes a purchase at the purchase detection process 246.

For example, a "shelf space bounding box for category 1" 166 and a "shelf space bounding box for category 2" 167 can be predefined in the camera view 340, and the exemplary embodiment can detect and track the hand movement 381 of the shopper. If the coordinate, i.e., (Xi,Yi,Ti) 444, of the shopper stays in one of the bounding boxes for longer than a threshold time, the interaction count of the category that is associated with the particular bounding box can be increased. Multiple thresholds can also be used to further differentiate the level of engagement.

The purchase detection 246 process can utilize a background subtraction algorithm in the bounding boxes to detect the presence and/or absence of the product belonging to a category. When a product's absence is detected, the purchase count can be increased for the particular product category. In addition, in an exemplary embodiment, a semi-automatic annotation method can also be used for the purchase detection 246 process.

FIG. 27 shows an exemplary planogram data of an aisle and a shopping track with regard to the process of developing a decision tree.

The shopper trip data, such as 460, can be aggregated into a data structure, consisting of each decision and sequence of decisions for each shopping trip. The store location representing various product attributes, such as brand, size, price, and features, can be mapped based on the way the products are placed on the shelves in the store, as shown in the exemplary planogram 605. A shopping consideration set and decision path for the shopper can be generated by combining the two datasets. This can provide a clear understanding of not only the sequence or the order in which the attributes are considered, but also the cross-comparisons between various product groups. The tree structure can be developed through hierarchical clustering of the shopper trip data. The frequency of cross comparisons determines the grouping of the attributes, and the order of the decisions can determine the depth of the nodes in the tree.

FIG. 28 shows an exemplary process of segmentation based on purchasing behavior.

This bubble chart 635 illustration in FIG. 28 provides an example where shopping trips can be segmented based on type and the categories purchased. Each column of the bubble chart can represent a product category. The rows can represent trip types that are segmented based on occasions. Each number in the chart can show the percent of shopping trips of a particular category that belong to a specific occasion, thus helping to understand the contribution of each occasion to a category's sales.

FIG. 29A and FIG. 29B show an exemplary decision tree and process of segmentation based on shopping and purchasing behavior.

This illustration shows an example where shopping trips can be segmented based on both shopping behavior as well as purchase behavior based on transaction data. Constraints placed on the POS data, e.g., co-occurrence of salty snacks and beverages, helps to identify the "shopper's mission" in the store. Further, in this example, shopping trips are segmented by placing constraints on the associated shopping behavior, like which two categories were shopped together.

Based on the shopper behavior data and the transaction data, the hierarchical decision process for the "Snacks" category can be built in this exemplary decision tree. For example, the sub-node "Candy/Cookies & Crackers/Salty Snacks/Bars/Cereal" 292 can indicate that these subcategories were shopped or considered together while making a purchase decision. The representation in the node for "Snacks" 291 can show the total snack purchases in this example. Of the total snack purchases in the node for "Snacks" 291, in 48% of the shopping trips, i.e., as represented in another node for "Candy/Cookies & Crackers/Salty Snacks/Bars/Cereal" 292, the shopper purchased at least one of the subcategories from this group. The percentages for all of the groups in the node for "Candy/Cookies & Crackers/Salty Snacks/Bars/Cereal" 292 may not add up to 100% due to rounding.

FIG. 30 shows another exemplary decision tree 252 and process of segmentation based on shopping behavior.

This illustration shows an example where shopping trips can be segmented based on the shopping behavior in a category, like "grab and go" and "only scanned products," using automated video analysis along with proprietary advanced data annotation techniques. Such in-depth segmentation can provide insights into the nature and complexity of the in-store decision process in a category.

Each shopping behavior can be identified based on the application of spatiotemporal criteria to the shopping paths of the shopper. For example, a set of shopping interaction areas can be predefined for a group of categories. If a shopping path of the shopper stays in the vicinity of a category, the sequence of the coordinates of the path can be examined to determine whether they belong to the interaction area of the category, and it can then be determined whether the shopping path is visiting the associated category. For example, a shopping interaction area can be set with a predefined minimum temporal threshold and a predefined maximum temporal threshold for the shopping interaction types, e.g., "grab and go". If the shopping path of the shopper, i.e., the sequence of coordinates in the shopping interaction area, stays for longer than the predefined minimum temporal threshold and less than the predefined maximum temporal threshold for a shopping interaction type, such as the "grab and go", the shopping interaction can be classified as the "grab and go" shopping interaction. The temporal thresholds can be decided based on statistically gathered data in the particular category area, such as the mean temporal value of the particular shopping behavior during a typical period of time.

FIG. 31 shows another exemplary decision tree 253 and process of segmentation in consideration of brands.

The illustration provides a clear example of the importance of product attributes, such as product type and brand, in the decision process of "Salty Snacks." Package sizes are clearly a more important decision over brands for "Potato Chips/Fritos/Cheetos/Doritos and Tostitos." Such in-depth understanding can not only help to modify the category layout to match the decision process of the shopper, but also to increase the number of purchases by providing an improved shopping experience.

FIG. 32 shows exemplary processes in generating a decision tree based on category correlation.

In an exemplary embodiment, the process of generating a decision tree can consist of:
1) identifying categories in a store area 233,
2) detecting paths of the shopper in the store area 234,
3) measuring stopping sequence of the shopper in the store 235, 4) finding out the correlations when the categories are shopped together 236,
5) ranking the correlations 237, and
6) grouping non-overlapping categories to create a tree based on threshold values for each set of correlations 238.

FIG. 33-36 show details of each exemplary process for developing a decision tree, shown in FIG. 32.

FIG. 33 shows exemplary categories and process for detecting the stopping sequences of the shopper in relation to the predefined categories.

In an exemplary embodiment, a store area can be divided into multiple categories based on the regions that are associated with certain types of products. In this example, the shopping behavior analysis can be based on the analysis of the shopping paths of the shopper.

For example, categories in a store can be set up as follows: "category A at location L1 represented by polygon 1," "category B at location L2 represented by polygon 2," "category C at location L3 represented by polygon 3," "category D at location L4 represented by polygon 4," "category E at location L5 represented by polygon 5," and so on, as shown in 621. Once the target categories are identified, the embodiment can detect and utilize the paths of the shopper in the store to measure how the shopper made the shopping movement. For example, as shown in 622, the sequences of coordinates for each shopping trip, i.e., shopping trip 1 path—(x11, y11, t1), (x12, y12m t2), ..., (x1n, y1 n, tn), shopping trip 2 path—(x21, y21, t1), (x22, y22m t2), ..., (x2n, y2n, tn), shopping trip K path—(xk1, yk1, t1), (xk2, yk2m t2), ..., (xkn, ykn, tn), and so on, can be measured. The sequences of coordinates show in which categories the shopper made the shopping movement. For example, if the shopper stopped and stayed in a category for longer than a predefined temporal threshold, i.e., (xi, yi, ti) is within a category polygon for longer than a temporal threshold, "$Threshold_{Ti}$", the event can be registered as a shopping movement in that category.

Therefore, based on the categories that the shopper visited, the embodiment can detect the stopping sequences of the shopper in relation to the predefined categories. For example, as shown in 623, the stopping sequence of the shopper in the store can be as follows: Shopping Trip 1 Sequence—ACEA, Shopping Trip 2 Sequence—CDE, ..., Shopping Trip K Sequence—AC, and so on.

FIG. 34 shows an exemplary table for correlated stopping sequences of the shopper during shopping trips based on co-occurrences.

From the stopping sequences of the shopper, across multiple shopping trips, in the store, the next process can be to find out the correlations among the stopping sequences. One exemplary method of finding the correlations can be to count the number of co-occurrences and find the relative ratio of the co-occurrences compared to other possible combinations of category co-occurrences, when the categories are shopped together. As shown in 624, the categories can be grouped 4 at a time, 3 at a time, or 2 at a time, when the group of categories appear in the shopping paths of the shopper. In this example, the percentage of co-occurrences for the group of categories, "ABCD", is 0.01, i.e. 1%, among all other possible combinations of the "4" categories in the measured area.

FIG. 35 shows an exemplary table 625 for the ranked group of categories based on the correlation.

After the categories are grouped based on a correlation measure, the group of categories can be ranked based on the correlation. As shown in 625, the group of 4 categories can be ranked as follows: "ABDE", "ABCE", "BCDE", "ABCD", and "ACDF", in the order of a higher ratio for the co-occurrences.

FIG. 36 shows an exemplary decision tree 254 that could be constructed after applying a threshold to the correlations of a group of categories.

In an exemplary embodiment, after ranking the correlations among the grouped categories, the next step can be to find non-overlapping categories to create a tree based on threshold values for each set of correlations.

In the exemplary tree 254, the threshold values can be defined and applied to the table 625, as follows:

Threshold for 4 categories at a time=0.05

Threshold for 3 categories at a time=0.15

$$\text{Threshold for 2 categories at a time} = 0.30 \qquad (1)$$

The tree can start with a node that shows all of the possible categories initially. According to the definition for the thresholds, there is no valid correlation for 4 categories at a time. However, "ADE" can be a valid group from 3 categories at a time, which means it can become a second level group in the exemplary tree 254. Similarly, "BC" and "AD" can be valid correlations from 2 categories at a time. Since "BC" is not part of a top level group from 4 categories or 3 categories at a time, "BC" can become a second level group, whereas, since "AD" is part of the second level group "ADE," "AD" can become a third level group under "ADE."

FIG. 37 shows an exemplary grouping of paths in a decision tree.

The exemplary embodiment can construct a hierarchical decision tree structure 259, which comprises nodes and edges, based on the observed decision-making. The decision tree can be an end-to-end tree in the sense that a set of nodes from the starting node to the ending node can show a sequence of meaningful decision processes as predefined for the measurement area.

In the exemplary embodiment, the decision tree is an acyclic rooted tree that can have the following properties:

Any two nodes in the decision tree can be connected by a unique simple path, and $$\text{the number of edges} = \text{number of nodes} - 1. \qquad (2)$$

The tree does not need to be a binary tree in the present invention, although a binary tree may be used in many cases. In the exemplary embodiment, the height (i.e., the largest depth) of the tree, the maximum degree (i.e., the number of children) of a node, and the maximum number of nodes in the tree can be predefined based on the type of nodes. For example, the maximum number of nodes in a decision tree can be limited according to the maximum level of interaction and the predefined number of product categories that are used to measure the decision process and are the targets of interest. Similarly, the maximum degree of a node can be dependent on the maximum number of subcategories in an example.

In this example, the maximum number of nodes in the decision tree can be limited by:

$$\text{numOfNodes}_{max} = 1 + n_1 + n_1 n_2 + \ldots + n_1 n_2 \ldots n_{h-1} n_h \qquad (3)$$

where "h" is the maximum height of the decision tree, and "$n_i$" is the predefined maximum number of leaves per node at depth "i", where the number of leaves is dependent on the number of attributes for the sub-nodes, such as product subcategories or product groups, at the node.

The types of nodes can vary, and the nodes can be arranged in a particular hierarchy. For example, in an exemplary embodiment, the nodes can represent 1) the shopping behavior or the state-of-mind of the shopper, or
2) the product attributes that are selected by the shopper.

The number of nodes in a decision tree can also be predefined with a fixed number. An edge represents the transition of the decision.

In an exemplary embodiment, where the nodes can represent the shopping behavior or the state-of-mind of the shopper, a purchase action may be located in the nodes at the lowest level of the exemplary decision tree.

In another exemplary embodiment, where the nodes can represent the attributes of products, the consumers' hierarchical decision process in a category can be measured. Each category can consist of several products which have attributes. As noted earlier, the attributes can be defined as a set of product information that comprises brand, product type, size, flavor, retail channel, and price. The products can be arranged in a particular category layout of attribute blocks, e.g., brand blocks. A grid can be used as a basis for an exemplary category layout.

The exemplary embodiment can measure the selection process in the category layout, such as product, brand, and size of product package, based on spatial and temporal observation using video analytics. The decisions can be represented based on the selected or interacted attributes, and decision trees can be constructed based on the observed decisions. The decision trees can be very useful for retailers to manage categories in an efficient way. The category management comprises planogram/layout design, sku rationalization, assortment of categories, and efficient space allocation.

The count for each of the decisions can be increased whenever the shopper makes a decision along the path. If a decision path does not exist in the already existing tree, a new decision path can be constructed by adding or inserting a node to the tree. The insertion process can follow a well-known insertion process for a data structure. For example, a linked list data structure can be used to construct the decision tree, and an insertion of a path can be processed through adding a new pointer to a sub-linked list.

In FIG. 37, certain sets of paths in a decision tree may be grouped together for a deeper understanding of the decision process, e.g., "a set of decision paths 1" 286 and "another set of decision paths 2" 287. For example, a set of multiple outcomes can be grouped based on a time-of-day to find what kinds of decision processes were prevalent during the time-of-day. In this exemplary analysis, the temporal information adds another dimension of understanding the shopper decisions, in addition to the attributes that are already represented in the nodes of the decision tree. Optionally, the decision tree can have a default node for insignificant behavior or no decision, such as passing by activity.

FIG. 38 shows an exemplary scheme of dominant path calculation and level of decision steps calculation.

The personalized decision trees can be made more actionable by quantifying a percentage of shopping trips for each node. The exemplary embodiment can calculate which decision was made the majority of the time, based on a large number of gathered samples. The embodiment can also calculate a dominant path 289 among the decision paths on the decision tree, although the dominant path 289 may not be the majority. The determination of the majority path and the dominant path 289 can be based on counts of shopping trips where that path was chosen. For example, a voting process can be used to determine a dominant path 289. In the exemplary tree in 261, a dominant path 289 is determined, although the path is not the majority path.

Aggregation of a large number of decision processes can show the statistical decision pattern among the shopping trips for a particular category or product in the measured location or locations. For example, based on the large number of samples of observed decision processes, it can be calculated which decision was made during the majority of shopping trips.

The exemplary embodiment can also measure different levels of decision steps that are reflected in the various lengths of the paths in the decision tree. For example, in the case 1 shown in decision tree 262, the path 284 has a longer decision path with more steps than the path 281, which indicates the decision process for the product attribute in the last node, i.e. the leaf, in path 284 took more steps than the decision process for the product attribute in the last node in path 281. In an exemplary embodiment, the paths are not required to have the same depth, so the lengths of the decision paths can vary depending on the shopping decision process. However, the largest depth of a decision path can be predefined, thus the height of the tree can have a fixed maximum size in this example.

The average time for making a decision can be calculated based on the level of decision steps. The relationship between the shopping time and the decision process can be analyzed. For example, if the average shopping time for a particular sequence of attributes is prolonged compared to other shopping times for other sequences in the decision tree, the components of the particular sequence of attributes may need to be adjusted, depending on the goal for the category to which the attributes belong. The products in the category may be rearranged to shorten the shopping path and facilitate the shopping experience of the shopper, if the reduction of the shopping time is a goal of the store manager in this particular exemplary situation. For example, in the case 2, the products for the revised decision tree 263 have been rearranged from the previous decision tree 262. In the decision tree 263, the path 283 now has the same length of decision steps as the path 281, which indicates the decision steps for the product attribute in the last node in the path 284 in the previous decision tree have been reduced after rearranging the products.

FIG. 39 shows an exemplary scheme of matching a planogram with decision trees.

The results from the exemplary embodiment can be used to assist in developing a planogram that matches the decision process of the shopper as well as their needs. Depending on the planogram, people navigate differently. Therefore, the planogram can be optimized based on the information of the matched decision process. For example, highly-correlated products based on the decision statistics can be placed together in the planogram in an exemplary design. For example, the decision paths in a decision tree 264 could show that two products in the relevant nodes are highly correlated based on a high frequency of the decision processes. In this case, the category layout of the planogram can reflect the correlation by placing the products together, as the correlation can be inferred from the path statistics of the decision tree.

In another example, between two different shelf sets, it can be determined which shelf more closely matches the mindset of the shopper, information that can be used for better planogram design. For example, the pattern of the decision paths in a decision tree 266 is different from the pattern of the decision paths in another decision tree 267 in comparing two different shelf sets. The middle node 297 at depth 1 in the decision tree 267 shows "degree 3", i.e., three children, while the leftmost node 296 in the decision tree 266 shows "degree 2", i.e., two children. This indicates that the shopper made the shopping decision for the three products in the shelf that is associated with the decision tree 267 while they make the shopping decision for the two products in the other shelf that is associated with the decision tree 266. Given the information, the store manager can assess which planogram design is more suitable for the goal of the two shelf sets that are associated with the decision trees. The results also help in developing product assortments, based on an understanding of the hierarchy of category decisions, and ensuring the proper allocation of space. In another exemplary application of the results, price elasticity can be superimposed on behavior, based on point-of-sale data from several price points. Price elasticity of demand is the measure of the sensitivity of quantity demanded in relation to changes in price. In other words, it is a measure of how shoppers react to change in price while purchasing a product.

The exemplary embodiment can take into account a longer time period that involves several price points for the category, in order to normalize the impact of price promotions on shopper behavior. The longer time period can help to neutralize the impact of price promotions, in an attempt to provide a clear understanding of the importance of all other product attributes, like flavor and package size, in the purchase decision process for the category.

FIG. 40 shows an exemplary scheme for the decision tree merge process.

In an exemplary embodiment, multiple decision trees can be grouped together or merged, in order to analyze the decision process from a different perspective. For example, multiple decision trees can be constructed for different times-of-day for the target location for the shopper decision observation over a predefined period of time. In another example, multiple decision trees can be constructed for different retail locations (retail channels) visited by the shopper. Then, the results of multiple trees can be merged to show the overall decision processes of the shopper during the period.

In another example, one or more sub-trees can be constructed for the decision paths in subcategories. The one or more sub-trees, e.g., 268 and 269, can be integrated into the super-tree, e.g., 270, for the higher level category. This process can be useful when there are many category levels, and each category itself contains highly-complicated subcategories. In essence, this can be a "divide-and-conquer" strategy to divide a category into multiple subcategories, construct the decision trees for the subcategories, and merge them later for a complete view of the decision process in the category.

FIG. 41 shows an exemplary network of a plurality of means for control and processing, a plurality of cameras, and a plurality of mobile signal access points (APs) that can be used to build a personalized decision tree, where the network further can consist of a plurality of first means for control and processing and a plurality of second means for control and processing, which can communicate with each other to synchronize the time-stamped lists of measurements among a plurality of video streams captured by the cameras and mobile signals captured by the APs in the measured locations.

The exemplary embodiment can be an apparatus for building a personalized decision tree based on in-store visual observation for behavior patterns and demographics of the shoppers that shop in a store area. The apparatus can comprise cameras for capturing a plurality of input images of the shoppers, e.g., first set of cameras 104A-D and second set of cameras 102, in the vicinity of the measurement area, a set of APs 106A-C, and means for processing the plurality of input images, e.g., first means for control and processing 107 or second means for control and processing 110, in order to measure the behavior patterns and demographics of each shopper in the measurement area. The apparatus can also comprise means for aggregating the measurements for the behavior patterns and demographics of the shopper. The behavior patterns can comprise interaction with the categories and purchase of products in the store area. The first means for control and processing 107 or second means for control and processing 110 may be used as the exemplary embodiment of these means for aggregating the measurements.

In the exemplary embodiment, a plurality of cameras 102 and 104A-D, can be connected to the means for video interface in a means for control and processing, e.g., a first means for control and processing 107.

The sensors can be placed in a distributed architecture to facilitate the measurement of the response data. If the distance between the plurality of cameras is greater than a means for control and processing can handle, the plurality cameras can be connected to multiple means for video interface.

For example, in the exemplary embodiment shown in FIG. 41, a plurality of cameras 111 and 112, can be connected to the means for video interface in a first means for control and processing 107 that is different from the first means for control and processing 107 of another plurality of cameras 115 and 116. Likewise, the plurality of APs 106A-C can be connected to the plurality of means for control and processing via wireless or wired interface. The plurality of means for control and processing can be connected in a local area network and communicate with each other.

In an exemplary deployment of the system, the first set of cameras 104A-D can be installed where the field-of-view can cover the traffic of the shoppers in the measured location and the second set of cameras 102 can be installed in an area in which the frontal view of the people can be captured. The cameras can be connected to the video interface through cables or via a wireless network connection.

The digitized video data from the video interface and mobile signal data from the APs can be transferred to the means for control and processing that executes computer vision and mobile tracking algorithms on the data. The means for control and processing can have internal means for storing data or external means for storing data.

The cameras can comprise an analog camera, digital camera, wireless camera, USB camera, or Firewire camera. The means for video interface, which can comprise a video frame grabber, USB interface, Ethernet interface, wireless interface, Firewire interface, or other commonly-used video interface, are typically included in the same enclosure as the means for control and processing.

The means for control and processing can be a general purpose personal computer, such as a Pentium 4 PC, or a dedicated hardware, such as an FPGA-based implementation of a device, which can carry out the required computation. The means for control and processing, as well as the means for video interface, can be placed locally or remotely, as long as the connection to the cameras and APs can be established.

The internal means for storing data, such as the internal hard disk drives, can be placed within the same enclosure as the means for control and processing. The external means for storing data, such as a network storage driver or internal hard disk drives contained in a remote computer, can be placed locally or remotely, as long as a means for transferring data is available.

The exemplary embodiment can generate time-stamped measurements in accordance with the behavior analysis and segmentation, utilizing a time server 109. The exemplary time server 109 can maintain a synchronized time in the network of means for control and processing. In another exemplary embodiment, a first means for control and processing 107 can act as a server, and a plurality of second means for control and processing 110 can act as clients. The server can run its own local clock or be connected to a global time server 109 for the synchronization utilizing a time synchronization protocol, such as the Network Time Protocol (NTP). The time-stamped measurements can facilitate the synchronized analysis, calculation, and utilization of the measurements.

The number of cameras and APs per a means for control and processing can vary, depending on the system configuration in the physical space. However, each means for control and processing can know the identification of the associated plurality of cameras that are assigned to the selected locations in a store area and the area covered by the cameras.

One of ordinary skill in the art would recognize that the set of cameras utilized for the present invention, for example as illustrated in FIGS. 1 and 8, can be ordinary surveillance cameras, high-definition cameras, low-cost surveillance cameras, infrared cameras, or other image detection devices. One example embodiment of the present invention has the cameras configured as to be installed in the ceiling of a retail location, but one skilled in the art would understand that the cameras could be installed in other locations, such as the walls of the location, behind a mirror, on or associated with a commercial display, aisle and shelf hardware, or railing.

One of ordinary skill in the art would also recognize that the access points 106A-C (APs), for example as illustrated in FIG. 1, can be located in plain view of customers in a retail location, but also out of sight in a ceiling or other fixture. The AP can be a consumer AP device, commercial AP device, beacon device, or any other device capable of operating as an access point for Wi-Fi, Bluetooth, or other wireless modality.

Both the cameras and AP hardware can be connected by a wired network, including, but not limited to, an Ethernet based network. The cameras and AP hardware can be connected by a wireless network, including, but not limited to, a Wi-Fi network, Bluetooth network, nearfield communications (NFC) network, or other type of wireless network. A wired or wireless network can be controlled by a central server or each device can operate as an independent, "Internet of things" device. The network can be connected to the Internet to transfer data, including, but not limited to, raw data and processed data and analytics, to a remote location.

The computing hardware utilized to implement the processes and modules used in the present invention can be configured and controlled via a user-input device, including, but not limited to, a keyboard, mouse, trackpad, trackball, or remote control. Additionally, the hardware can be configured and controlled via remote access through a secure Internet connection. Any data captured and created, including both raw data and processed data and analytics, by the system can be output to a user using a display, printout, or transmitted to a remote location for further analysis.

FIG. 42 shows an example of a generic computer device or a generic mobile computer device, which may be used to implement the processes and modules of the present invention. The computer devices can include many forms of devices, such as desktops, workstations, servers, laptops, personal computers, personal digital assistants, single board computers such as the Raspberry Pi, and other computing devices. Mobile computing devices can include cellular telephones, smartphones, personal digital assistants, or other mobile devices. It should be understood that the computing devices and mobile computing devices listed are exemplary, and not intended to limit the implementation of the processes and modules disclosed in the present invention.

The computing device 2700 includes a processor 2710, memory 2720 (such as Random Access Memory or RAM), storage 2730 (such as a hard disk drive), input device 2740 (such as a keyboard, trackball, trackpad, or mouse), and output device 2750 (such as a CRT, LCD, or other type of display device, and an auditory device such as speakers).

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for generating a personalized decision tree based on in-store shopper behavior analysis utilizing a plurality of sensors, and using at least a processor for the analysis comprising the steps of:
   a. capturing a plurality of input images of a shopper at a retail location using a plurality of cameras,
   b. capturing a data stream from a mobile device carried by the shopper using at least a mobile signal sensor,
   c. tracking the shopper's movements through the retail location using the plurality of input images, the data stream, and a Shopper Behavior Tracker module, wherein the plurality of input images and the data stream are used to create a set of vision-based trajectories and Wi-Fi based trajectories, wherein segments from the set of Wi-Fi based trajectories are used to reconstruct missing segments from the set of vision-based trajectories using a Trajectory Interpolation module, and wherein the set of vision-based trajectories and Wi-Fi based trajectories are fused through a Multi-modal Trajectory Fusion module,
   d. analyzing the behavior of the shopper using the plurality of input images,
   e. measuring decision activities of the shopper in the retail location tied to a product category based on the behavior analysis, including associating a shopper trajectory and a shopper transaction log, computing a likelihood for a set of items picked up along the shopper trajectory, wherein the likelihood is determined using the following formula $P_j = \Pi_{i-1}^N P(I_i|T_j)a$ wherein $P_j$ is the likelihood, $I_i$ is a given item in a given t-log data $T_j$ and determining a presence of a shopping fixation point, and
   f. populating a cross-channel shopper database with a set of shopper profile data created by accumulating the decision activities of the shopper, wherein the accumulation of decision activities occurs during a plurality of shopping trips by the shopper, wherein the plurality of shopping trips by the shopper occur at a single retail location or across multiple retail locations in a geographic area, wherein a Shopper Recognizer module uses the set of shopper profile data to search a Cross-channel Shopper Database to determine a match with a set of existing shopper profile data of a revisiting shopper, g. constructing the personalized decision tree using a Personalized Decision Tree Construction module, and wherein the decision activities of the shopper are measured based on the purchase behavior of the shopper comprising interaction with a plurality of products and travel paths to a plurality of product categories.

2. The method according to claim 1, wherein the method further comprises a step of calculating which decision was made by the shopper a majority of the time based on data gathered over multiple shopping trips to a single retail location or multiple retail locations.

3. The method according to claim 1, wherein the personalized decision tree comprises nodes and edges, wherein a node represents the state-of-mind of the shopper, wherein the number of nodes is predefined, and wherein an edge represents a transition of the decision.

4. The method according to claim 1, wherein the capturing of input images of the shopper and tracking of the shopper movements through a retail location is performed without the knowledge of the shopper, making the gathered data unbiased.

5. The method according to claim 1, wherein the Personalized Decision Tree Construction module further comprises calculating a dominant path among the decision paths in the personalized decision tree.

6. The method according to claim 1, wherein the method further comprises aggregating the decision paths for the shopping trips of multiple shoppers segmented by demographic class or by need states, wherein the attributes for the demographic class comprise age, gender, and ethnicity.

7. The method according to claim 1, wherein the method further comprises a step of counting selection activities according to the category, product, brand, size of product package made by the decision, based on spatial and temporal observation using video analytics.

8. The method according to claim 1, wherein the method further comprises the steps of:
   a. organizing products in a coordinate system according to predefined attributes,
   b. measuring what attributes in an attribute block are chosen by the shopper, and
   c. measuring the sequence of the chosen attributes,
wherein the attributes comprise brand, product type, size, flavor, and price.

9. The method according to claim 1, wherein the method further comprises a step of integrating a semi-automated method to compute the decision tree to identify behaviors specific to the tracked shopper that cannot be automatically observed or to identify granular details of the specific tracked shopper's interaction with a product.

10. The method according to claim 1, wherein the method further comprises a step of detecting a sequence of decisions that are made by the shopper, wherein the sequence of decisions is a decision path from a node to the next node, and wherein the sequence of decisions shows the end-to-end decisions made by the shopper.

11. The method according to claim 1, wherein the method further comprises a step of measuring different levels of decision steps based on the lengths of the decision paths, wherein the average time of making a decision can be calculated based on the level of decision steps.

12. The method according to claim 1, wherein the method further comprises a step of measuring a premeditated decision compared to an impulse decision based on the decision tree.

13. The method according to claim 1, wherein the method further comprises a step of quantifying a percentage of shopping trips for each node.

14. The method according to claim 1, wherein the method further comprises a step of providing targeted messaging to the shopper based on the personalized decision tree.

15. The method according to claim 1, wherein the method further comprises a step of superimposing price elasticity on the shopper, based on the personalized decision tree.

16. A system for generating a personalized decision tree based on in-store shopper behavior analysis utilizing a plurality of sensors, and using at least a processor for the analysis comprising the steps of:
   a. capturing a plurality of input images of a shopper at a retail location using a plurality of cameras,
   b. capturing a data stream from a mobile device carried by the shopper using at least a mobile signal sensor,
   c. tracking the shopper's movements through the retail location using the plurality of input images, the data stream, and a Shopper Behavior Tracker module, wherein the plurality of input images and the data stream are used to create a set of vision-based trajectories and Wi-Fi based trajectories, wherein segments from the set of Wi-Fi based trajectories are used to reconstruct missing segments from the set of vision-based trajectories using a Trajectory Interpolation module, and wherein the set of vision-based trajectories and Wi-Fi based trajectories are fused through a Multi-modal Trajectory Fusion module,
   d. analyzing the behavior of the shopper using the plurality of input images,
   e. measuring decision activities of the shopper in the retail location tied to a product category based on the behavior analysis, including associating a shopper trajectory and a shopper transaction log, computing a likelihood for a set of items picked up along the shopper trajectory, wherein the likelihood is determined using the following formula $P_j = \Pi_{i=1}^{N} P(I_i | T_j)$ a wherein $P_j$ is the likelihood, $I_i$ is a given item in a given t-log data $T_j$ and determining a presence of a shopping fixation point, and
   f. populating a cross-channel shopper database with a set of shopper profile data created by accumulating the decision activities of the shopper, wherein the accumulation of decision activities occurs during a plurality of shopping trips by the shopper, wherein the plurality of shopping trips by the shopper occur at a single retail location or across multiple retail locations in a geographic area, wherein a Shopper Recognizer module uses the set of shopper profile data to search a Cross-channel Shopper Database to determine a match with a set of existing shopper profile data of a revisiting shopper,
   g. constructing the personalized decision tree using a Personalized Decision Tree Construction module, and wherein the decision activities of the shopper are measured based on the purchase behavior of the shopper comprising interaction with a plurality of products and travel paths to a plurality of product categories.

17. The system according to claim 16, wherein the method further comprises a step of calculating which decision was made by the shopper a majority of the time based on data gathered over multiple shopping trips to a single retail location or multiple retail locations.

18. The system according to claim 16, wherein the personalized decision tree comprises nodes and edges, wherein a node represents the state-of-mind of the shopper, wherein the number of nodes is predefined, and wherein an edge represents a transition of the decision.

19. The system according to claim 16, wherein the capturing of input images of the shopper and tracking of the shopper movements through a retail location is performed without the knowledge of the shopper, making the gathered data unbiased.

20. The system according to claim 16, wherein the Personalized Decision Tree Construction module further comprises calculating a dominant path among the decision paths in the personalized decision tree.

21. The system according to claim 16, wherein the method further comprises aggregating the decision paths for the shopping trips of multiple shoppers segmented by demographic class or by need states, wherein the attributes for the demographic class comprise age, gender, and ethnicity.

22. The system according to claim 16, wherein the method further comprises a step of counting selection activities according to the category, product, brand, size of product package made by the decision, based on spatial and temporal observation using video analytics.

23. The system according to claim 16, wherein the method further comprises the steps of:
   a. organizing products in a coordinate system according to predefined attributes,
   b. measuring what attributes in an attribute block are chosen by the shopper, and
   c. measuring the sequence of the chosen attributes, wherein the attributes comprise brand, product type, size, flavor, and price.

24. The system according to claim 16, wherein the method further comprises a step of integrating a semi-automated method to compute the decision tree to identify behaviors specific to the tracked shopper that cannot be automatically observed or to identify granular details of the specific tracked shopper's interaction with a product.

25. The system according to claim 16, wherein the method further comprises a step of detecting a sequence of decisions that are made by the shopper, wherein the sequence of decisions is a decision path from a node to the next node, and wherein the sequence of decisions shows the end-to-end decisions made by the shopper.

26. The system according to claim 16, wherein the method further comprises a step of measuring different levels of decision steps based on the lengths of the decision paths, wherein the average time of making a decision can be calculated based on the level of decision steps.

27. The system according to claim 16, wherein the method further comprises a step of measuring a premeditated decision compared to an impulse decision based on the decision tree.

28. The system according to claim 16, wherein the method further comprises a step of quantifying a percentage of shopping trips for each node.

29. The system according to claim 16, wherein the method further comprises a step of providing targeted messaging to the shopper based on the personalized decision tree.

30. The system according to claim 16, wherein the method further comprises a step of superimposing price elasticity on the shopper, based on the personalized decision tree.

* * * * *